United States Patent
Iyer et al.

(10) Patent No.: US 10,936,051 B2
(45) Date of Patent: Mar. 2, 2021

(54) POWER MANAGEMENT FOR GESTURE RECOGNITION IN VIRTUAL, AUGMENTED, AND MIXED REALITY (XR) APPLICATIONS

(71) Applicant: Dell Products, L.P., Round Rock, TX (US)

(72) Inventors: Vivek Viswanathan Iyer, Austin, TX (US); Yagiz Can Yildiz, Austin, TX (US); Christopher A. Torres, San Marcos, TX (US)

(73) Assignee: Dell Products, L.P., Round Rock, TX (US)

( * ) Notice: Subject to any disclaimer, the term of this patent is extended or adjusted under 35 U.S.C. 154(b) by 120 days.

(21) Appl. No.: 16/136,444

(22) Filed: Sep. 20, 2018

(65) Prior Publication Data

US 2020/0097065 A1 Mar. 26, 2020

(51) Int. Cl.
*G06F 3/01* (2006.01)

(52) U.S. Cl.
CPC .............. *G06F 3/011* (2013.01); *G06F 3/017* (2013.01)

(58) Field of Classification Search
None
See application file for complete search history.

(56) References Cited

U.S. PATENT DOCUMENTS

| | | | |
|---|---|---|---|
| 2013/0229499 A1* | 9/2013 | Zhao .................... | G06F 3/0485 348/51 |
| 2014/0027606 A1* | 1/2014 | Raynor ................. | G06F 1/3231 250/205 |
| 2019/0212827 A1* | 7/2019 | Kin ....................... | G06F 3/011 |

OTHER PUBLICATIONS

"Gestures," 9 pages, Microsoft, available at https://developer.microsoft.com/en-us/windows/mixed-reality/gestures.
John Marco Oscillada, "List of Gesture Controllers for Virtual Reality," Feb. 16, 2017, 9 pages, Copyright ©2018, Virtual Reality Times, available at https://virtualrealitytimes.com/2017/02/16/vr-gesture-controllers/.
Nathan Ingraham, "Meta's new AR headset lets you treat virtual objects like real ones," Mar. 2, 2016, available at https://www.engadget.com/2016/03/02/meta-2-augmented-reality-headset-hands-on/.
"The Most Advanced Hand Tracking on Earth," Copyright ©2018, Leap Motion, Inc., available at www.leapmotion.com.

* cited by examiner

*Primary Examiner* — Andre L Matthews
(74) *Attorney, Agent, or Firm* — Fogarty LLP

(57) ABSTRACT

Power management systems and methods for gesture recognition in virtual, augmented, and mixed reality (xR) applications is described. In an illustrative, non-limiting embodiment, an Information Handling System (IHS) may include a processor and a memory coupled to the processor, the memory having program instructions stored thereon that, upon execution by the processor, cause the IHS to: receive frames captured by a camera of a Head-Mounted Device (HMD) worn by a user in an xR application, wherein the HMD is coupled to a plurality of infrared (IR) emitters; identify a state of a gesture sequence being performed by the user based upon the frames; and select a level of illumination provided by the plurality of IR emitters in response to the state.

12 Claims, 38 Drawing Sheets

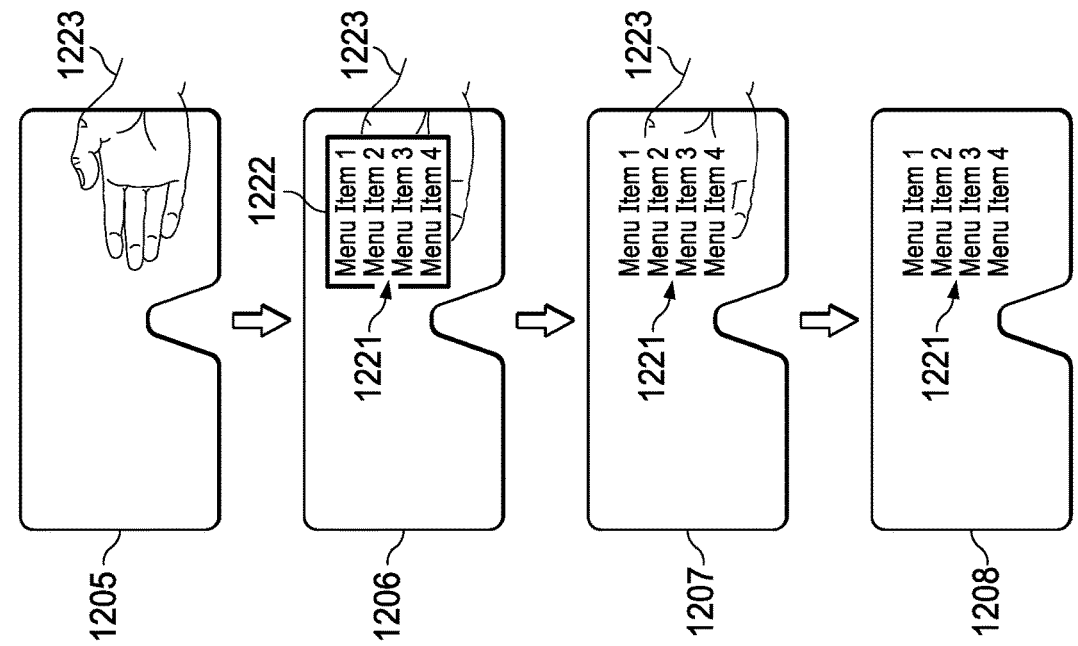
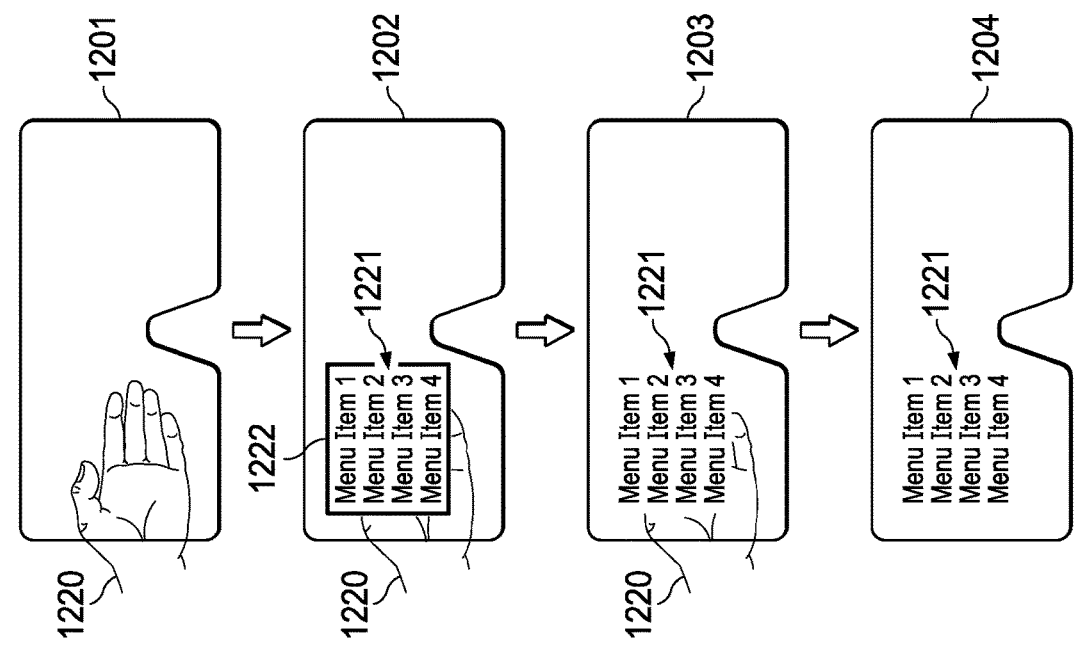

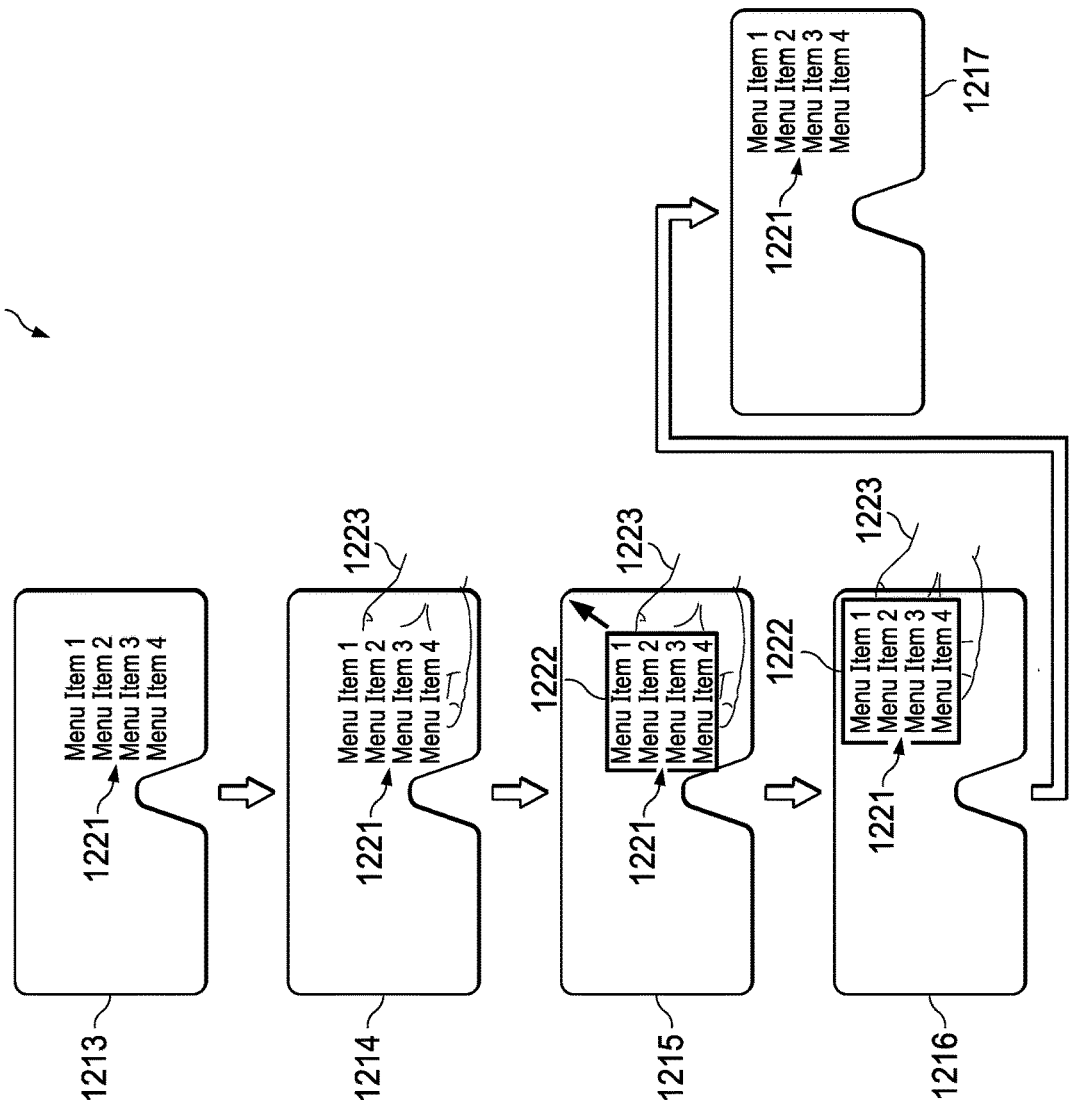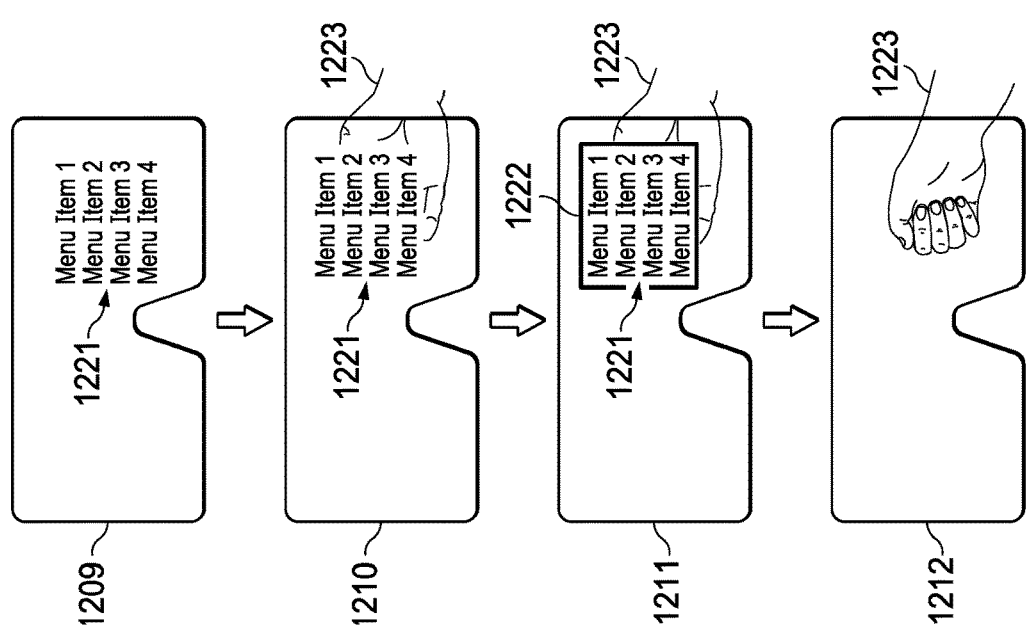

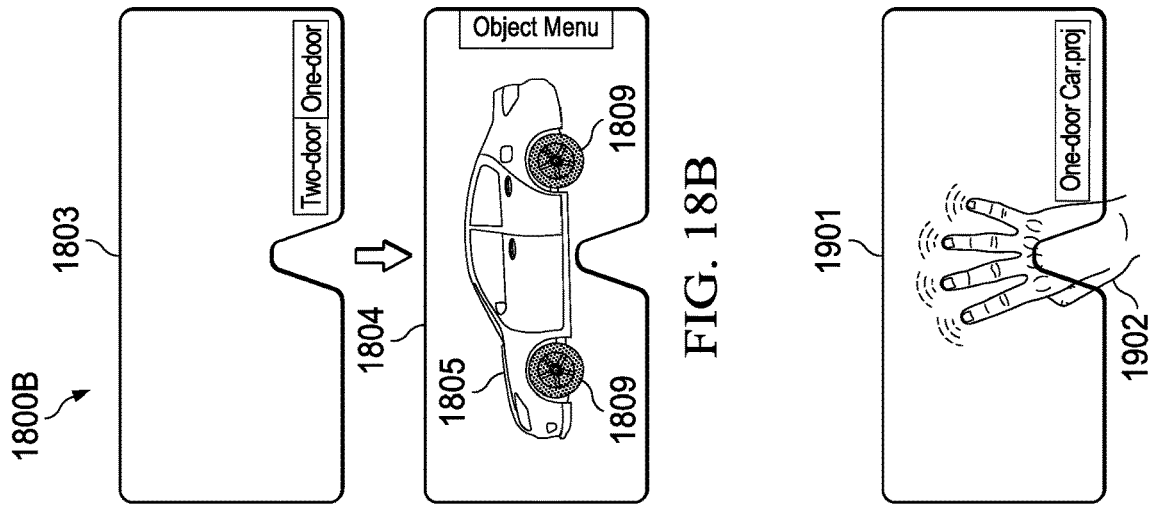
FIG. 19
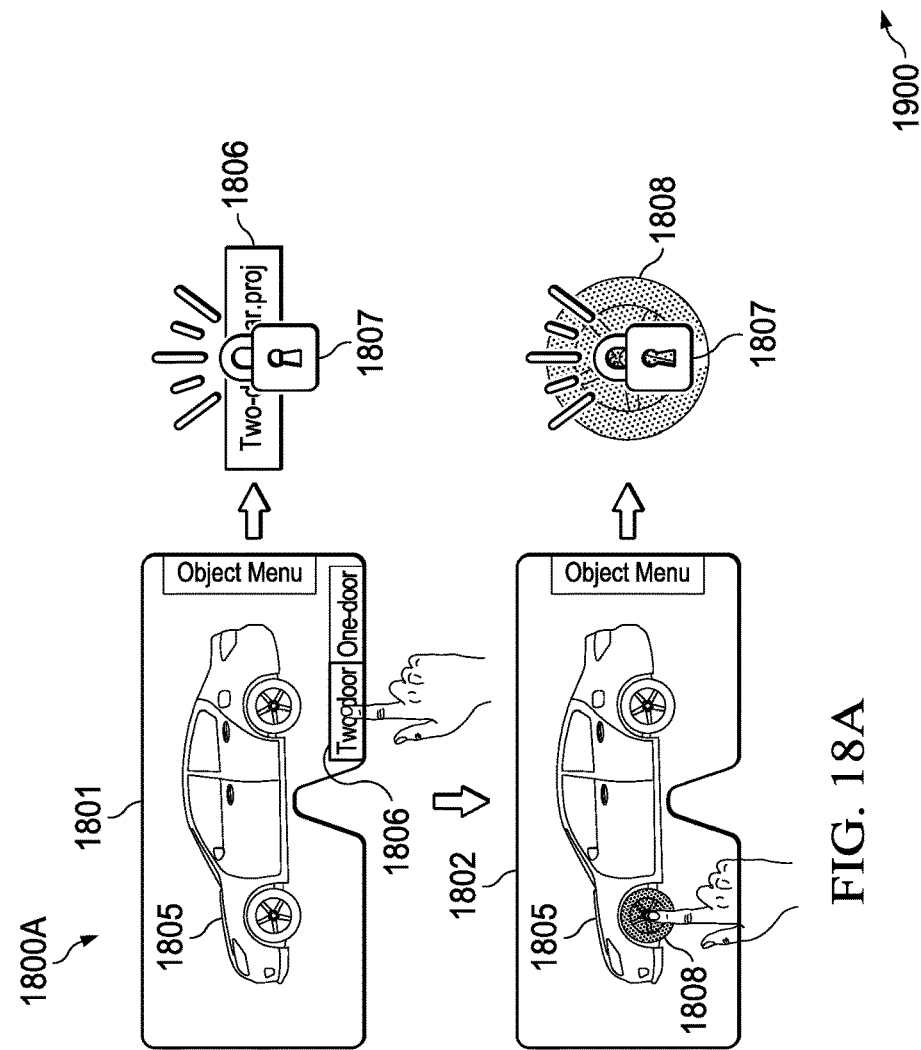
FIG. 18B
FIG. 18A

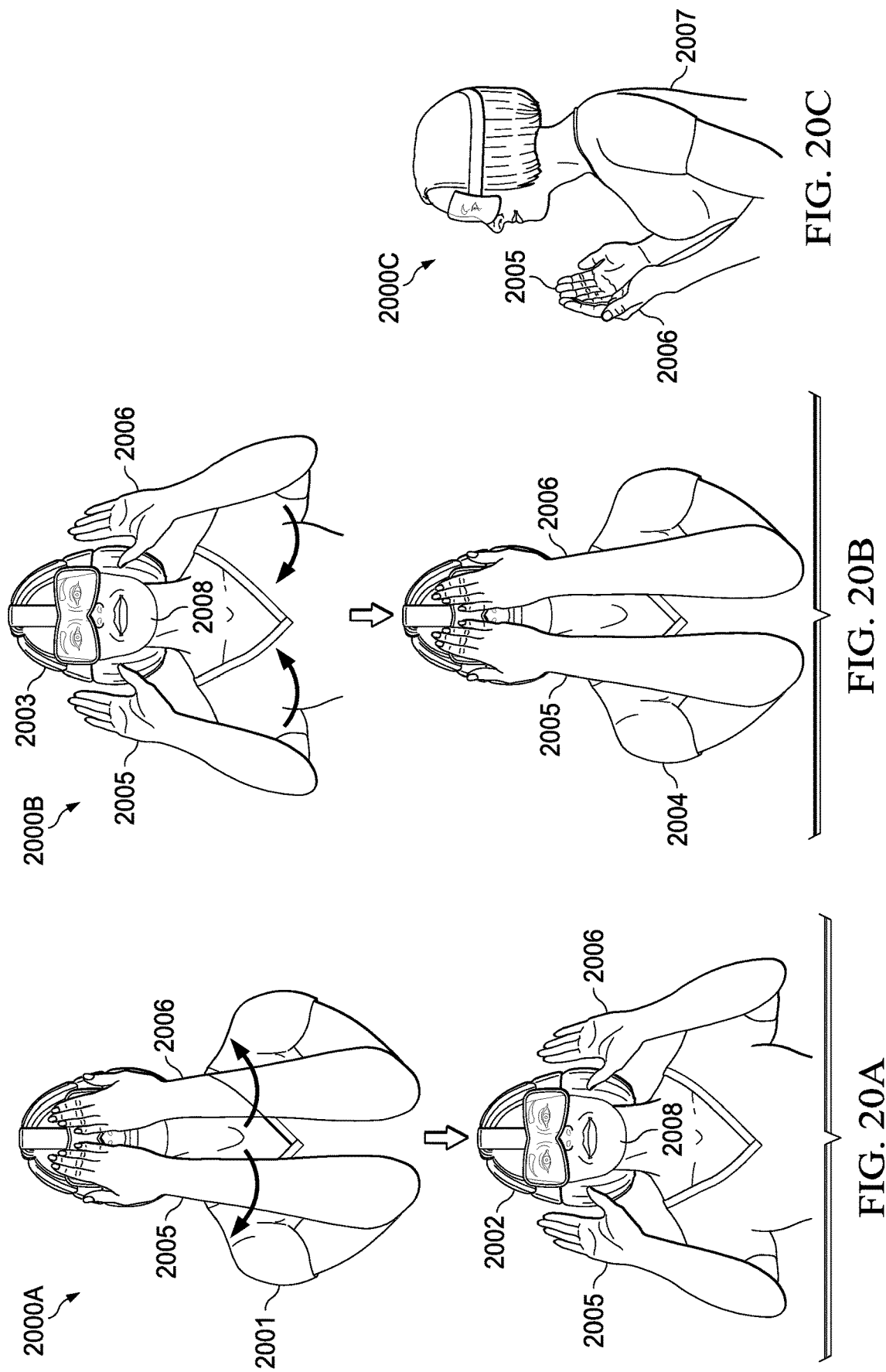

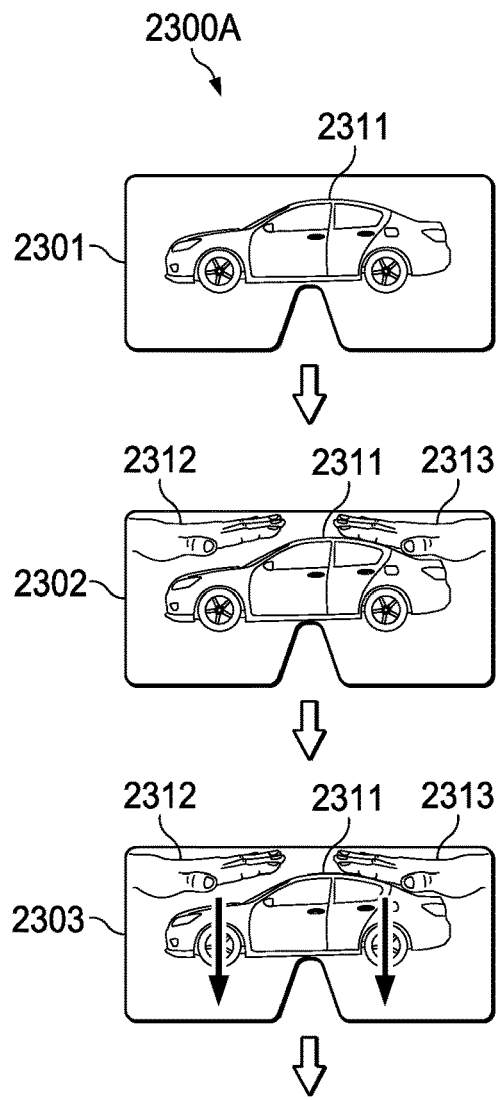
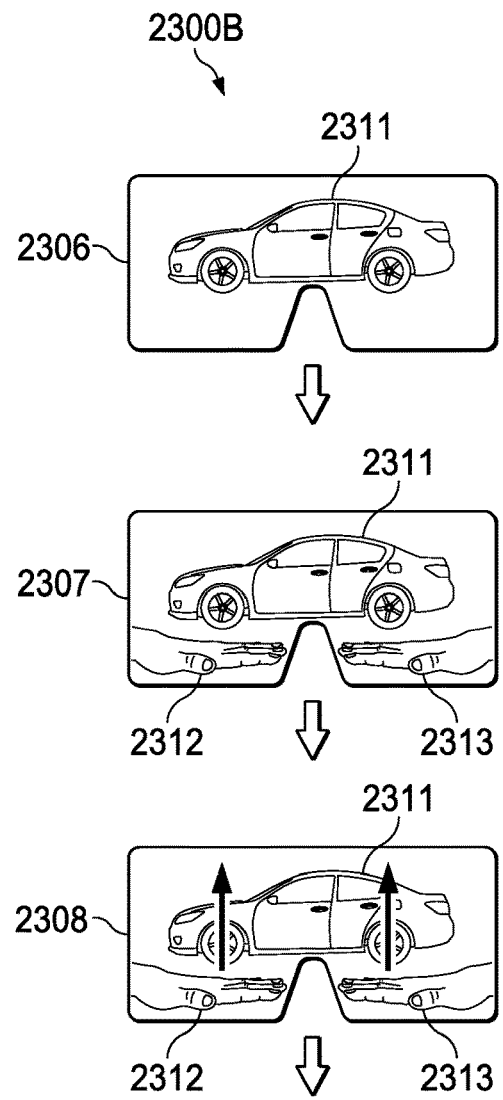
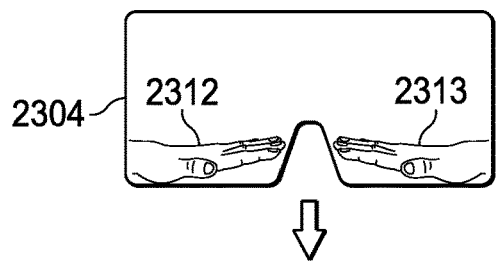
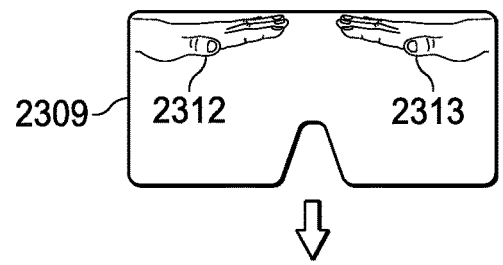
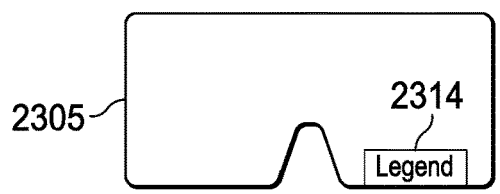
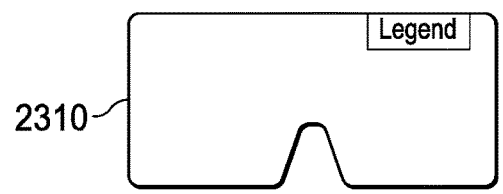
FIG. 23A
FIG. 23B

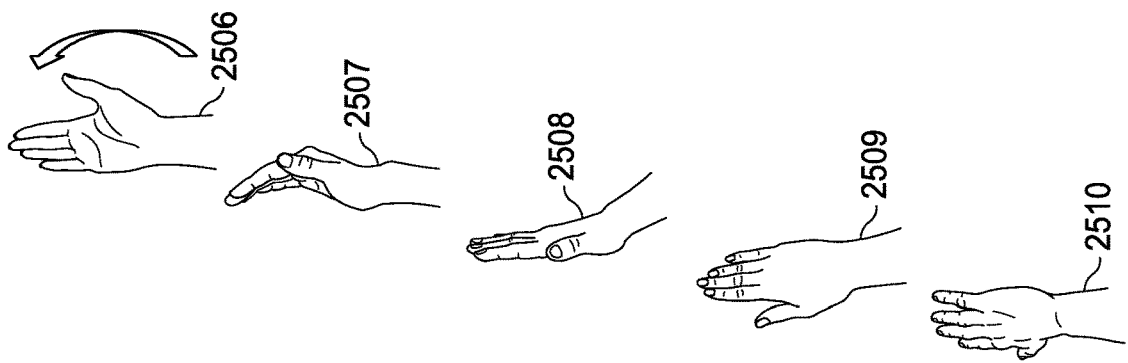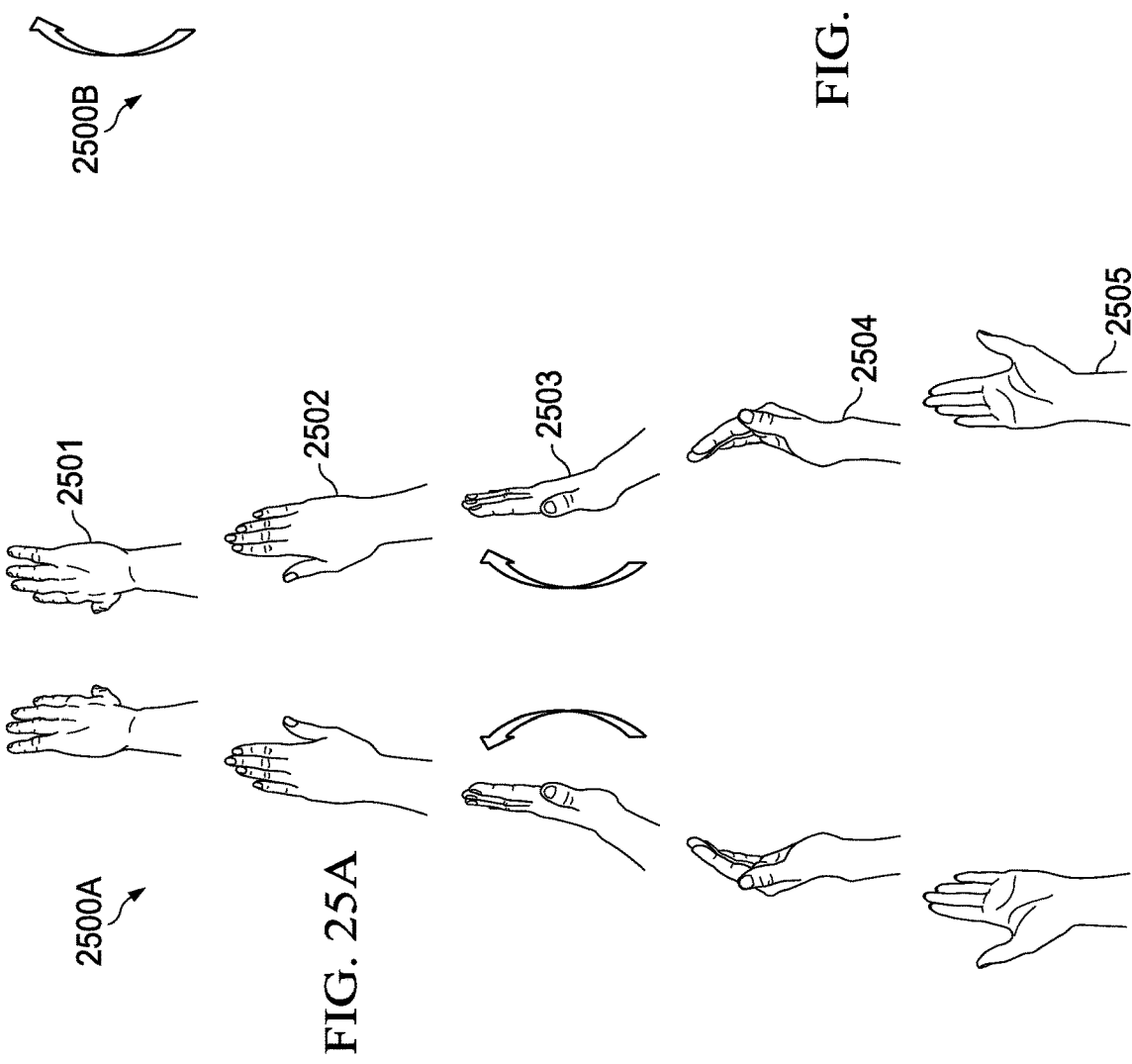
FIG. 25A
FIG. 25B

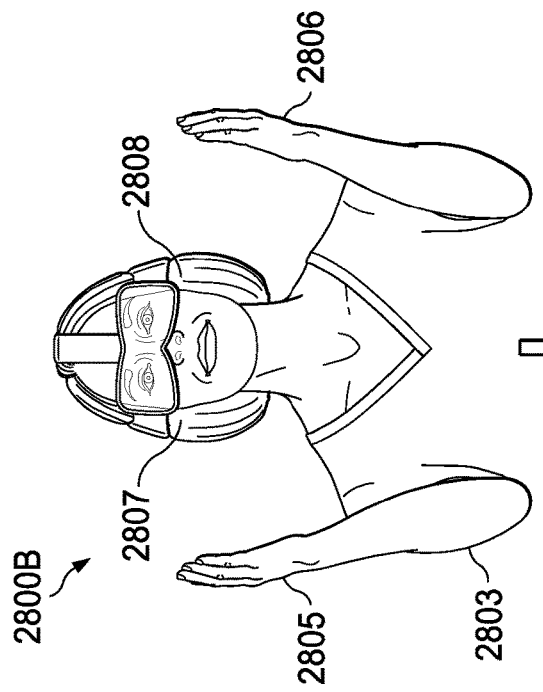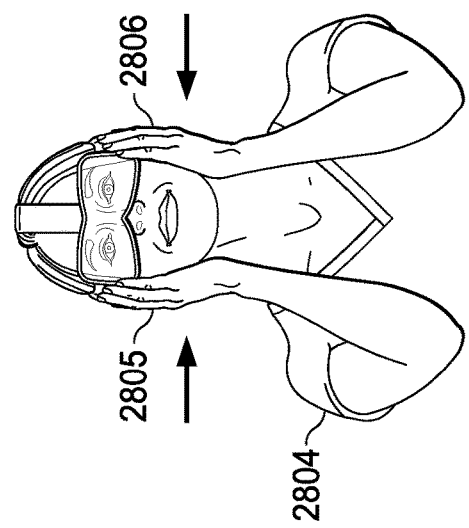
FIG. 28B
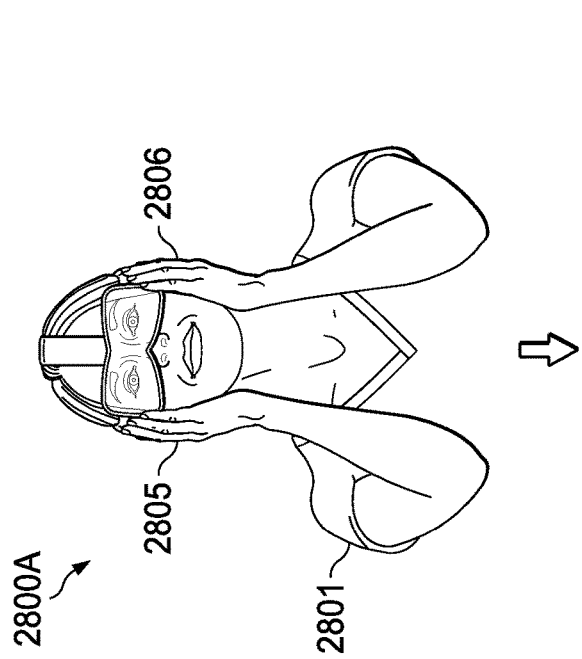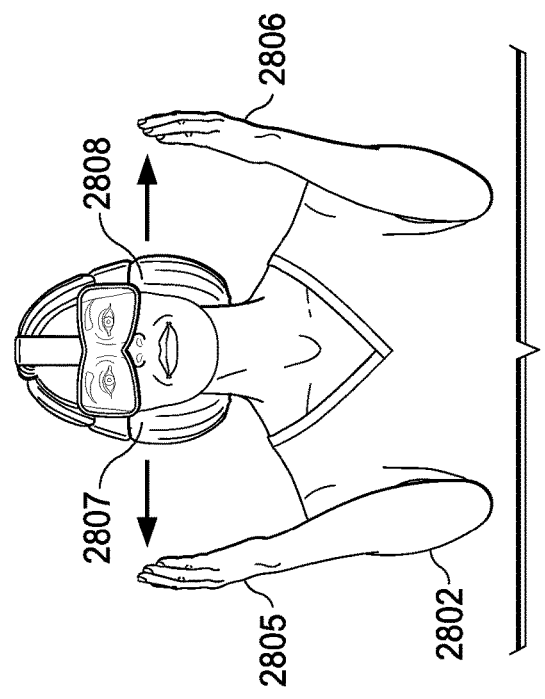
FIG. 28A

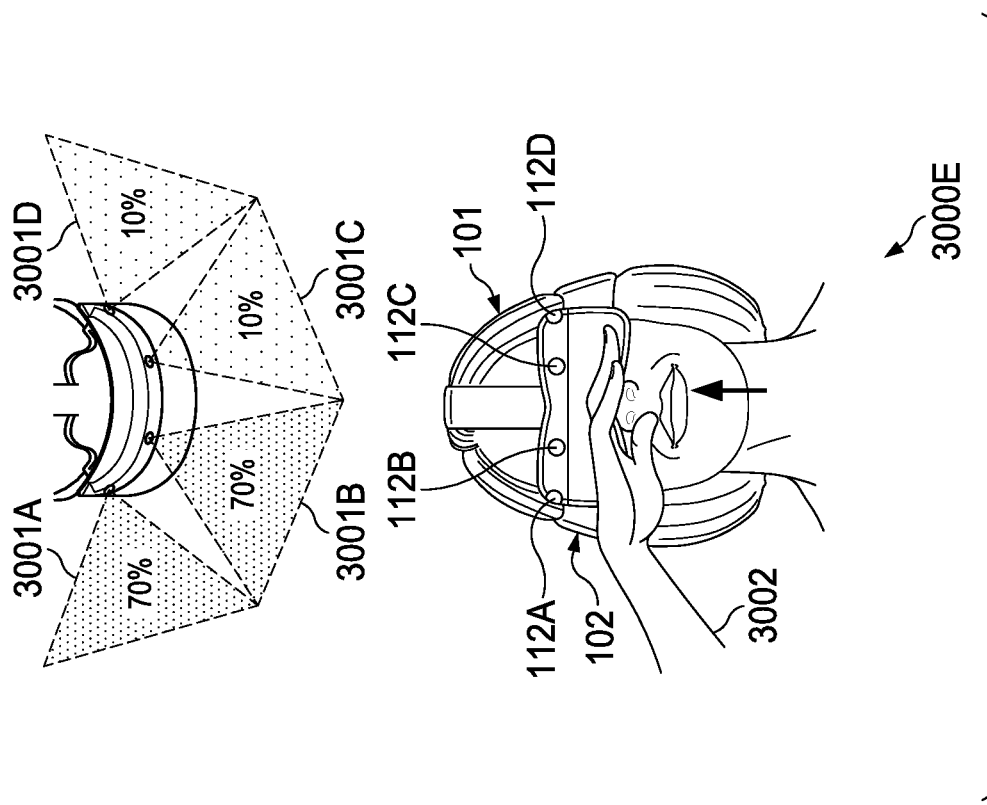

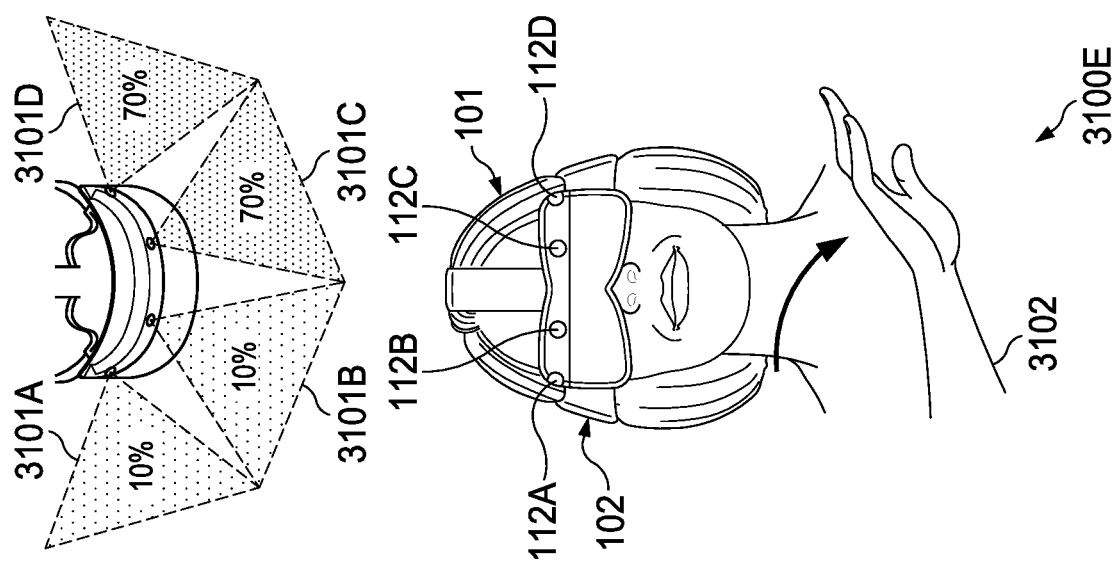

POWER MANAGEMENT FOR GESTURE RECOGNITION IN VIRTUAL, AUGMENTED, AND MIXED REALITY (XR) APPLICATIONS

FIELD

The present disclosure generally relates to Information Handling Systems (IHSs), and, more particularly, to power management for gesture recognition in virtual, augmented, and mixed reality (xR) applications.

BACKGROUND

As the value and use of information continues to increase, individuals and businesses seek additional ways to process and store information. One option available to users is Information Handling Systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

IHSs may be used to produce virtual, augmented, or mixed reality (xR) applications. The goal of virtual reality (VR) is to immerse users in virtual environments. A conventional VR device obscures a user's real-world surroundings, such that only digitally-generated images remain visible. In contrast, augmented reality (AR) and mixed reality (MR) operate by overlaying digitally-generated content or entities (e.g., characters, text, hyperlinks, images, graphics, etc.) upon the user's real-world, physical surroundings. A typical AR/MR device includes a projection-based optical system that displays content on a translucent or transparent surface of an HMD, heads-up display (HUD), eyeglasses, or the like (collectively "HMDs").

In various implementations, HMDs may be tethered to an external or host IHS. Most HMDs do not have as much processing capability as the host IHS, so the host IHS is used to generate the digital images to be displayed by the HMD. The HMD transmits information to the host IHS regarding the state of the user, which in turn enables the host IHS to determine which image or frame to show to the user next, and from which perspective, as the user moves in space.

SUMMARY

Power management systems and methods for gesture recognition in virtual, augmented, and mixed reality (xR) applications is described. In an illustrative, non-limiting embodiment, an Information Handling System (IHS) may include a processor and a memory coupled to the processor, the memory having program instructions stored thereon that, upon execution by the processor, cause the IHS to: receive frames captured by a camera of a Head-Mounted Device (HMD) worn by a user in an xR application, wherein the HMD is coupled to a plurality of infrared (IR) emitters; identify a state of a gesture sequence being performed by the user based upon the frames; and select a level of illumination provided by the plurality of IR emitters in response to the state.

In an idle phase prior to the gesture sequence being performed by the user, the program instructions, upon execution, may also cause the IHS to set the illumination of each of the plurality of IR emitters to a standby level.

In some cases, the state may be a hand detect state, and the program instructions, upon execution, further cause the IHS to, in response to detection of a hand in a first set of frames, set the illumination of at least one of the plurality of IR emitters closest to the hand to a level higher than the standby level. Additionally, or alternatively, the program instructions, upon execution, may cause the IHS to maintain the illumination of at least another one of the plurality of IR emitters farthest from the hand at the standby value. Additionally, or alternatively, the program instructions, upon execution, may cause the IHS to reduce the illumination of at least another one of the plurality of IR emitters farthest from the hand to a value below the standby value.

In other cases, the state may be a start state, and the program instructions, upon execution, further cause the IHS to: identify one or more gesture sequence candidates and select the level of illumination of the plurality of IR emitters based upon calibration data associated with the identified one or more gesture sequence candidates. The program instructions, upon execution, may cause the IHS to: determine that a first gesture sequence candidate requires that a given IR emitter produce a first illumination level; determine that a second gesture sequence candidate requires that the given IR emitter produce a second illumination level; and select a level of illumination for the given IR emitter that meets the highest of the first or second illumination levels.

In some cases, the state may be a motion state, and the program instructions, upon execution, may cause the IHS to: exclude a given gesture sequence candidate from the one or more identified gesture sequence candidates; and select the level of illumination of the plurality of IR emitters based upon calibration data associated with the one or more gesture sequence candidates to the exclusion of the given gesture sequence candidate.

The program instructions, upon execution by the processor, may cause the IHS to: retrieve a first value associated with a first one of the plurality of IR emitters during a calibration procedure; instruct the HMD to apply a first electrical current corresponding to the first value to the first IR emitter; retrieve a second value associated with a second one of the plurality of IR emitters during the calibration procedure; and instruct the HMD to apply a second electrical current corresponding to the second value to the second IR emitter.

In some cases, the first electrical current may have a first magnitude proportional to the first value and the second electrical current may have a second magnitude proportional to the second value. The first electrical current has a first duty cycle proportional to the first value and the second electrical current has a second duty cycle proportional to the second value.

In another illustrative embodiment, a method may include: receiving frames from a camera configured to capture gestures illuminated by IR light sources; identifying a state of a gesture being performed based upon the frames; and individually controlling a brightness of each of the IR light sources in response to the state.

For example, the state of the gesture may be selected from the group consisting of: a hand detect phase, a start phase, a motion phase, and an end phase. Individually controlling the brightness may include applying a first driving current to a given IR light source during the hand detect phase and a second driving current different from the first driving current to the given IR light source during the start phase. Moreover, individually controlling the brightness may further include applying a third driving current different from the second driving current to the given IR light source during the motion phase.

In some cases, the method may include: identifying gesture candidates that potentially match the gesture being performed; retrieving a brightness value of a given IR light source for each of the identified gesture candidates; and selecting a driving current to be applied to the given IR light source during a given state that is proportional the highest brightness value among the identified gesture candidates in the given state.

In yet another illustrative, non-limiting embodiment, a hardware memory device of an HMD may have program instructions stored thereon that, upon execution by a hardware processor, cause the HMD to: illuminate a gesture being performed using a plurality of light sources coupled to the HMD; and control an illumination provided by each of the plurality of light sources based upon a state of the gesture being performed.

The program instructions, upon execution, may cause the HMD to: capture images of the gesture being performed using a camera; transmit the images to an IHS coupled to the HMD, where the IHS is configured to: (a) identify the state of the gesture being performed; and (b) retrieve values corresponding to the illumination for each of the light sources in the identified state; and receive the values from the IHS.

In some implementations, the IHS may be configured to: (a) identify two or more candidate gestures as potentially matching the gesture being performed; (b) retrieve values corresponding to the illumination of each of the light sources for each of the two more candidate gestures; and (c) select the highest value of the two more candidate gestures for each light source. To control the illumination, the program instructions, upon execution, may cause the HMD to vary a magnitude or duty cycle of electrical currents applied to each of the plurality of light sources during different states of the gesture being performed.

BRIEF DESCRIPTION OF THE DRAWINGS

The present invention(s) is/are illustrated by way of example and is/are not limited by the accompanying figures. Elements in the figures are illustrated for simplicity and clarity, and have not necessarily been drawn to scale.

FIGS. 12A-D illustrate examples of one-handed gesture sequences for menu selections, according to some embodiments.

FIGS. 18A and 18B illustrate examples of techniques for restricting access to locked objects, according to some embodiments.

FIG. 19 illustrates an example of a one-handed gesture sequence for bringing up a list of collaborators, according to some embodiments.

FIGS. 20A-C illustrate examples of two-handed gesture sequences for turning a display on or off, according to some embodiments.

FIGS. 23A and 23B illustrate examples of two-handed gesture sequences for minimizing all workspaces, according to some embodiments.

FIGS. 24A, 24B, 25A, and 25B illustrate examples of two-handed gesture sequences for opening and closing files, applications, or workspaces, according to some embodiments.

FIGS. 28A and 28B illustrate examples of two-handed gesture sequences for muting and unmuting audio, according to some embodiments.

FIGS. 30A-E illustrate a first example use-case, according to some embodiments.

FIGS. 31A-E illustrate a second example use-case, according to some embodiments.

DETAILED DESCRIPTION

To facilitate explanation of the various systems and methods discussed herein, the following description has been split into sections. It should be noted, however, that the various sections, headings, and subheadings used herein are for organizational purposes only, and are not meant to limit or otherwise modify the scope of the description or the claims.

Overview

Embodiments described herein provide power management for gesture recognition in virtual, augmented, and mixed reality (xR) applications. These techniques are particularly useful in xR applications that employ HMDs, Heads-Up Displays (HUDs), and eyeglasses—collectively referred to as "HMDs."

Figure 1:
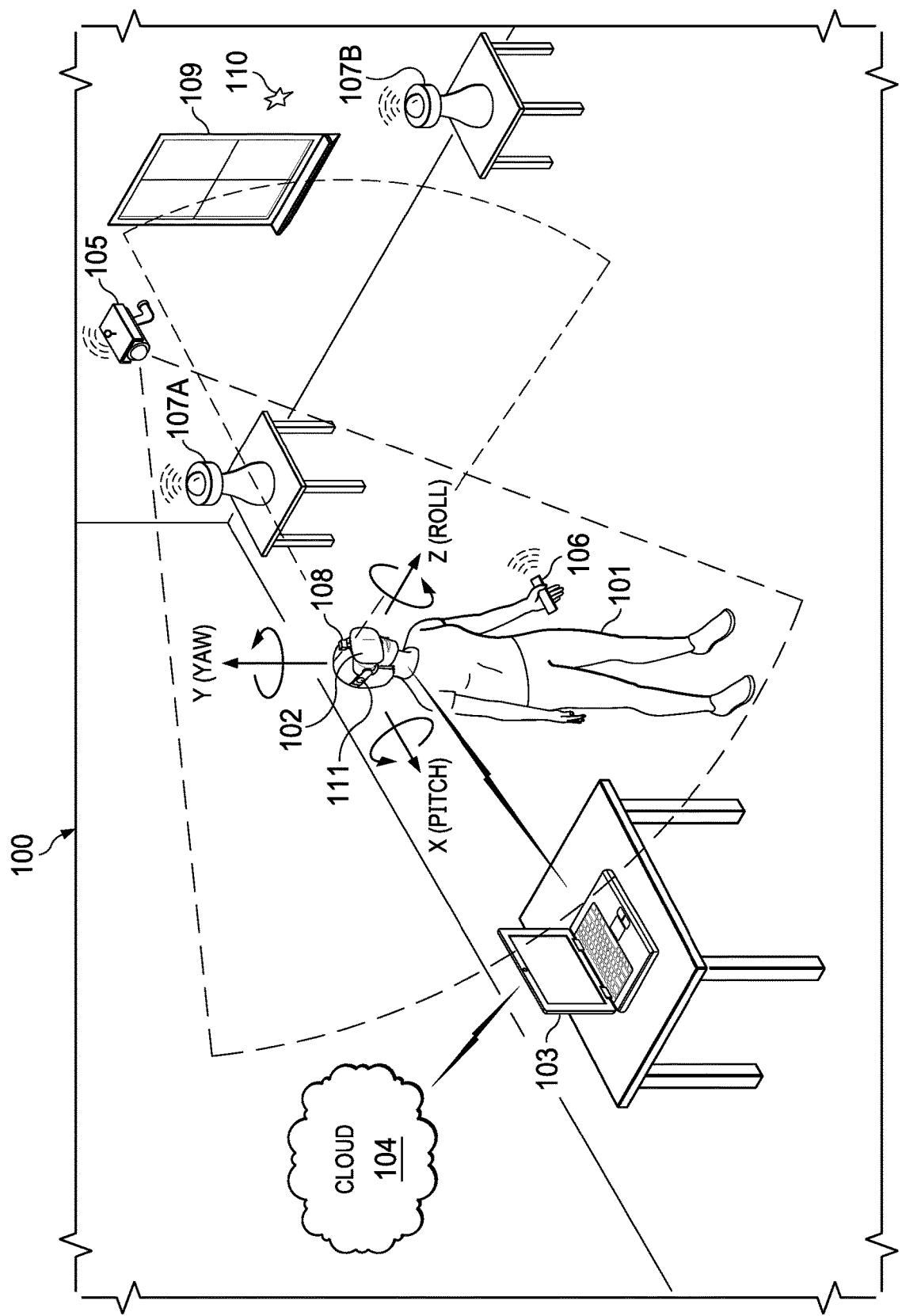
FIG. 1 is a perspective view of an example of an environment where a virtual, augmented, or mixed reality (xR) application may be executed, according to some embodiments.

FIG. 1 is a perspective view of environment 100 where an xR application is executed. As illustrated, user 101 wears HMD 102 around his or her head and over his or her eyes. In this non-limiting example, HMD 102 is tethered to host Information Handling System (IHS) 103 via a wired or wireless connection. In some cases, host IHS 103 may be built into (or otherwise coupled to) a backpack or vest, wearable by user 101.

In environment 100, the xR application may include a subset of components or objects operated by HMD 102 and another subset of components or objects operated by host IHS 103. Particularly, host IHS 103 may be used to generate digital images to be displayed by HMD 102. HMD 102 transmits information to host IHS 103 regarding the state of user 101, such as physical position, pose or head orientation, gaze focus, etc., which in turn enables host IHS 103 to determine which image or frame to display to the user next, and from which perspective. In other embodiments, however, HMD 102 may be an All-In-One (MO) device where all processing is done by HMD 102 itself (i.e., host IHS 103/HMD 102 may be combined).

As user 101 moves about environment 100, changes in: (i) physical location (e.g., Euclidian or Cartesian coordinates x, y, and z) or translation; and/or (ii) orientation (e.g., pitch, yaw, and roll) or rotation, cause host IHS 103 to effect a corresponding change in the picture or symbols displayed to user 101 via HMD 102, in the form of one or more rendered video frames.

Movement of the user's head and gaze may be detected by HMD 102 and processed by host IHS 103, for example, to render video frames that maintain visual congruence with the outside world and/or to allow user 101 to look around a consistent virtual reality environment. In some cases, xR application components executed by HMD 102 and IHSs 103 may provide a cooperative, at least partially shared, xR environment between a plurality of users. For example, each user may wear their own HMD tethered to a different host IHS, such as in the form of a video game or a productivity application (e.g., a virtual meeting).

As used herein, the term SLAM refers systems and methods that use positional tracking devices to construct a map of an unknown environment where an HMD is located, and that simultaneously identifies where the HMD is located, its orientation, and/or pose.

Generally, SLAM methods implemented in connection with xR applications may include a propagation component, a feature extraction component, a mapping component, and an update component. The propagation component may receive angular velocity and accelerometer data from an Inertial Measurement Unit (IMU) built into the HMD, for example, and it may use that data to produce a new HMD position and/or pose estimation. A camera (e.g., a depth-sensing camera) may provide video frames to the feature extraction component, which extracts useful image features (e.g., using thresholding, blob extraction, template matching, etc.), and generates a descriptor for each feature. These features, also referred to as "landmarks," are then fed to the mapping component.

The mapping component may be configured to create and extend a map, as the HMD moves in space. Landmarks may also be sent to the update component, which updates the map with the newly detected feature points and corrects errors introduced by the propagation component. Moreover, the update component may compare the features to the existing map such that, if the detected features already exist in the map, the HMD's current position may be determined from known map points.

To enable positional tracking for SLAM purposes, HMD 102 may use wireless, inertial, acoustic, or optical sensors. And, in many embodiments, each different SLAM method may use a different positional tracking source or device. For example, wireless tracking may use a set of anchors or lighthouses 107A-B that are placed around the perimeter of environment 100 and/or one or more tokens 106 or tags 110 that are tracked; such that HMD 102 triangulates its position and/or state using those elements. Inertial tracking may use data from accelerometers and gyroscopes within HMD 102 to find a velocity (e.g., m/s) and position of HMD 102 relative to some initial point. Acoustic tracking may use ultrasonic sensors to determine the position of HMD 102 by measuring time-of-arrival and/or phase coherence of transmitted and receive sound waves.

Optical tracking may include any suitable computer vision algorithm and tracking device, such as a camera of visible, infrared (IR), or near-IR (NIR) range, a stereo camera, and/or a depth camera. With inside-out tracking using markers, for example, camera 108 may be embedded in HMD 102, and infrared markers 107A-B or tag 110 may be placed in known stationary locations. With outside-in tracking, camera 105 may be placed in a stationary location and infrared markers 106 may be placed on HMD 102 or held by user 101. In others cases, markerless inside-out tracking may use continuous searches and feature extraction techniques from video frames obtained by camera 108 (e.g., using visual odometry) to find natural visual landmarks (e.g., window 109) in environment 100.

In various embodiments, data obtained from a positional tracking system and technique employed by HMD 102 may be received by host IHS 103, which in turn executes the SLAM method of an xR application. In the case of an inside-out SLAM method, for example, an xR application receives the position and orientation information from HMD 102, determines the position of selected features in the images captured by camera 108, and corrects the localization of landmarks in space using comparisons and predictions.

An estimator, such as an Extended Kalman filter (EKF) or the like, may be used for handling the propagation component of an inside-out SLAM method. A map may be generated as a vector stacking sensors and landmarks states, modeled by a Gaussian variable. The map may be maintained using predictions (e.g., when HMD 102 moves) and/or corrections (e.g., camera 108 observes landmarks in the environment that have been previously mapped). In other cases, a map of environment 100 may be obtained, at least in part, from cloud 104.

Figure 2:
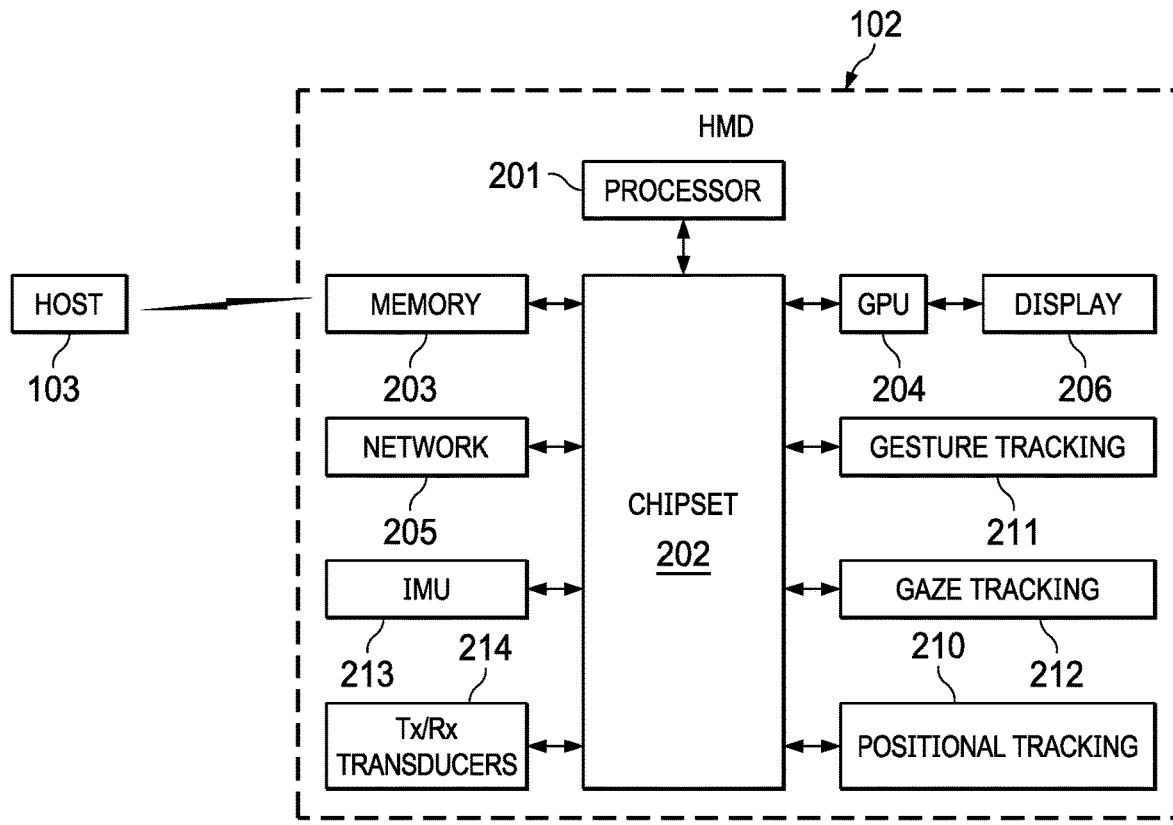
FIG. 2 is a block diagram of an example of a Head-Mounted Device (HMD) and a host Information Handling System (IHS), according to some embodiments.

FIG. 2 is a block diagram of an example HMD 102 and host IHS 103 comprising an xR system, according to some embodiments. As depicted, HMD 102 includes components configured to create and/or display an all-immersive virtual environment; and/or to overlay digitally-created content or images on a display, panel, or surface (e.g., an LCD panel, an OLED film, a projection surface, etc.) in place of and/or in addition to the user's natural perception of the real-world.

As shown, HMD 102 includes processor 201. In various embodiments, HMD 102 may be a single-processor system, or a multi-processor system including two or more processors. Processor 201 may include any processor capable of executing program instructions, such as a PENTIUM series processor, or any general-purpose or embedded processors implementing any of a variety of Instruction Set Architectures (ISAs), such as an x86 ISA or a Reduced Instruction Set Computer (RISC) ISA (e.g., POWERPC, ARM, SPARC, MIPS, etc.).

HMD 102 includes chipset 202 coupled to processor 201. In certain embodiments, chipset 202 may utilize a QuickPath Interconnect (QPI) bus to communicate with processor 201. In various embodiments, chipset 202 provides processor 201 with access to a number of resources. For example, chipset 202 may be coupled to network interface 205 to enable communications via various wired and/or wireless networks.

Chipset 202 may also be coupled to display controller or graphics processor (GPU) 204 via a graphics bus, such as an Accelerated Graphics Port (AGP) or Peripheral Component Interconnect Express (PCIe) bus. As shown, graphics processor 204 provides video or display signals to display 206.

Chipset 202 further provides processor 201 and/or GPU 204 with access to memory 203. In various embodiments, memory 203 may be implemented using any suitable memory technology, such as static RAM (SRAM), dynamic RAM (DRAM) or magnetic disks, or any nonvolatile/Flash-type memory, such as a solid-state drive (SSD) or the like. Memory 203 may store program instructions that, upon execution by processor 201 and/or GPU 204, present an xR application to user 101 wearing HMD 102.

Other resources coupled to processor 201 through chipset 202 may include, but are not limited to: positional tracking system 210, gesture tracking system 211, gaze tracking system 212, and inertial measurement unit (IMU) system 213.

Positional tracking system 210 may include one or more optical sensors (e.g., a camera 108) configured to determine how HMD 102 moves in relation to environment 100. For example, an inside-out tracking system 210 may be configured to implement markerless tracking techniques that use distinctive visual characteristics of the physical environment to identify specific images or shapes which are then usable to calculate HMD 102's position and orientation.

Gesture tracking system 211 may include one or more cameras or optical sensors that enable user 101 to use their hands for interaction with objects rendered by HMD 102. For example, gesture tracking system 211 may be configured to implement hand tracking and gesture recognition in a 3D-space using a gesture camera mounted on HMD 102, such as camera 108. In some cases, gesture tracking system 211 may track a selectable number of degrees-of-freedom (DOF) of motion, with depth information, to recognize gestures (e.g., swipes, clicking, tapping, grab and release, etc.) usable to control or otherwise interact with xR applications executed by HMD 102, and various one and two-handed gesture sequences described in more detail below.

Additionally, or alternatively, gesture tracking system 211 may include one or more ultrasonic sensors 111 configured to enable Doppler shift estimations of a reflected acoustic signal's spectral components.

Gaze tracking system 212 may include an inward-facing projector configured to create a pattern of infrared or (near-infrared) light on the user's eyes, and an inward-facing camera configured to take high-frame-rate images of the eyes and their reflection patterns; which are then used to calculate the user's eye's position and gaze point. In some cases, gaze detection or tracking system 212 may be configured to identify a direction, extent, and/or speed of movement of the user's eyes in real-time, during execution of an xR application.

IMU system 213 may include one or more accelerometers and gyroscopes configured to measure and report a specific force and/or angular rate of the user's head. In some cases, IMU system 212 may be configured to a detect a direction, extent, and/or speed of rotation (e.g., an angular speed) of the user's head in real-time, during execution of an xR application.

Transmit (Tx) and receive (Rx) transducers and/or transceivers 214 may include any number of sensors and components configured to send and receive communications using different physical transport mechanisms. For example, Tx/Rx transceivers 214 may include electromagnetic (e.g., radio-frequency, infrared, etc.) and acoustic (e.g., ultrasonic) transport mechanisms configured to send and receive communications, to and from other HMDs, under control of processor 201. Across different instances of HMDs, components of Tx/Rx transceivers 214 may also vary in number and type of sensors used. These sensors may be mounted on the external portion of frame of HMD 102, for example as sensor 111, to facilitate direct communications with other HMDs.

In some implementations, HMD 102 may communicate with other HMDs and/or host IHS 103 via wired or wireless connections (e.g., WiGig, WiFi, etc.). For example, if host IHS 103 has more processing power and/or better battery life than HMD 102, host IHS 103 may be used to offload some of the processing involved in the creation of the xR experience.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components.

In various embodiments, HMD 102 and/or host IHS 103 may not include each of the components shown in FIG. 2. Additionally, or alternatively, HMD 102 and/or host IHS 103 may include components in addition to those shown in FIG. 2. For example, HMD 102 may include a monaural, binaural, or surround audio reproduction system with one or more internal loudspeakers. Furthermore, components represented as discrete in FIG. 2 may, in some embodiments, be integrated with other components. In various implementations, all or a portion of the functionality provided by the illustrated components may be provided by components integrated as a System-On-Chip (SOC), or the like.

Gesture Sequence Recognition

HMDs are starting to find widespread use in the workplace, enabling new user modalities in fields such as construction, design, and engineering; as well as in real-time critical functions, such as first-responders and the like. In these types of applications, it may be desirable to perform various application or User Interface (UI) actions, through the use of gesture sequences, for expediting purposes and/or for convenience. While menus (e.g., a list of options or commands presented to the user) and voice commands (less feasible in noisy environments) are still useful, gesture sequences are valuable expediting input mechanisms.

Given the wide range of use-cases, it becomes desirable for the HMD wearer to be able to execute one-handed and two-handed gesture sequences, depending upon context, operation, and application. It therefore becomes critical to be able to recognize, differentiate between one-handed and two-handed gesture modes, and to be able to track through the start, motion, and end phases of a gesture sequence. The recognized gesture sequence may be mapped to an action (e.g., minimize workspace), to an application (e.g., a video game or productivity software), or to an UI command (e.g., menu open).

Figure 3:
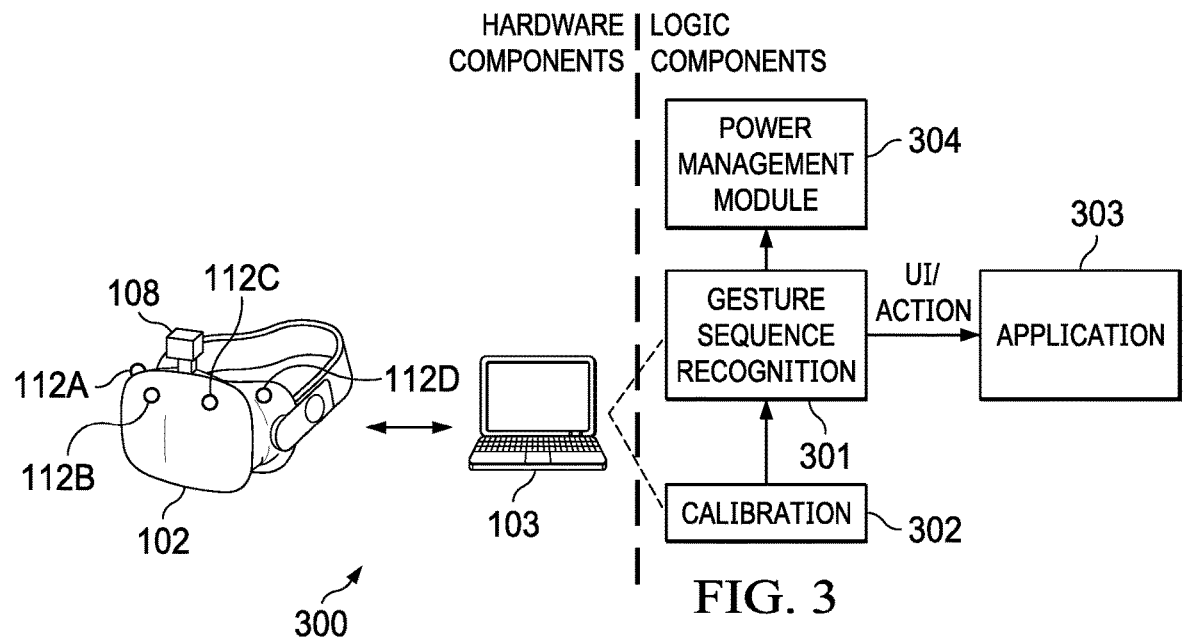
FIG. 3 is a block diagram of an example of a gesture sequence recognition system, according to some embodiments.

FIG. 3 is a block diagram of an example of gesture sequence recognition system 300. In various embodiments, logic components or modules 301-304 of system 300 may be stored in a memory, in the form of program instructions, that are executable by a processor. Hardware components of system 300 may include gesture tracking hardware 211, such as gesture camera 108 and infrared light sources 112A-D mounted on HMD 102. Examples of light sources 112-D include a set of infrared (IR) light-emitting diodes (LEDs). Additionally, or alternatively, system 300 may employ Ambient Light Sensor (ALS) and/or ultrasonic transceiver(s) 111.

Generally, gesture detection begins when video frame data (e.g., a video or depth-video stream) is received at host IHS 103 from camera 108 of HMD 102. In some implementations, the video data may have already been processed, to some degree, by gesture tracking component 211 of HMD 102. Then, the video data is further processed by gesture sequence recognition component 301 using calibration component 302 to control aspects of xR application 303, by identifying various gestures and gesture sequences that constitute user input to xR application 303, as further described below.

Generally, at least a portion of user 101 may be identified in the video frame data obtained using camera 108 using gesture sequence recognition component 301. For example, through image processing, a given locus of a video frame or depth map may be recognized as belonging to user 101. Pixels that belong to user 101 (e.g., arms, hands, fingers, etc.) may be identified, for example, by sectioning off a portion of the video frame or depth map that exhibits above-threshold motion over a suitable time scale, and attempting to fit that section to a generalized geometric model of user 101. If a suitable fit is achieved, then pixels in that section may be recognized as those of user 101.

In some embodiments, gesture sequence recognition component 301 may be configured to analyze pixels of a video frame or depth map that correspond to user 101, in order to determine what part of the user's body each pixel represents. A number of different body-part assignment techniques may be used. In an example, each pixel of the video frame or depth map may be assigned a body-part index. The body-part index may include a discrete identifier, confidence value, and/or body-part probability distribution indicating the body part or parts to which that pixel is likely to correspond.

For example, machine-learning may be used to assign each pixel a body-part index and/or body-part probability distribution. Such a machine-learning method may analyze a user with reference to information learned from a previously trained collection of known gestures and/or poses stored in calibration component 302. During a supervised training phase, for example, a variety of gesture sequences may be observed, and trainers may provide label various classifiers in the observed data. The observed data and annotations may then be used to generate one or more machine-learned algorithms that map inputs (e.g., observation data from a depth camera) to desired outputs (e.g., body-part indices for relevant pixels).

Thereafter, a partial virtual skeleton may be fit to at least one body part identified. In some embodiments, a partial virtual skeleton may be fit to the pixels of video frame or depth data that correspond to a human arm, hand, and/or finger(s). A body-part designation may be assigned to each skeletal segment and/or each joint. Such virtual skeleton may include any type and number of skeletal segments and joints, including each individual finger.

In some embodiments, each joint may be assigned a number of parameters, such as, for example, Cartesian coordinates specifying joint position, angles specifying joint rotation, and other parameters specifying a conformation of the corresponding body part (e.g., hand open, hand closed, etc.), etc. Skeletal-fitting algorithms may use the depth data in combination with other information, such as color-image data and/or kinetic data indicating how one locus of pixels moves with respect to another. Moreover, a virtual skeleton may be fit to each of a sequence of frames of depth video. By analyzing positional change in the various skeletal joints and/or segments, certain corresponding movements that indicate predetermined gestures, actions, or behavior patterns of user 101 may be identified.

In other embodiments, the use of a virtual skeleton may not be necessary. For example, in other implementations, raw point-cloud data may be sent directly to a feature extraction routine within gesture sequence recognition component 301.

In various embodiments, power management module 304 may be configured to implement power management for gesture recognition system 300. For example, depending upon the state of a gesture being tracked by gesture sequence recognition component 301, HMD 102 may apply different amounts of power to each of light sources 112A-D. These, and other power management techniques, are described in more detail below.

Figure 4:
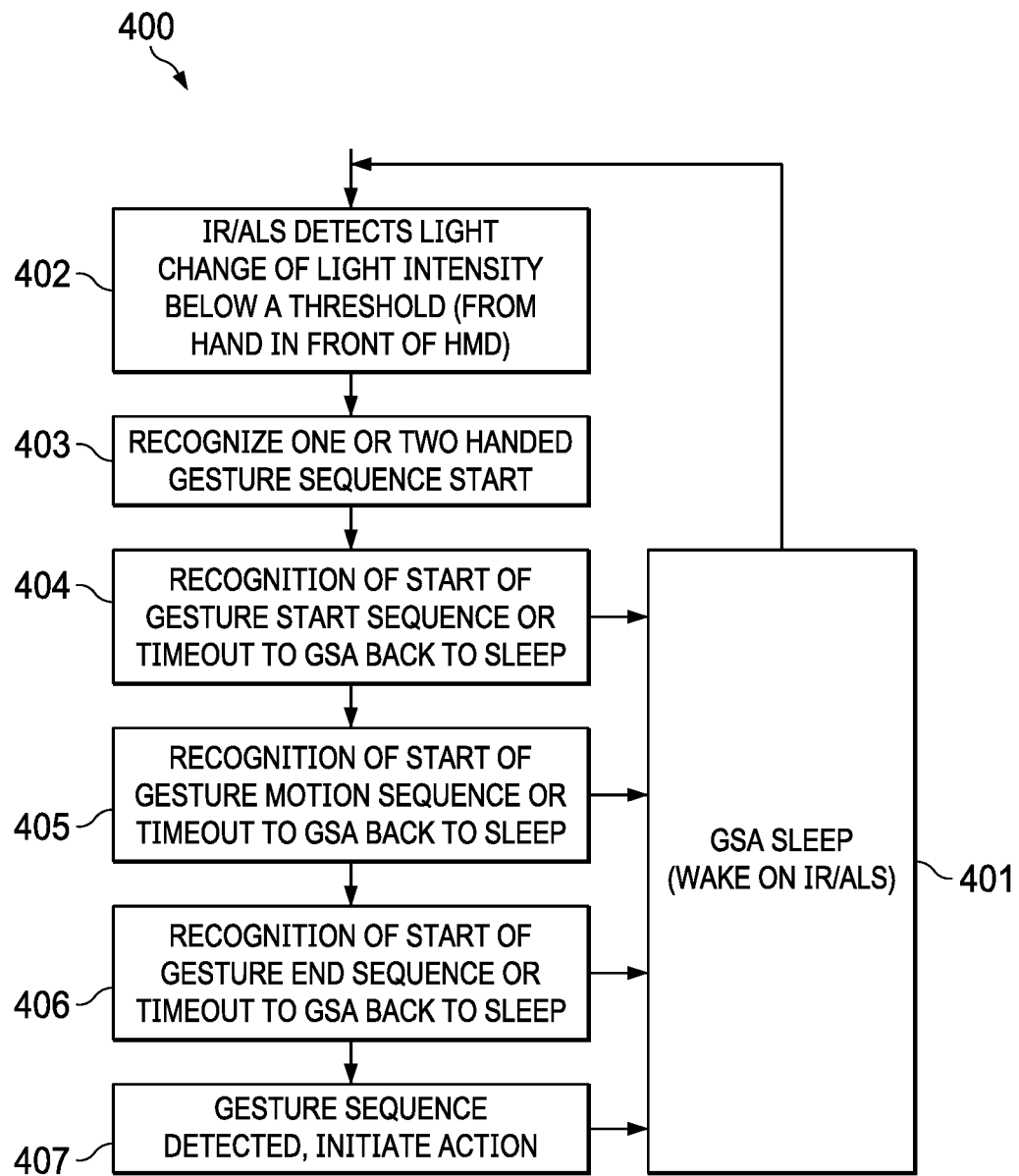
FIG. 4 is a flowchart of an example of a gesture sequence recognition method, according to some embodiments.

FIG. 4 is a flowchart of an example of gesture sequence recognition method (GSA) 400. In various embodiments, method 400 may be executed by gesture sequence recognition component 301 in cooperation with calibration component 302 of FIG. 3. As illustrated, method 400 may include the setup, detection, and differentiation between one-handed and two-handed gesture sequences for the start, motion, and end states of a gesture sequence, with hysteresis and control tracking of states together with single-gesture recognition techniques, using a maximum of frame detects with user motion velocity and asynchrony calibration to enhance probability of accuracy across multiple video frames.

Particularly, each "gesture sequence," as the term is used herein, has a Start phase (S) with a standalone gesture, a motion phase (M) with a sequence of gestures following each other, and an end phase (E) with another standalone gesture. In some cases, E may be the last gesture in the sequence (end state) of M.

In some embodiments, a look-up tables may be used to store key attributes and/or reference images of start, motion, and end phases for each gesture sequence to be recognized, for two-handed and one-handed cases. As used herein, the term "look-up table" or "LUT" refers to an array or matrix of data that contains items that are searched. In many cases, LUTs may be arranged as key-value pairs, where the keys are the data items being searched (looked up) and the values are either the actual data or pointers to where the data are located.

A setup or calibration phase may store user-specific finger/hand/arm attributes (e.g., asking user 101 to splay fingers), such as motion velocity or asynchrony. For example, a start or end phase LUT may include reference images or attributes, whereas a motion phase LUT may include relative 6-axes or the like.

The amount of time user 101 has to hold their hands and/or fingers in position for each phase of gesture sequence (S, M, and E) may be configurable: the number of gesture camera frames for each phase may be given by F_S, F_M, and F_E, respectively. In many cases, F_S and F_E should be greater 1 second, whereas F_M should be at least 1 second (e.g., at 30 fps, a configuration may be F_S=30, F_M=45, F_E=30).

At block 401, method 400 is in sleep mode, and it may be woken in response to infrared IR or ALS input. At block 402, method 400 starts in response to IR/ALS detection of a decrease in captured light intensity (e.g., caused by the presence of a hand of user 101 being placed in front of HMD 102). At block 403, method 400 recognizes a one or two-handed gesture sequence start. At block 404, method 400 performs recognition of the start phase of a gesture sequence (or it times out to block 401). At block 405, method 400 performs recognition of the motion phase of the gesture sequence (or it times out to block 401). And, at block 406, method 400 performs recognition of the end phase of the gesture sequence (or it times out to block 401).

Then, at block 407, method 400 identifies the gesture sequence and initiates a corresponding action. In some embodiments, method 400 may be used to launch a process, change a setting of the host IHS 103's Operating System (OS), shift input focus from one process to another, or facilitate other control operations with respect to xR application 303. The mapping of each gesture-hand-S-M-E tuple to an action may be performed by a user, or it may be set by default.

As such, method 400 receives gesture camera frame inputs, recognizes states (S, M, E) of a gesture sequence, differentiates between one-handed and two-handed sequences on each frame, tracks the state of start, motion, and end phases using hysteresis and LUTs with timeouts, and maps a recognized gesture to an action in UI or application.

Figure 5A:
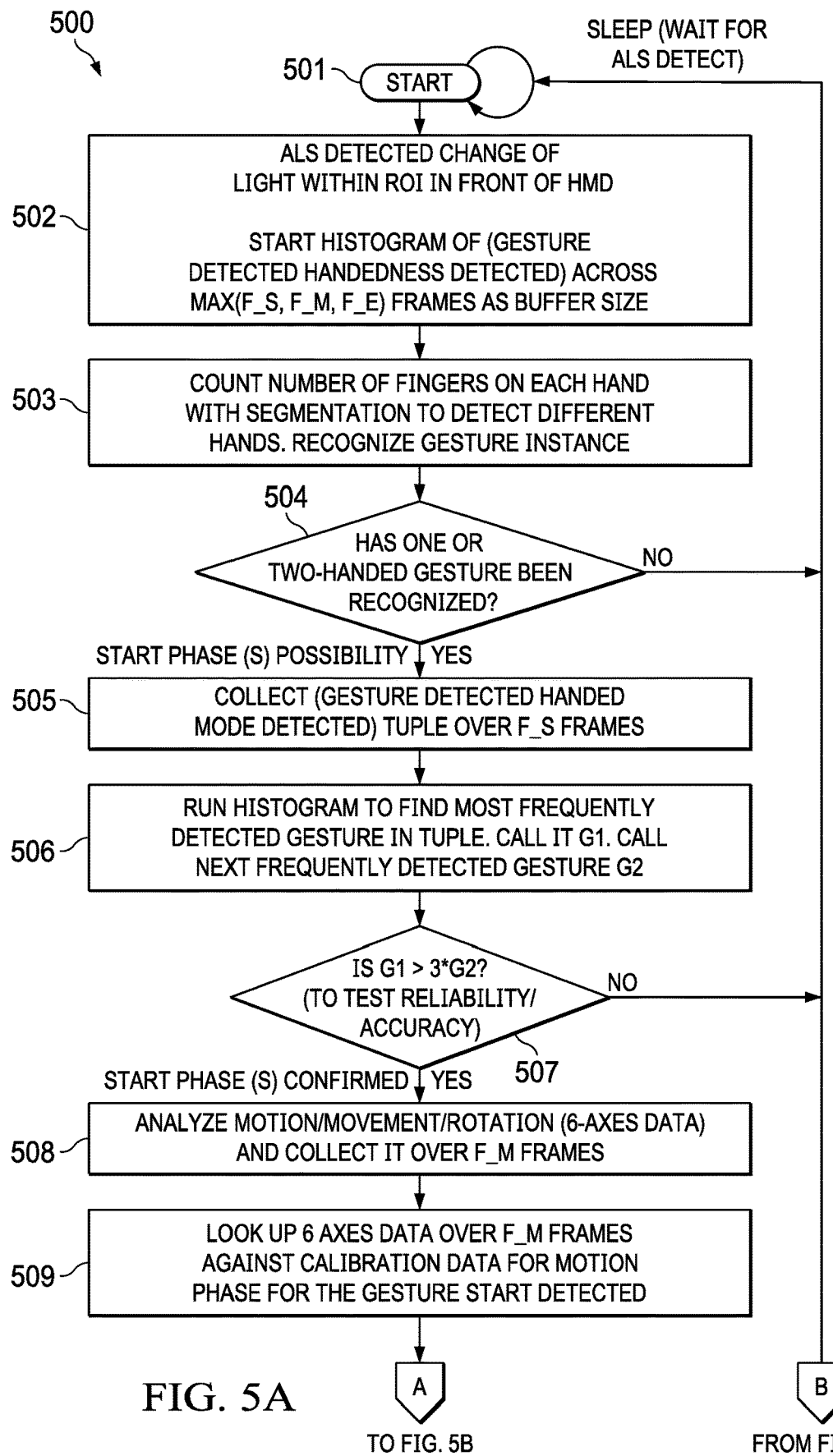
FIGS. 5A and 5B are a flowchart of an example of a method for distinguishing between one-handed and two-handed gesture sequences, according to some embodiments.
Figure 5B:
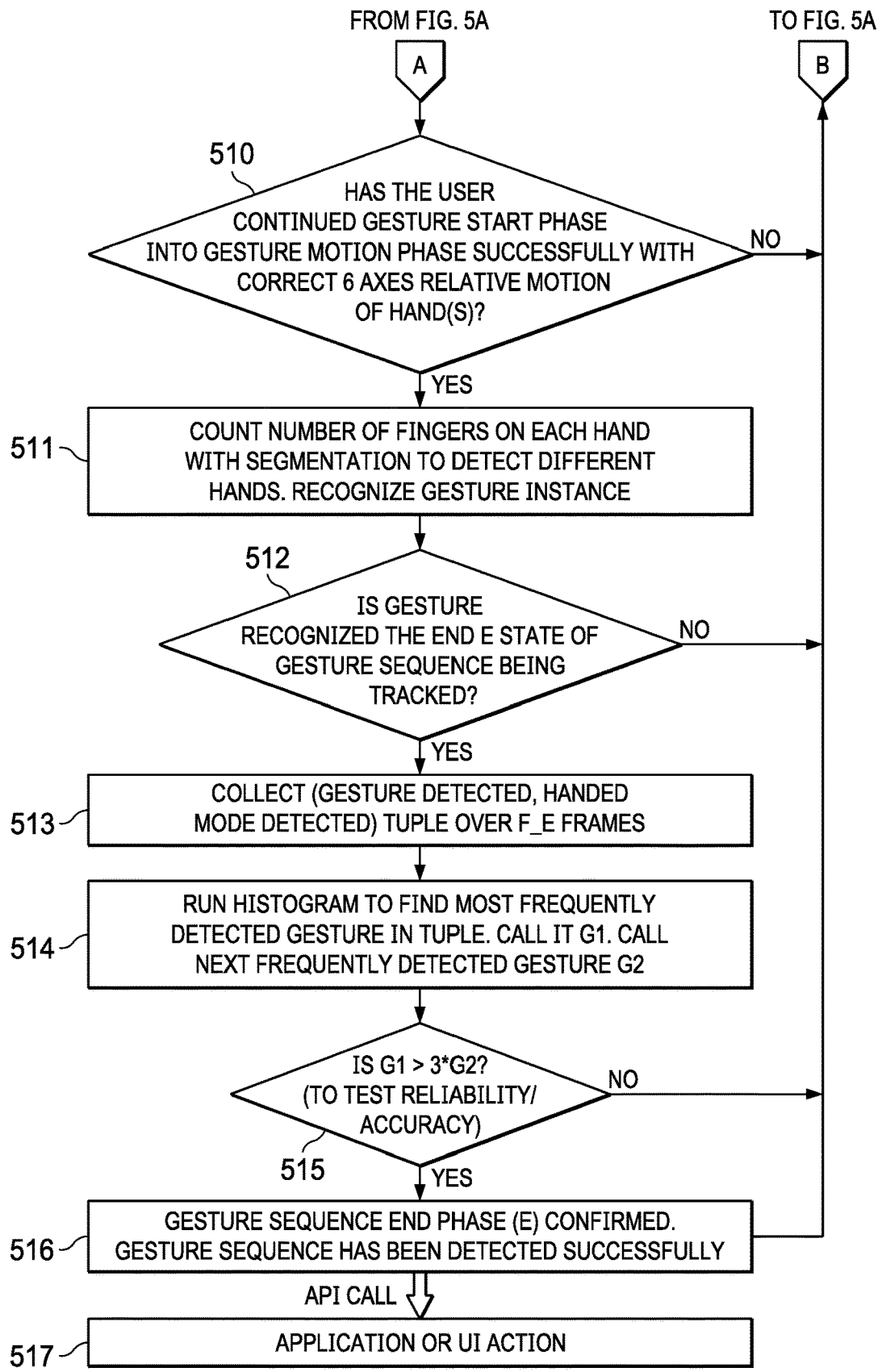

FIGS. 5A and 5B are a flowchart of method 500 for distinguishing between one-handed and two-handed gesture sequences, as described in block 403 of FIG. 4. In various embodiments, method 500 may be performed by gesture sequence recognition component 301 in cooperation with calibration component 302.

Particularly, method 500 begins at block 501 in sleep mode (e.g., waiting for an ALS event, or the like). At block 502, in response to the ALS detecting a change of light within a region-of-interest (ROI) in front of HMD 102, method 500 starts a histogram of [gesture detected, handedness detected] across a maximum number of F_S, F_M, and F_E frames as a buffer size allows.

At block 503, method 500 may extract a first set of features from each of a first set of video frames and it may count the number of fingers on each hand, for example, using segmentation techniques to detect different hands and to recognize a gesture instance. For example, a hand may be first detected using a background subtraction method and the result of hand detection may be transformed to a binary image. Fingers and palm may be segmented to facilitate detection and recognition. And hand gestures may be recognized using a rule classifier.

If block 504 determines that neither a one nor a two-handed gesture has been recognized, control returns to block 501. For example, an ALS event may be determined to be a false alarm if user 101 accidentally moves his or her hand (or moves it without intention to gesture) or if the ambient light actually changes.

Conversely, if block 504 determines that a gesture has been recognized, this marks the possible beginning of the start phase of the gesture sequence. At block 505, method 500 collects [gesture detected, handed-mode detected] tuple over F_S frames. Then, at block 506, method 500 runs a histogram to find a most frequently detected gesture G1, and a second most detected gesture G2. At block 507, if G1 is not greater than G2 by at least a selected amount (e.g., 3 times to ensure accuracy), control returns to block 501.

If block 507 determines that G1 is greater than G2 by the selected amount, this confirms the start phase and begins the motion phase of the gesture sequence. At block 508, method 500 analyzes motion, movement, and/or rotation (e.g., using 6-axes data) collected over F_M frames. For example, block 508 may apply a Convolutional Neural Network (CNN) that handles object rotation explicitly to jointly perform object detection and rotation estimation operations.

At block 509, method 500 looks up 6-axes data over F_M frames against calibration data for the motion phase. A calibration procedure may address issues such each user having different sized fingers and hands, and also how different users execute the same motion phase with different relative velocities. Accordingly, a user-specific calibration procedure may be performed by calibration component 302 prior to execution of method 500, may measure and store user's typical velocity or speed in motion phase across different gestures.

At block 510, if user 101 has not successfully continued the gesture sequence's start phase into the motion phase with correct 6-axes relative motion of arm(s), hand(s), and/or finger(s), control returns to block 501. Otherwise, block 510 confirms the motion phase and begins the end phase of the gesture sequence. At block 511, method 500 may extract a second set of features from each of a second set of video frames to count the number of fingers on each hand, for example, using segmentation techniques to detect different hands and to recognize a gesture instance. If block 512 determines that the recognized gesture is not the end state of the gesture sequence being tracked, control returns to block 501.

Otherwise, at block 513, method 500 collects [gesture detected, handed-mode detected] tuple over F_E frames. At block 514, method 500 runs a histogram to find a most frequently detected gesture G1, and a second most detected gesture G2. At block 515, if G1 is not greater than G2 by at least a selected amount (e.g., 3 times to ensure accuracy), control returns to block 501. Otherwise, at block 516, the end phase of the gesture sequence is confirmed and the sequence is successfully identified, which can result, for example, in an Application Programming Interface (API) call to application or UI action at block 517.

Accordingly, in various embodiments, method 500 may include receiving a gesture sequence from an HMD configured to display an xR application, and identifying the gesture sequence as: (i) a one-handed gesture sequence, or (ii) a two-handed gesture sequence.

In an example use-case, user 101 may start with a one-handed gesture sequence, but then decides to perform a different gesture sequence with the other hand. In that case, method 500 may be capable of detecting two distinct one-handed gesture sequences applied in serial order, instead of a single two-handed gesture sequence.

Particularly, LUTs may be used to detect differences between a two-handed gesture-sequence start versus two one-handed gesture-sequence start. Method 500 may use multiple frames of logical "AND" and "MAX" operations along with user-specific calibration detect two hands in at least one of the second set of video frames; and in response to a comparison between the first and second sets of features, method 500 may identify the gesture sequence as a first one-handed gesture sequence made with one hand followed by a second one-handed gesture sequence made with another hand. For gesture sequences that generate false positives, a serial non-reentrant variant of method 500 may be implemented.

In another example use-case, user 101 may perform a two-handed gesture sequence, but due to natural human asynchronicity (e.g., both hands do not start simultaneously), user 101 may have a time difference between the hands gesture being detected by or appearing in front of HMD 102. In those cases, method 500 may detect only one hand in at least one of the second set of video frames; and in response to a comparison between the first and second sets of features, method 500 may identify the gesture sequence as a two-handed gesture sequence. To achieve this, method 500 may perform a table look-up operation using calibration data that includes an indication of the user's asynchronicity (e.g., an amount of time in milliseconds) during the motion phase.

In sum, method 500 allows users to use gesture sequences with one or two hands for different purposes, where voice commands or menu are not feasible to use (e.g., noisy environments, like factories) or where silence is essential without giving away location (e.g., first responders). In various embodiments, method 500 may be implemented without hardware dependency or additions, by using host-based algorithms, as a cross-platform service or application, with API access for recognized gestures.

Figure 6:
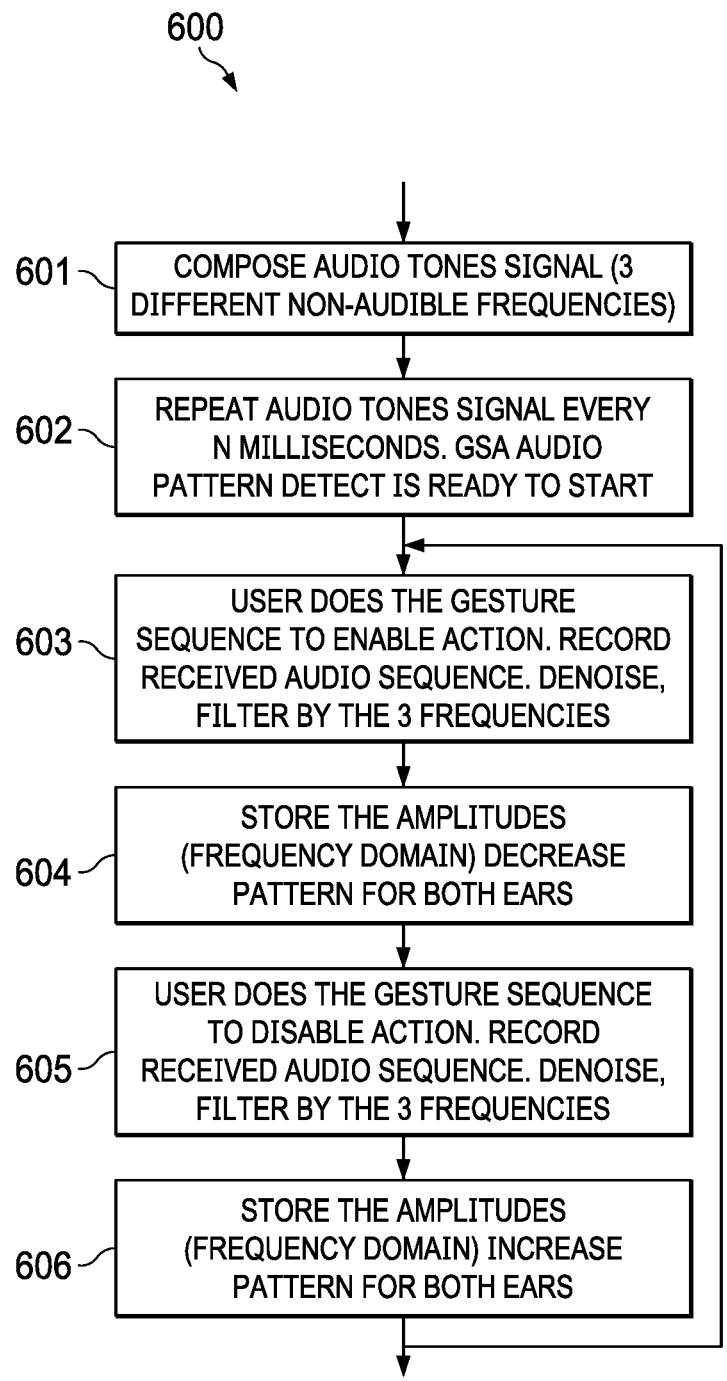
FIG. 6 is a flowchart of an example of a method for calibrating gesture sequences using acoustic techniques, according to some embodiments.

FIG. 6 is a flowchart of an example of method 600 for calibrating gesture sequences using acoustic techniques. In various embodiments, method 600 may be performed by calibration component 302 operating ultrasonic transceiver(s) 111 mounted on HMD 102. At block 601, method 600 composes an audio signal with a selected number of non-audible, ultrasonic frequencies (e.g., 3 different frequencies). Block 602 repeats the audio signal every N milliseconds, such that Doppler detection and recognition of audio patterns starts.

At block 603, user 101 performs a gesture sequence to enable a selected action, records the received audio signal, de-noises it, and filters the discrete frequencies. Block 604 stores the amplitude decrease (in the frequency domain) for both of the user's ears, with transceivers 111 on both sides of HMD 102. At block 605, user 101 performs another gesture sequence to disable the selected action, records another received audio signal, de-noises it, and again filters the discrete frequencies. Block 606 stores the amplitude increase (in the frequency domain) for both ears, and method 600 may return to block 603 for the calibration of another gesture sequence.

Figure 7:
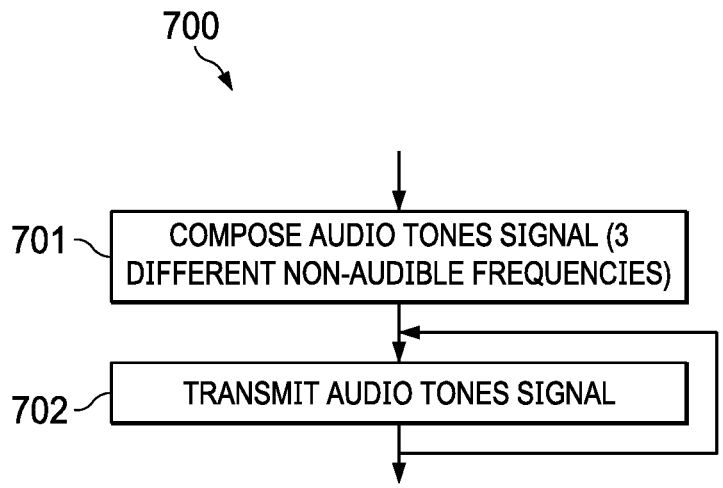
FIGS. 7 and 8 are flowcharts of examples of methods for recognizing gesture sequences using acoustic techniques, according to some embodiments.
Figure 8:
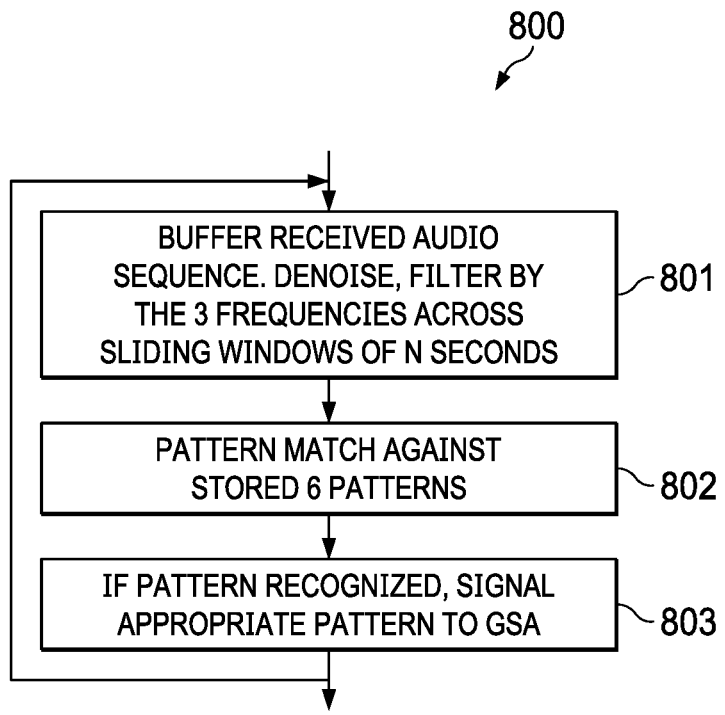
Figure 9B:
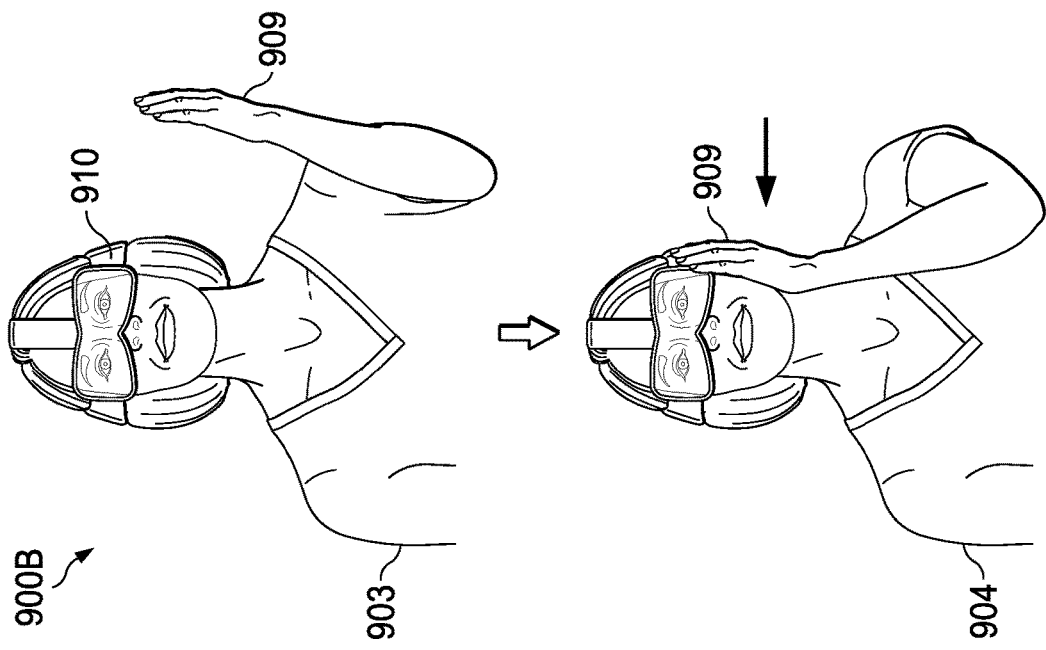
FIGS. 9A-D illustrate examples of one-handed gesture sequences for muting and unmuting audio, according to some embodiments.
Figure 9A:
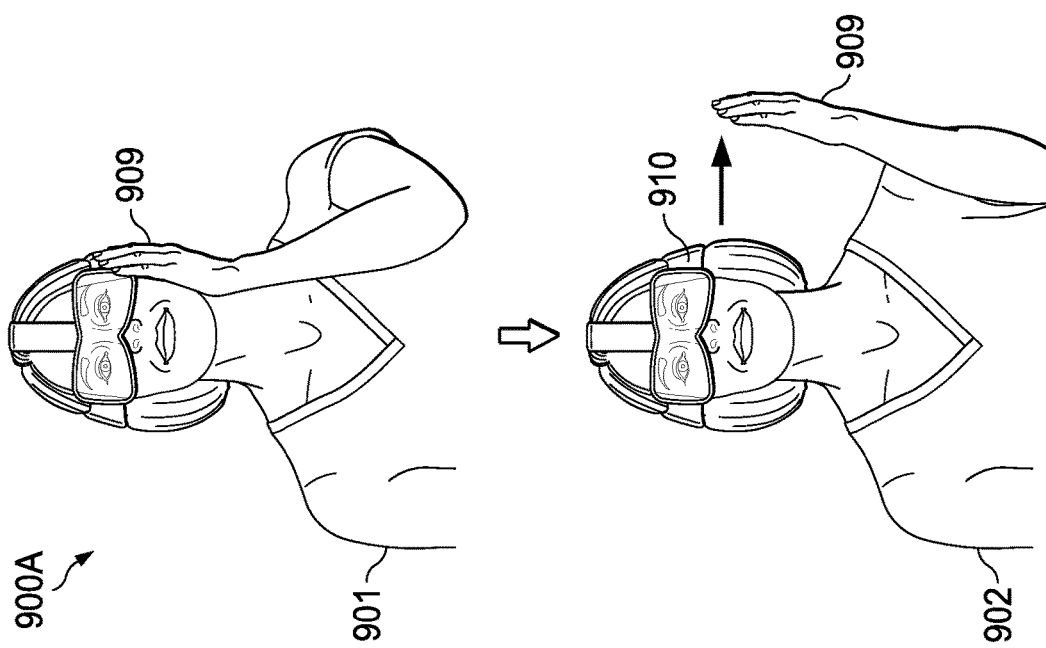
Figure 9D:
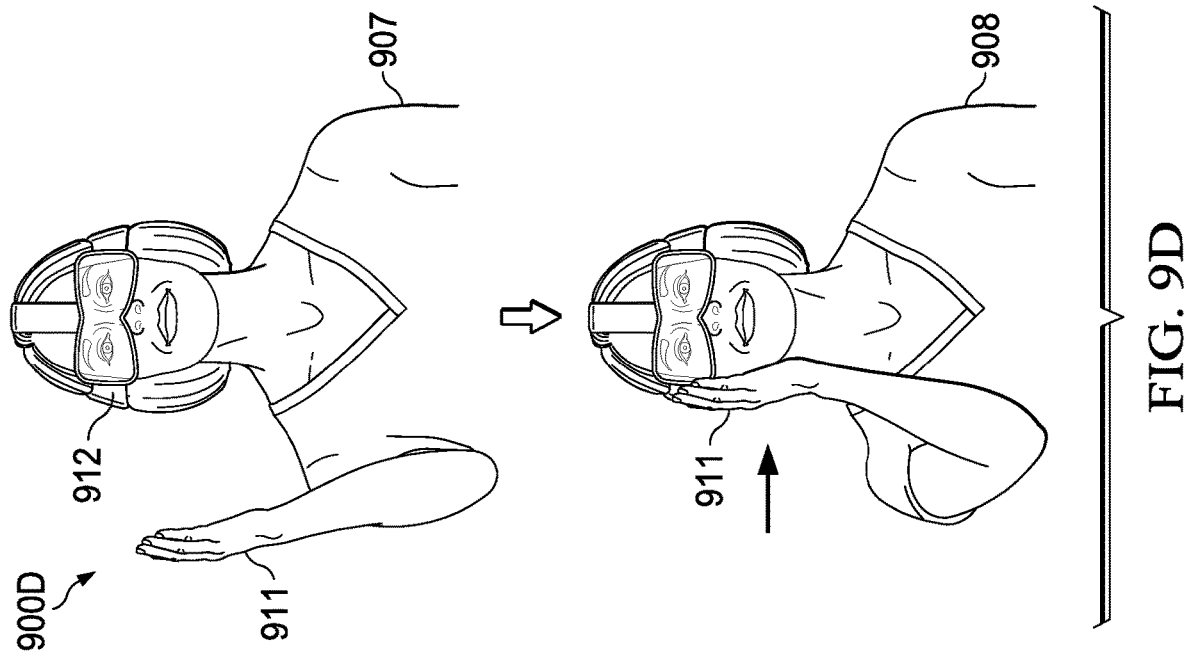
Figure 9C:
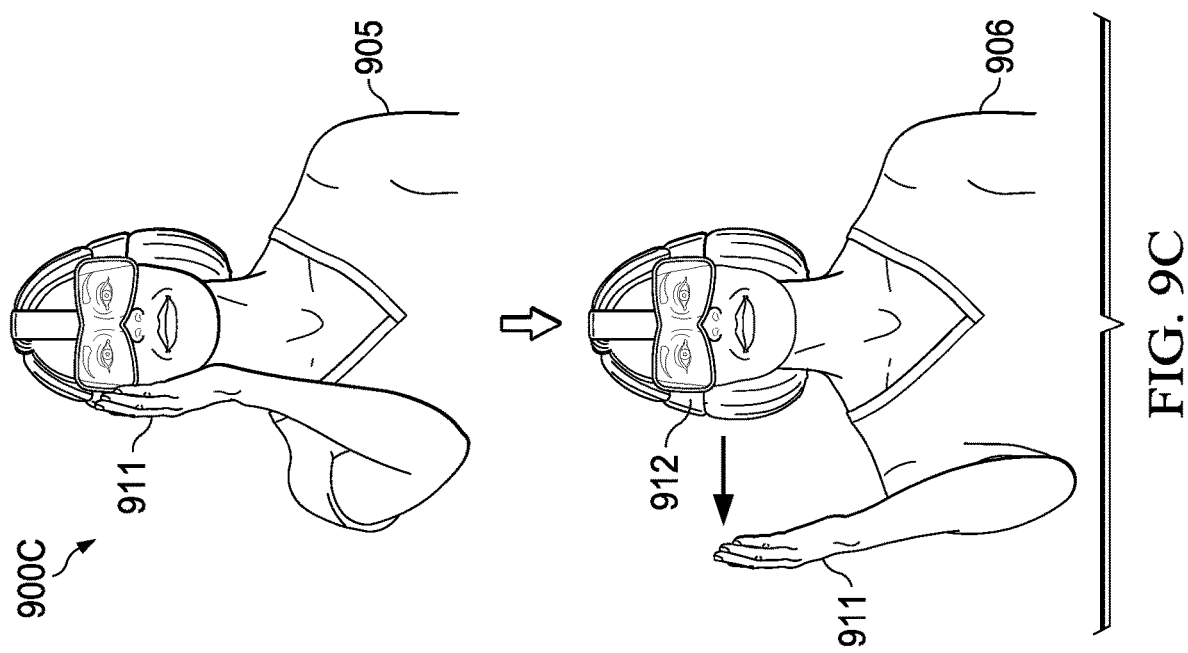

FIGS. 7 and 8 are flowcharts of examples of methods for recognizing gesture sequences using acoustic techniques, in steady state. Again, methods 700 and 800 may be performed by gesture sequence recognition component 301 operating ultrasonic transceiver(s) 111 mounted on HMD 102. At block 701, method 700 composes an audio tone signal (e.g., with three different discrete ultrasonic frequencies). Block 702 transmits the signal via HMD 102.

At block 801, method 800 buffers a received audio pattern (resulting from the transmission of block 702), de-noises it, and filters by the three frequencies across sliding windows of N seconds, to perform Doppler shift estimations of the measured signal spectral components. At block 802, method 800 performs pattern matching operations against other stored patterns. Then, at block 803, if the received pattern is recognized, the gesture sequence is identified, and control returns to block 801.

In various embodiments, methods 600-800 may be performed for gesture sequences that take place at least partially outside the field-of-view of a gesture camera, for example, near the side of the user's head. Moreover, visual gesture sequence recognition method 500 and ultrasonic gesture sequence recognition methods 600-800 may be combined, in a complementary manner, to provide a wider range of gesturing options to user 101.

One-Handed Gesture Sequences

Systems and methods described herein may be used to enable different types of one-handed gesture sequence recognition in xR HMDs.

In some embodiments, gesture sequence detection system 300 may employ methods 600-800 to perform ultrasonic-based (111) detection of one-handed gesture sequences. For example, FIGS. 9A-D illustrate one-handed gesture sequences for muting and unmuting audio using lateral sensors 111, as opposed to gesture camera 108.

In gesture sequence 900A, starting position 901 shows a user covering her left ear 910 with the palm of her left hand 909, followed by motion 902, where the left hand 909 moves out and away from the user, uncovering her left ear 910. In response to detecting gesture sequence 900A, a previously muted left audio channel (e.g., reproduced by a left speaker in the HMD) is unmuted; without changes to the operation of the right audio channel. Additionally, or alternatively, a volume of the audio being reproduced in the left audio channel may be increased, also without affecting the right audio channel.

In gesture sequence 900B, starting position 903 shows a user with her left hand 909 out and away by a selected distance, followed by motion 904 where the user covers her left ear 910 with the palm of her left hand 909. In response to detecting gesture sequence 900B, the left audio channel may be muted, or its volume may be reduced, without changes to the operation of the right audio channel.

In gesture sequence 900C, starting position 905 shows a user covering her right ear 912 with the palm of her right hand, followed by motion 906 where the right hand 911 moves out and away from the user, uncovering her right ear 912. In response to detecting gesture sequence 900C, a previously muted right audio channel (e.g., reproduced by the right speaker within the HMD) is unmuted, or a volume of the audio being reproduced in the right audio channel may be increased, without affecting the left audio channel.

In gesture sequence 900D, starting position 907 shows a user with her right hand 911 out and away by a selected distance, followed by motion 908, where the user covers her right ear 912 with the palm of her right hand 911. In response to detecting gesture sequence 900D, the right audio channel may be muted, or its volume may be reduced, without changes to the operation of the left audio channel.

In various other implementations, gesture sequence detection system 300 may employ methods 400 and/or 500 to perform camera-based detection of one-handed gesture sequences.

Figure 10A:
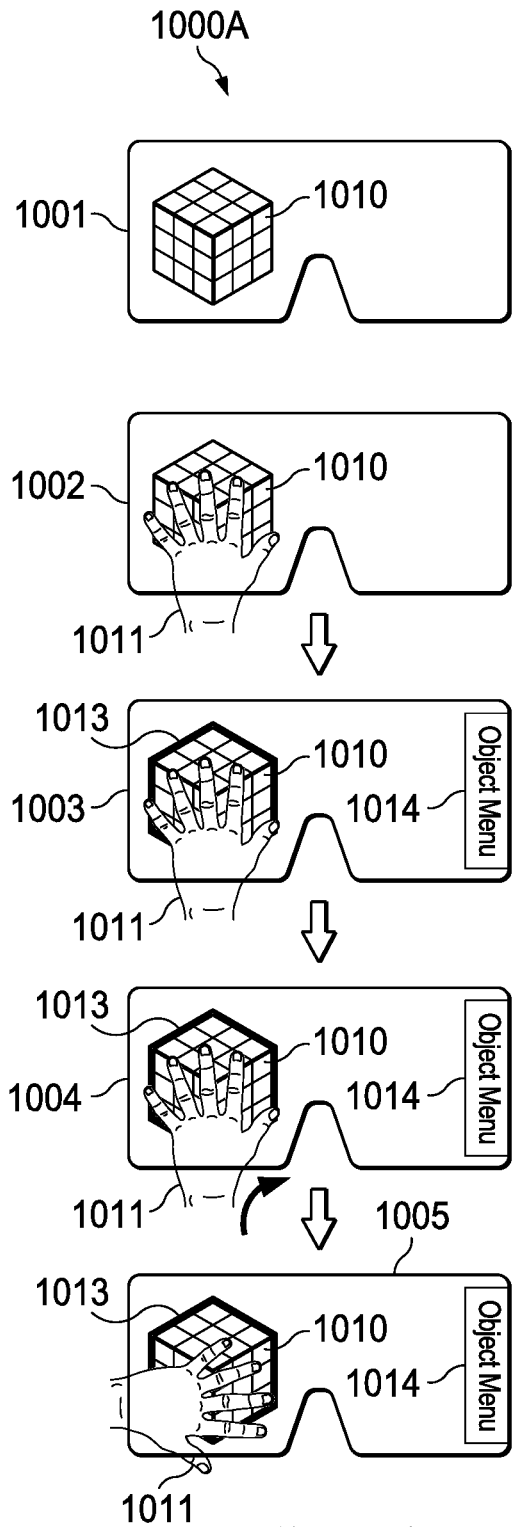
FIGS. 10A and 10B illustrate examples of one-handed gesture sequences for selecting and deselecting objects, according to some embodiments.
Figure 10B:
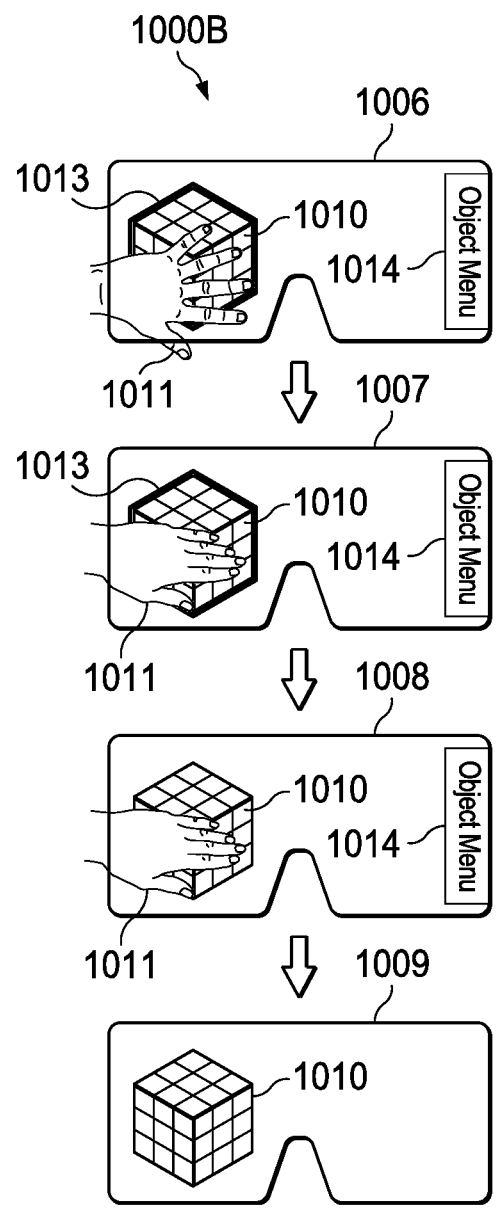

For example, FIGS. 10A and 10B illustrate examples of one-handed gesture sequences for selecting and deselecting objects, respectively. In select gesture sequence 1000A, frame 1001 shows xR object 1010 (e.g., a digitally-produced cube) being displayed by an HMD. A start phase, illustrated in frame 1002, shows user's hand 1011 with palm out hovering over xR object 1010 with fingers spread apart. After a selected period of time, such as a motion phase, visual effect 1013 (e.g., surround highlighting) may be added to at least a portion of xR object 1010 in order to indicate its current selection, as shown in frame 1003. Additionally, or alternatively, menu 1014 associated with xR object 1010 may be displayed. Then, in response to the selection, frames 1004 and 1005 show xR object 1010 being rotated and translated following the user's hand direction, position, and/or location.

In deselect gesture sequence 1000B, frame 1006 shows an already selected xR object 1010 (e.g., using gesture sequence 1000A) with user's hand 1011 with palm out hovering over xR object 1010 with fingers spread apart. Another start phase, illustrated in frame 1007, follows on with fingers closed together over xR object 1010. After a selected period of time, such as during a motion phase, visual effect 1013 (e.g., highlighting) may be removed from xR object 1010 (e.g., surround highlighting may flash and then fade away), as shown in frame 1008, to indicate that xR object 1010 has been deselected. End frame 1009 shows xR object 1010 remaining on the HMD's display, still rotated, after the user's hand disappears from sight, at which time object menu 1014 may also be removed.

Figure 11:
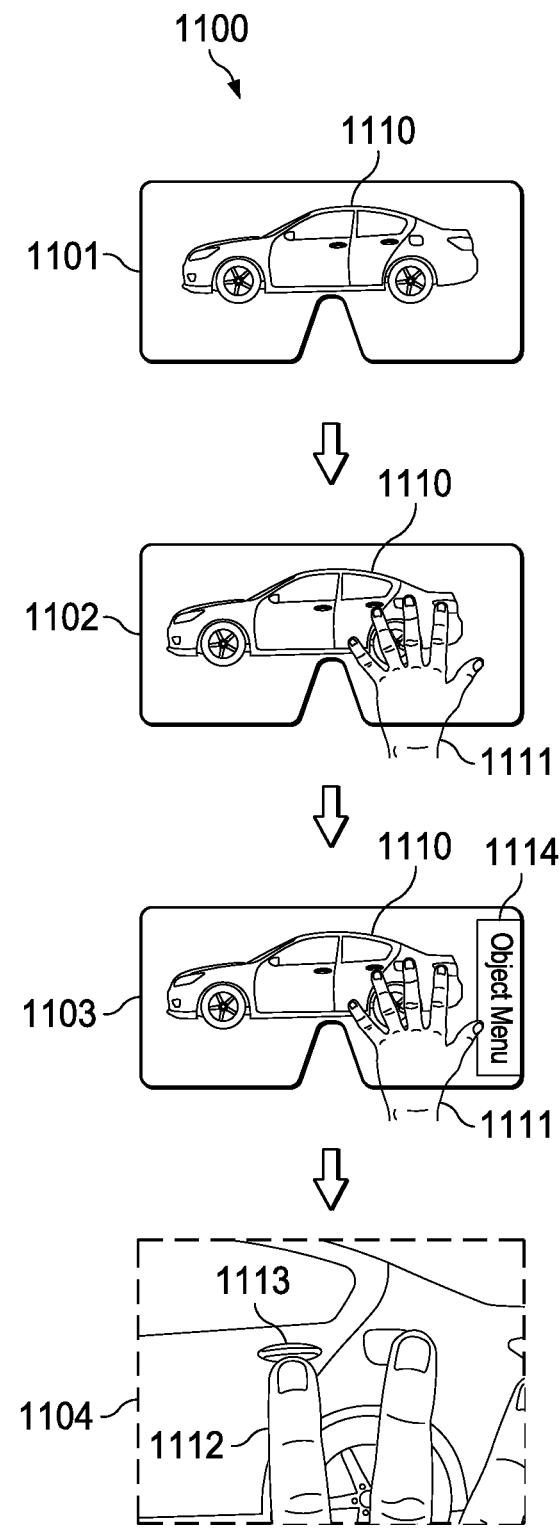
FIG. 11 illustrates an example of a one-handed gesture sequence for selecting small regions, according to some embodiments.

FIG. 11 illustrates an example of a one-handed gesture sequence for selecting small regions. In gesture sequence 1100, frame 1101 shows xR object 1110 (e.g., a car) with detailed features or regions. Start phase, shown in frame 1102, illustrates a user's hand 1111 with palm out hovering over xR object 1110 to be selected with fingers spread apart over xR object 1110, and it also illustrates a motion phase including index finger movement 1112 over a smaller portion of the xR object 1113 (e.g., a door handle), zoomed-in in frame 1104. In response to the detection, the selected portion of the xR object is highlighted and object menu 1114 associated with the selected xR object is displayed in frame 1103. Such an object menu may be used, for example, to perform manipulations (e.g., resize, etc.).

FIGS. 12A-D illustrate examples of one-handed gesture sequences for menu selections, according to some embodiments. In menu open gesture sequence 1200A, the start phase beginning with frame 1201 shows a user's left hand 1220 held up with palm facing in and all five fingers held together in cusped form. After a selected period of time, such as during a motion phase, menu 1221 with surround highlighting 1222 is displayed overlying the left hand 1220, as shown in frame 1202.

If hand 1220 moves away before highlighting 1222 disappears, menu 1221 is dismissed. If hand 1220 stays in position until highlighting 1222 disappears (after a timeout), as shown in frame 1203, subsequent movement of the left hand 1220 does not affect the display of menu 1221, as shown in frame 1204 (still available for voice or hand selection). Conversely, menu open gesture sequence 1200B of FIG. 12B shows the same process of FIG. 12A, but performed with the user's right hand 1223 in frames 1205-1208.

Close menu gesture sequence 1200C shows, as its initial condition, open menu 1221 in frame 1209. Start phase with frame 1210 shows a user's right hand 1223 held up with palm facing in with all five fingers held together in a cusped position behind the open menu 1221. After a selected period of time, such as during a motion phase, the contents of open menu 1221 are dimmed, and surround highlighting 1222 appears, as shown in frame 1211. Then, at the end phase shown in frame 1212, the fingers of hand 1223 close, in a grabbing motion, and menu 1221 is also closed.

Menu repositioning gesture sequence 1200D begins with initial frame 1213 showing an open menu 1221 on the HMD display. Start phase with frame 1214 shows a user's right hand 1223 held up with palm facing in with all five fingers held together in a cusped position behind open menu 1221. After a selected period of time, such as during a motion phase, the contents of the open menu are dimmed, and surround highlighting 1222 appears as shown in frame 1215. Still during the motion phase, as shown in frame 1216, open menu 1221 follows or tracks the user's hand, on the HMD display, as the user's hand 1223 correspondingly moves across the front of the HMD display. When movement of hand 1223 stops for a predetermined amount of time, highlighting 1222 disappears. At the new position in frame 1217, the user removes her hand from sight, and menu 1221 is maintained at its new position.

FIGS. 13A-F illustrate examples of one-handed gesture sequences for minimizing and maximizing workspaces. As used herein, the term "workspace" may refer to an xR workspace and/or to software comprising one or more xR objects, with support framework (e.g., with menus and toolbars) that provides the ability to manipulate 2D/3D objects or object elements, view, share a file, and collaborate with peers. In some cases, an xR application may provide a workspace that enables layers, so that a virtual object (VO) may be highlighted, hidden, unhidden, etc. (e.g., a car may have an engine layer, a tires layer, a rims layer, door handle layer, etc. and corresponding attributes per layer, including, but not limited to: texture, chemical composition, shadow, reflection properties, etc.

Additionally, or alternatively, an xR application may provide a workspace that enables interactions of VO (or groups of VOs) in a workspace with real world and viewing VOs, including, but not limited to: hiding/showing layer(s) of VOs, foreground/background occlusion (notion of transparency and ability to highlight interference for VO on VO or VOs on physical object), texture and materials of VOs, cloning a real world object into VO and printing a VO to model of real world prototype, identification of object as VO or real, physics treatments around workspaces involving VOs including display level manipulations (e.g., show raindrops on display when simulating viewing a car VO in rain) etc.

Additionally, or alternatively, an xR application may provide a workspace that enables operations for single VO or group of VOs in workspace, including, but not limited to: rotate, resize, select, deselect (VO or layers within), lock/unlock a VO for edits or security/permissions reasons, grouping of VOs or ungrouping, VO morphing (ability to intelligently resize to recognize dependencies), copy/paste/delete/undo/redo, etc.

Additionally, or alternatively, an xR application may enable operations on entire workspaces, including, but not limited to: minimize/maximize a workspace, minimize all workspaces, minimize/hide a VO within a workspace, rename workspace, change order of workspace placeholders, copy VO from one workspace to another or copy an entire workspace to another, create a blank workspace, etc. As used, herein, the term "minimize" or "minimizing" refers to the act of removing a window, object, application, or workspace from a main display area, collapsing it into an icon, caption, or placeholder. Conversely, the term "maximize" or "maximizing" refers to the act of displaying or expanding a window, object, application, or workspace to fill a main display area, for example, in response to user's selection of a corresponding icon, caption, or placeholder.

In some cases, an xR application may enable communication and collaboration of workspaces, including, but not limited to: saving a workspace to a file when it involves multiple operations, multiple VO, etc.; being able to do differences across workspaces (as a cumulative) versions of same file, optimized streaming/viewing of workspace for purposes of collaboration and live feedback/editing across local and remote participants, annotating/commenting on workspaces, tagging assets such as location etc. to a workspace, etc.; includes user privileges, such as read/write privileges (full access), view-only privileges (limits operations and ability to open all layers/edits/details), annotation access, etc.

Figure 13A:
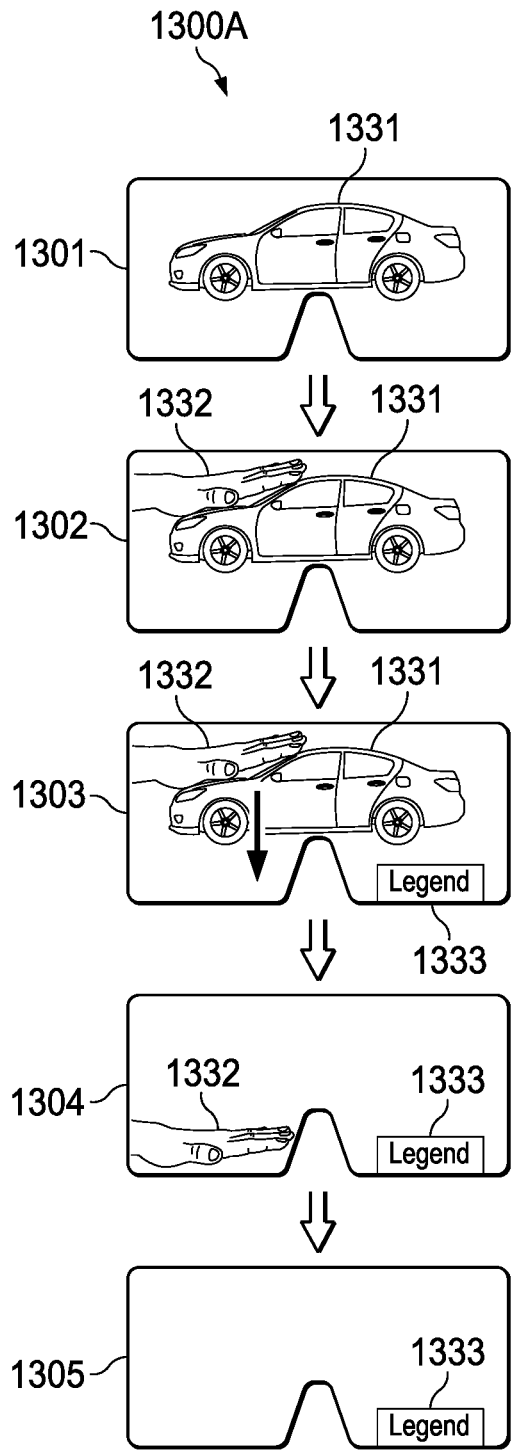
FIGS. 13A-F illustrate examples of one-handed gesture sequences for minimizing and maximizing workspaces, according to some embodiments.
Figure 13B:
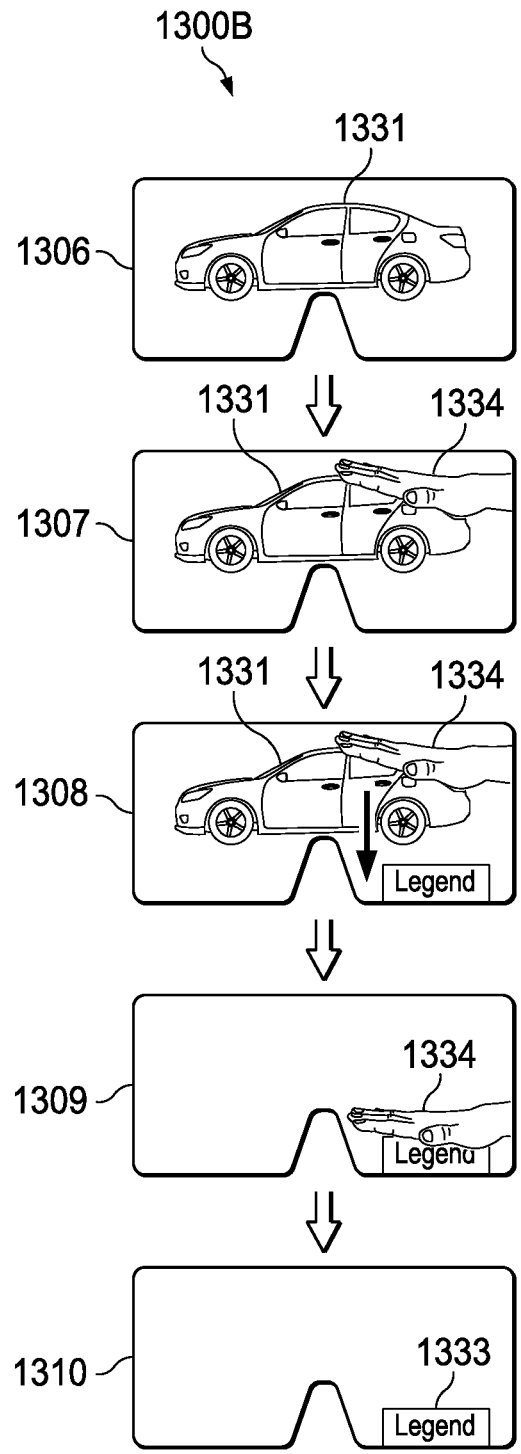

Back to FIGS. 13A-F, first up/down minimization gesture sequence 1300A of FIG. 13A begins with an initial workspace 1331 displayed or visible through the HMD at frame 1301. In the start phase of frame 1302, left hand 1332 is used horizontally leveled with its palm facing down at the top of the HMD display or workspace 1331. During a motion phase in frame 1303, left hand 1332 moves vertically downward and across workspace 1331 until end frame 1304, which causes workspace 1331 to disappear and an associated workspace placeholder 1333 to appear instead, as shown in frame 1305. Second up/down minimization gesture sequence 1300B of FIG. 13B shows the same process of FIG. 13A, but performed with the user's right hand 1334 in frames 1306-1310.

Figure 13C:
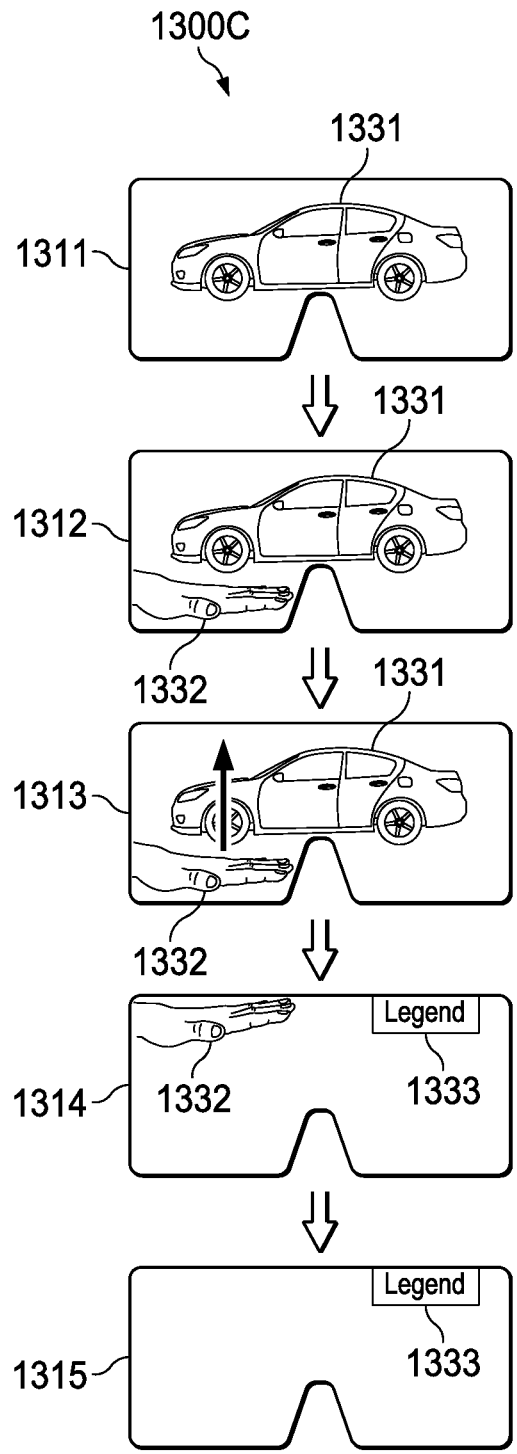
Figure 13D:
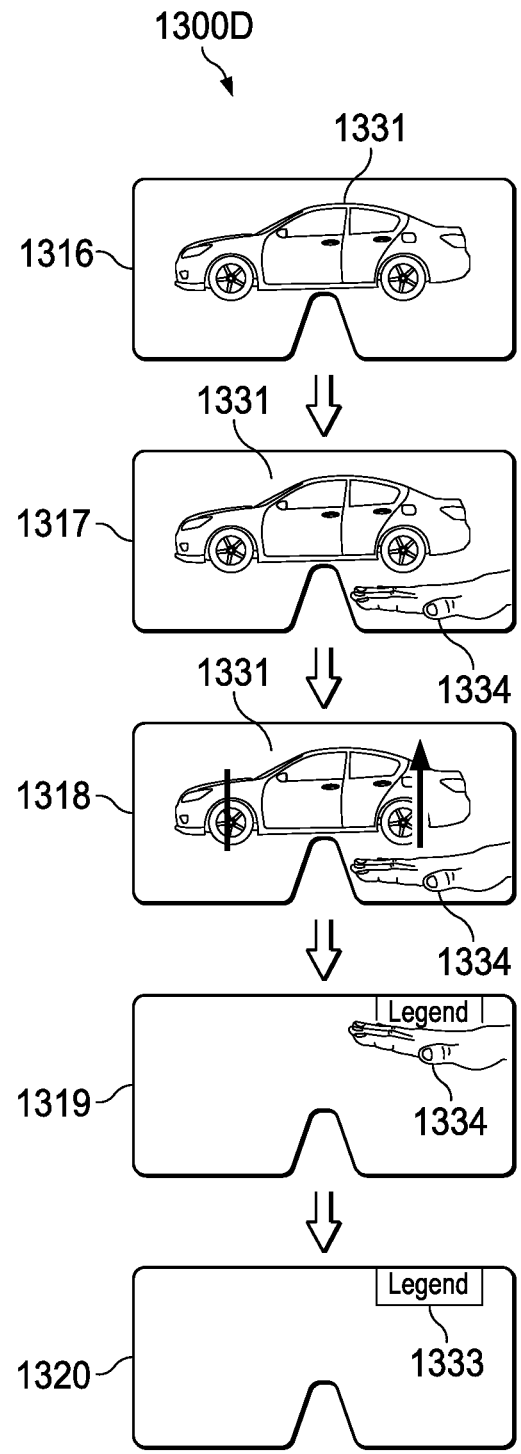

First down/up minimization gesture sequence 1300C of FIG. 13C begins with workspace 1331 displayed or visible through the HMD at frame 1311. In start frame 1312, left hand 1332 is used horizontally leveled with its palm facing down at the bottom of the HMD display or workspace 1331. During a motion phase in frame 1303, left hand 1332 moves upward and across workspace 1331 until end frame 1314, which in turn causes the workspace to disappear and a workplace placeholder 1333 to be displayed, as shown in frame 1315. Second down/up minimization gesture sequence 1300D of FIG. 13D shows the same process of FIG. 13C, but performed with the user's right hand 1334 in frames 1316-1320.

Figure 13E:
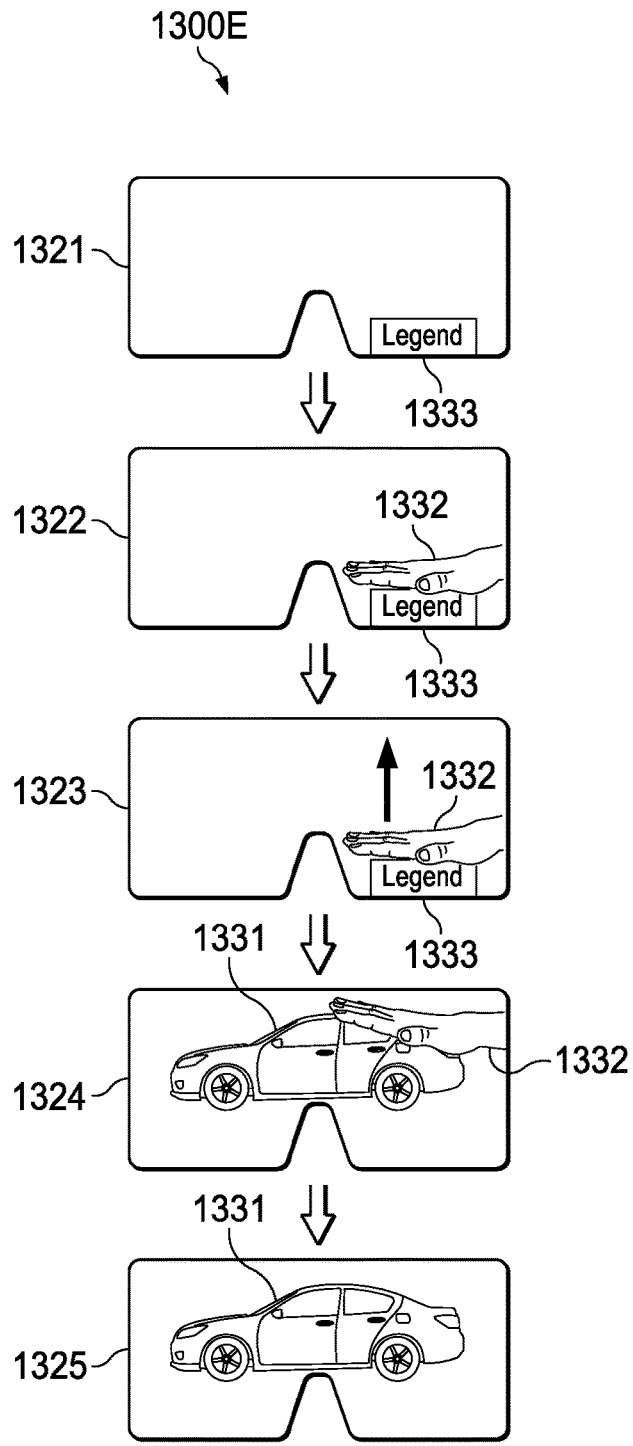
Figure 13F:
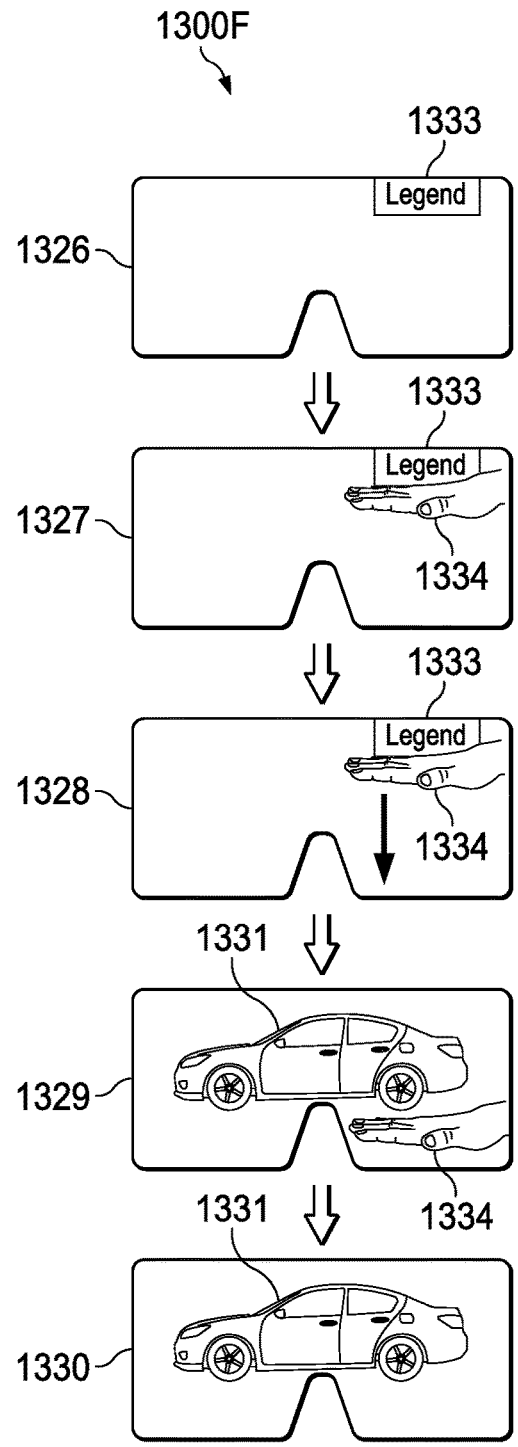

Down/up maximization gesture sequence 1300E of FIG. 13E begins with an empty workspace in frame 1321, in some cases with workspace placeholder 1333 on display. In the start phase shown in frame 1322, right hand 1332 is used horizontally leveled with its palm facing down at the bottom of the HMD display. During a motion phase in frame 1323, the right hand 1332 moves vertically upward and across the display until end frame 1324, when workspace placeholder 1333 is removed, and the associated workspace 1331 appears and remains on display until hand 1332 is removed, as shown in frame 1325. Up/down maximization gesture sequence 1300F of FIG. 13F shows, in frames 1326-1330, the reverse motion as the process of FIG. 13E.

Figure 14:
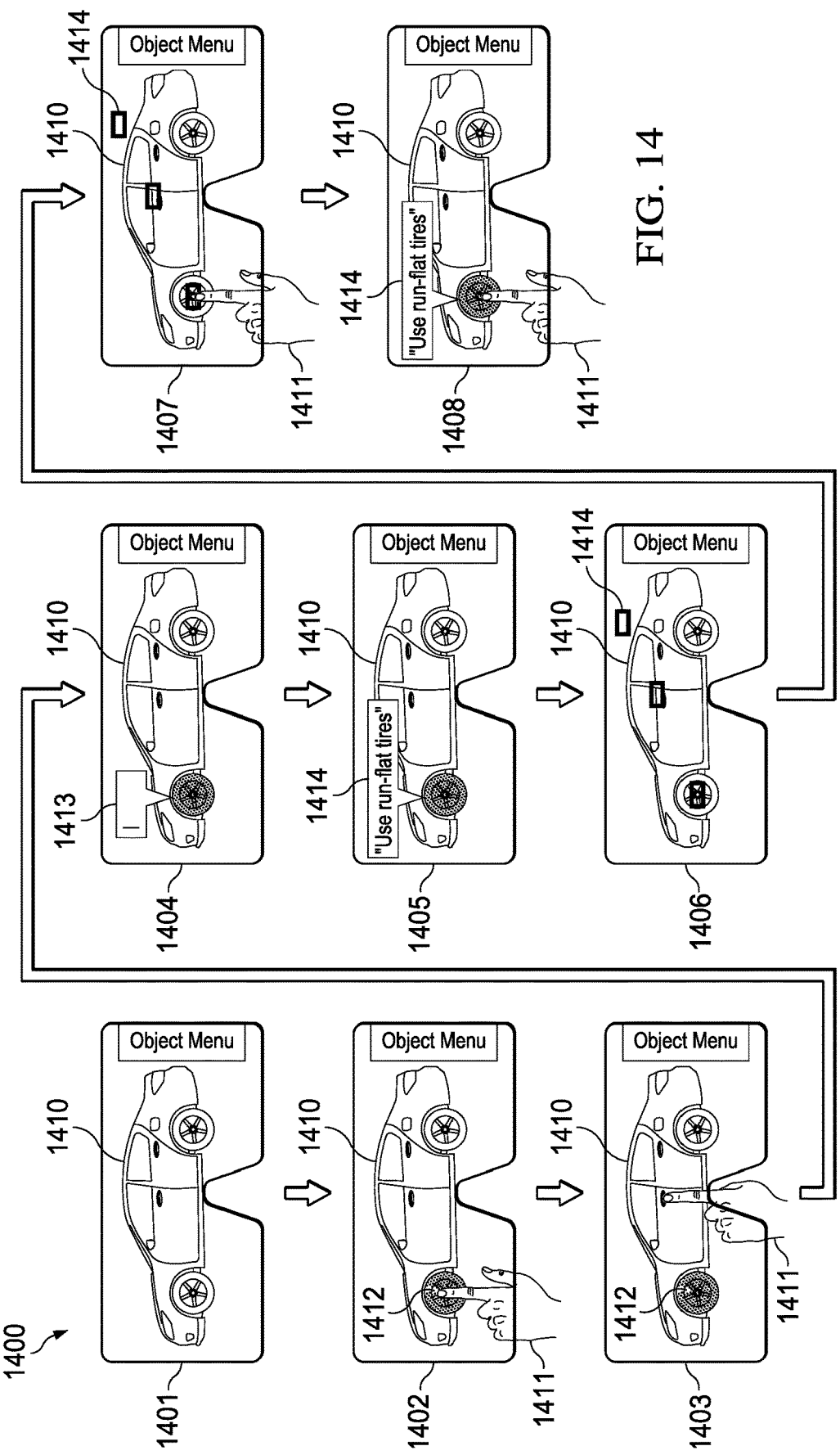
FIG. 14 illustrates an example of a one-handed gesture sequence for annotations, according to some embodiments.

FIG. 14 illustrates an example of a one-handed gesture sequence for annotations. Initial condition 1401 shows xR object 1410 on the HMD display. The start phase of frame 1402 shows left hand 1411 making an index selection of a portion of the xR object 1412 (e.g., a wheel), which is shown highlighted. At frame 1403, during a motion phase, left hand 1411 performs an annotation gesture with an index finger pointing out, in the middle of the display, while the wheel 1412 is still highlighted.

In response to the annotation gesture, frame 1404 shows a text bubble and blinking cursor 1413 that allows the user to enter data 1414 associated with selected object 1412 (e.g., by speaking and having the speech translated into text using a voice service), as shown in frame 1405. Frame 1406 illustrates the use of comment icons 1414 for previously entered annotations. Selecting an annotation, as shown in frame 1407 (e.g., touching with fingertip), causes a text and associated xR region 1414 to be displayed, as in frame 1406. In some cases, holding a fingertip on a comment icon for a time duration (e.g., 3 seconds), until the icon flashes and highlights, allows the user to reposition the icon on the display.

Figure 15A:
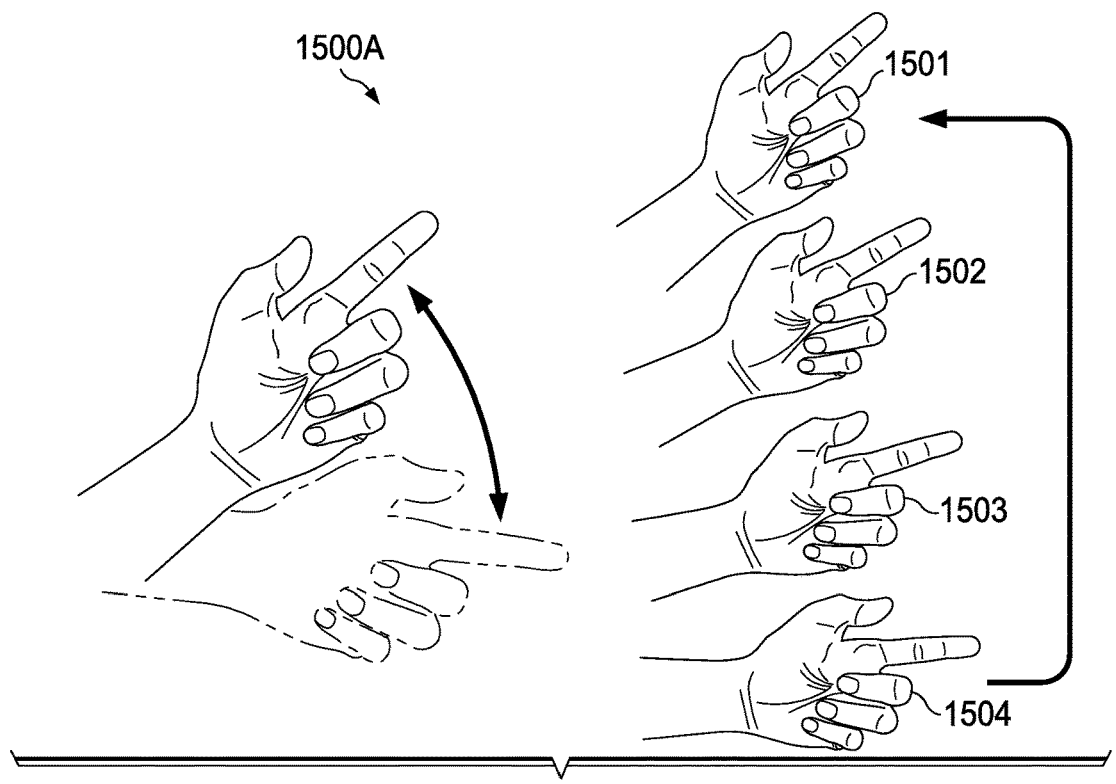
FIGS. 15A and 15B illustrate examples of one-handed gesture sequences for redo commands, according to some embodiments.
Figure 15B:
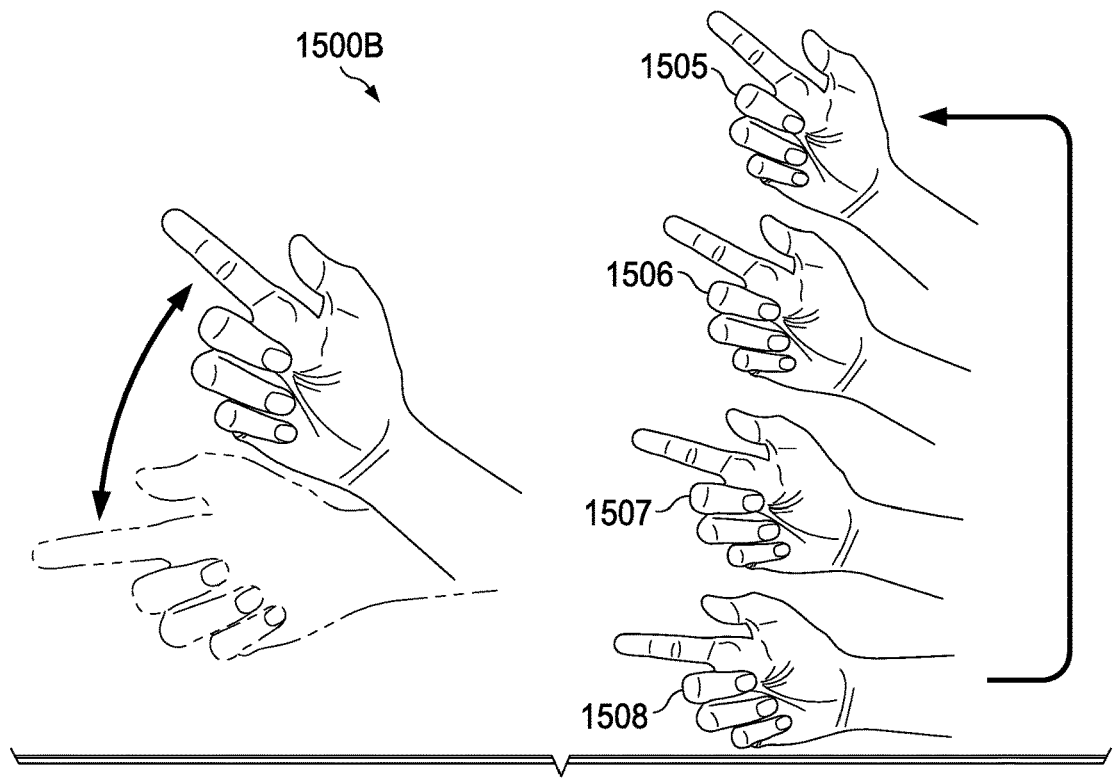

FIGS. 15A and 15B illustrate examples of one-handed gesture sequences for redo commands. Particularly, gesture sequence 1500A, performed with the left hand, may include start phase 1501 showing a left hand with an extended index finger and an extended thumb, and three curled up fingers. Motion phase includes frames 1502-1504 showing the same hand configuration, swinging up and down, hinging around the user's wrist and/or elbow, and which may be repeated a number of times in order to trigger a redo or forward command. Gesture sequence 1500B is similar to sequence 1500A, but with the right hand in frames 1505-1508.

Figure 16A:
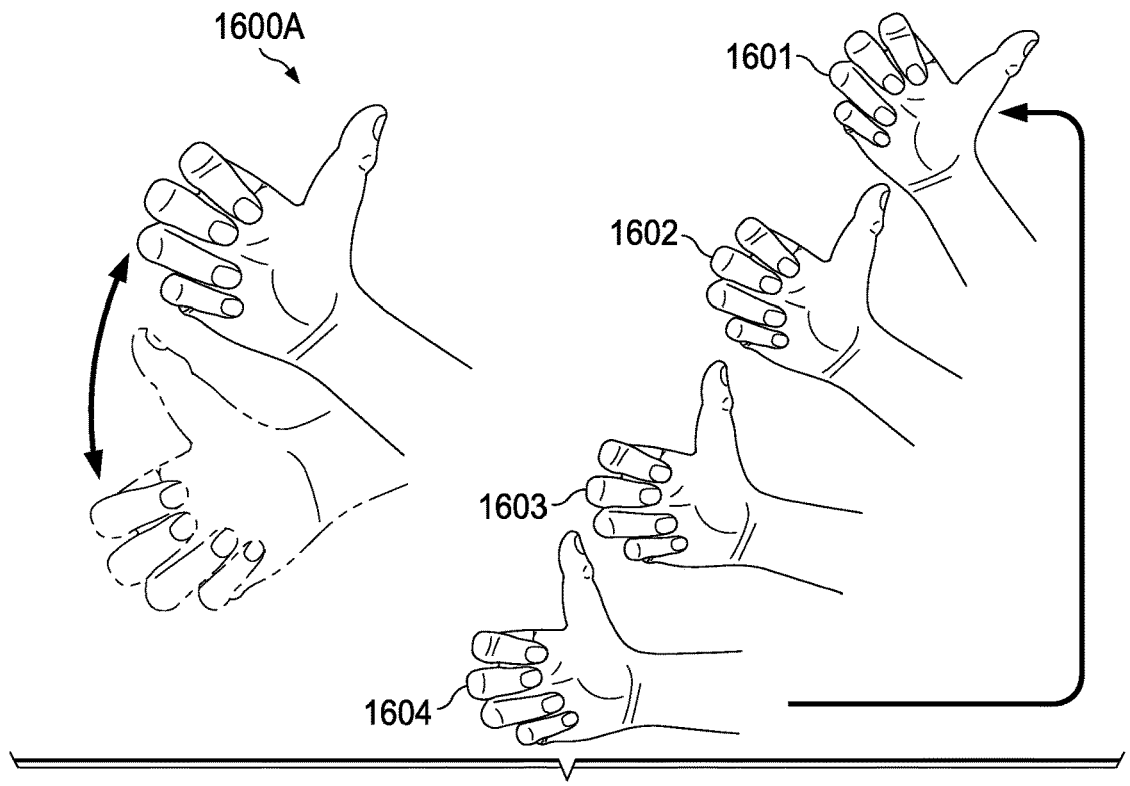
FIGS. 16A and 16B illustrate examples of one-handed gesture sequences for undo commands, according to some embodiments.
Figure 16B:
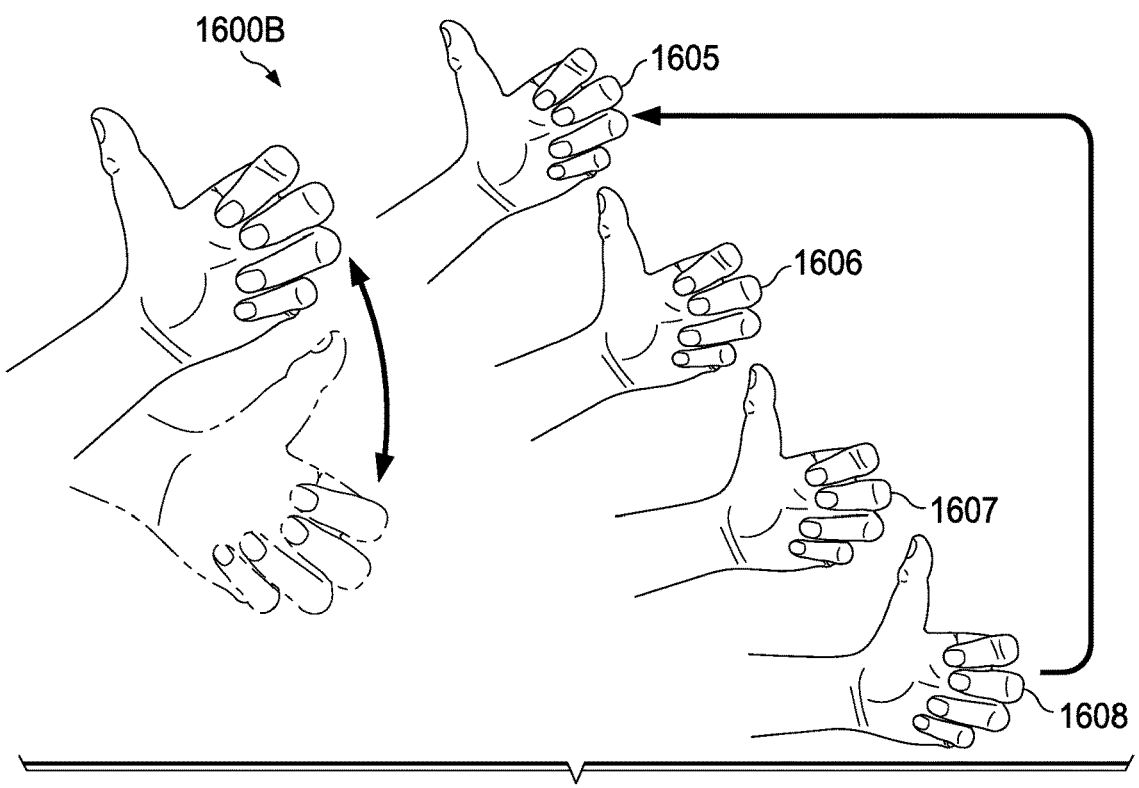

FIGS. 16A and 16B illustrate examples of one-handed gesture sequences for undo commands. Particularly, gesture sequence 1600A, performed with the right hand, may include start phase 1601 showing a right hand with an extended thumb and four curled up fingers. motion phase includes frames 1602-1604 showing the same hand configuration, swinging up and down, hinging around the user's wrist and/or elbow, and which may be repeated a number of times in order to trigger an undo or backward command. Gesture sequence 1600B is like gesture sequence 1600A, but with the left hand in frames 1605-1608.

Figure 17B:
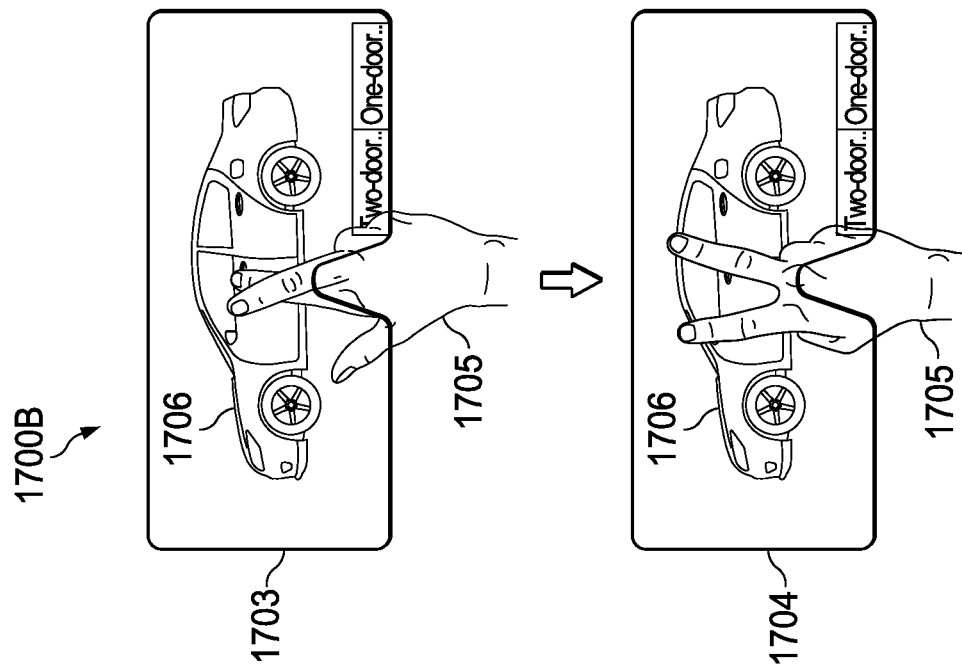
FIGS. 17A and 17B illustrate examples of one-handed gesture sequences for multiuser lock and unlock commands, according to some embodiments.
Figure 17A:
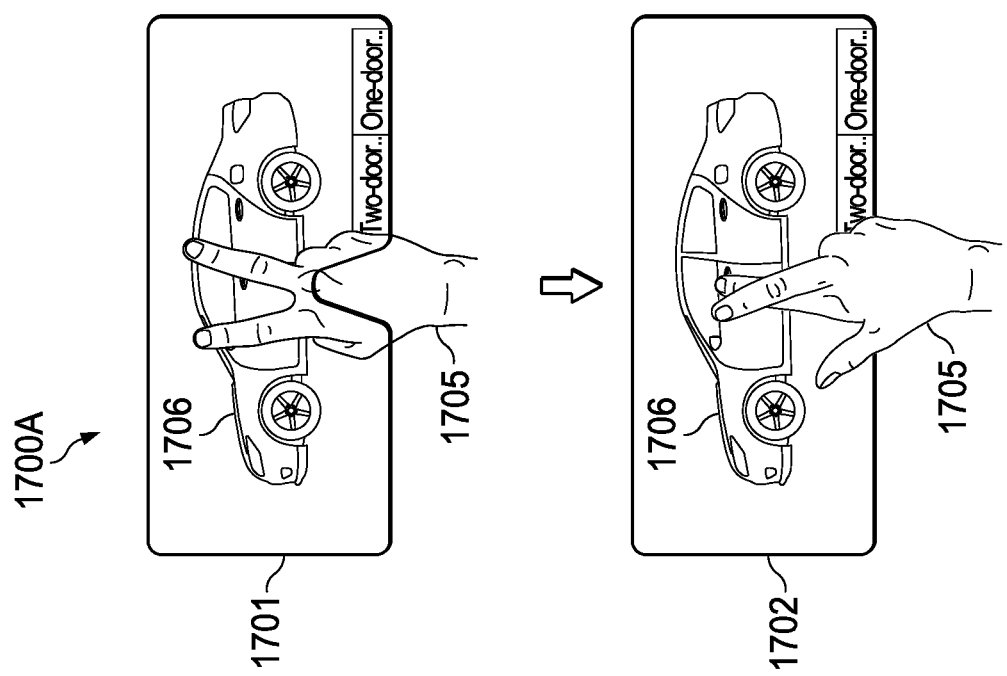

FIGS. 17A and 17B illustrate examples of one-handed gesture sequences for multiuser lock and unlock commands. In some embodiments, whether collaborating with other participants in a shared workspace, or while working alone, a lock/unlock gesture sequence may be used to prevent further manipulation of the workspace or one of its components. In various implementations, these gesture sequences may begin with two fingers (index and middle) being extended and then crossed to lock, and uncrossed to unlock. Moreover, these gestures may be performed with either the left or the right hand.

For example, in lock gesture sequence 1700A, start frame 1701 illustrates hand 1705 hovering over xR object 1706 to be locked, with its index and middle fingers in their extended positions, and the other three fingers curled or retracted. During a motion phase, as shown in frame 1702, the user crosses the index and middle fingers over xR object 1706. In response, access to xR object 1706 is locked. Conversely, in unlock gesture sequence 1700B, start frame 1703 shows hand 1705 hovering over xR object 1706 to be unlocked with index and middle fingers crossed, followed by a motion phase where the index and middle fingers assume an extended position, as in frame 1704. In response, access to xR object 1706 is then unlocked.

In multi-user collaboration of workspaces, these gesture sequences may be used by any collaborator to lock/unlock access temporarily for purposes of illustration, discussion, editing, as long as the owner has started the collaboration mode with a two-handed gesture sequence. When this gesture is used by an owner to lock, control may be immediately turned over to owner from any other collaborator who has locked the item/workspace. When these gestures are used by owner to unlock, the current collaborator's lock may be undone, and the workspace becomes unlocked for all participants. Moreover, in some cases, when a collaborator has locked an item or workspace and another collaborator wants to lock same item or workspace, the prior collaborator may need to unlock it first, or the owner may have to unlock pre-emptively.

FIGS. 18A and 18B illustrate examples of techniques for restricting access to locked xR objects or workspaces. In some embodiments, a non-authorized user attempting to select a locked workspace 1805 via an associated tab or placeholder 1806, as shown in frame 1801 of sequence 1800A, may result in a lock-icon 1807 flashing briefly over tab or placeholder 1806. Additionally, or alternatively, a non-authorized user attempting to select a locked xR object or region 1808 directly, as shown in frame 1802, may result in lock-icon 1807 flashing over the selected xR object or region 1808. In both case, icon 1807 communicates that edits are not available—that is, the workspace or xR object is locked.

Locked items may include, but are not limited to, workspaces (e.g., file selection shown), virtual or digitally-generated xR objects, regions of xR objects (e.g., a wheel of a car), or an edit layer in an object menu. When a collaborator has locked item or workspace, the owner may unlock it without any permissions pre-emptively. In sequence 1800B, a layer or filter may be turned on in frame 1803 to provide a visual indicator of locked or disabled items 1809 (e.g., grayed-out items) in frame 1804.

FIG. 19 illustrates an example of a one-handed gesture sequence for bringing up a list of collaborators. In some applications, such as in a multi-user xR collaboration session, it may be desirable, during multiple operations such as giving control to another user, to bring up a list of collaborators with a gesture sequence. To this end, gesture sequence 1900 illustrates a motion phase frame 1901 of hand 1902 with a palm facing out, wiggling or moving four extended fingers, with the thumb curled in toward the palm. In response to successful detection, a list of collaborators may be displayed in menu by the HMD during execution of the xR application.

Two-Handed Gesture Sequences

Systems and methods described herein may be used to enable two-handed gesture sequence recognition in xR HMDs.

In various embodiments, gesture sequence detection system 300 may employ methods 400 and/or 500 to perform camera-based (108) detection of two-handed gesture sequences. For example, FIGS. 20A-C illustrate two-handed gesture sequences for turning an HMD display on or off. In "display on" gesture sequence 2000A, the start phase of frame 2001 illustrates a user with two hands 2005 and 2006 having their fingers pointing up, side-by-side, and with their palms in covering the user's face 2008. During a motion phase, shown in frame 2002, the user uncovers his or her face with both palms of hands 2005 and 2006 facing out to the side of face 2008. In response, the user's HMD display may be turned on, or the HMD may be woken from a sleep or low power state.

In "display off" gesture sequence 2000B, start frame 2003 illustrates a user with two hands 2005 and 2006 in the same position as in frame 2002. During a subsequent motion phase, as shown in frame 2004, the user covers his or her face 2008, as previously shown in frame 2001. In response, the user's HMD display may be turned off, or the HMD may be placed in a sleep or low power state. Frame 2000C shows a side view 2007 of the user, and a typical distance between the user's hands and the HMD during gesture sequences 2000A and 2000B.

Figure 21:
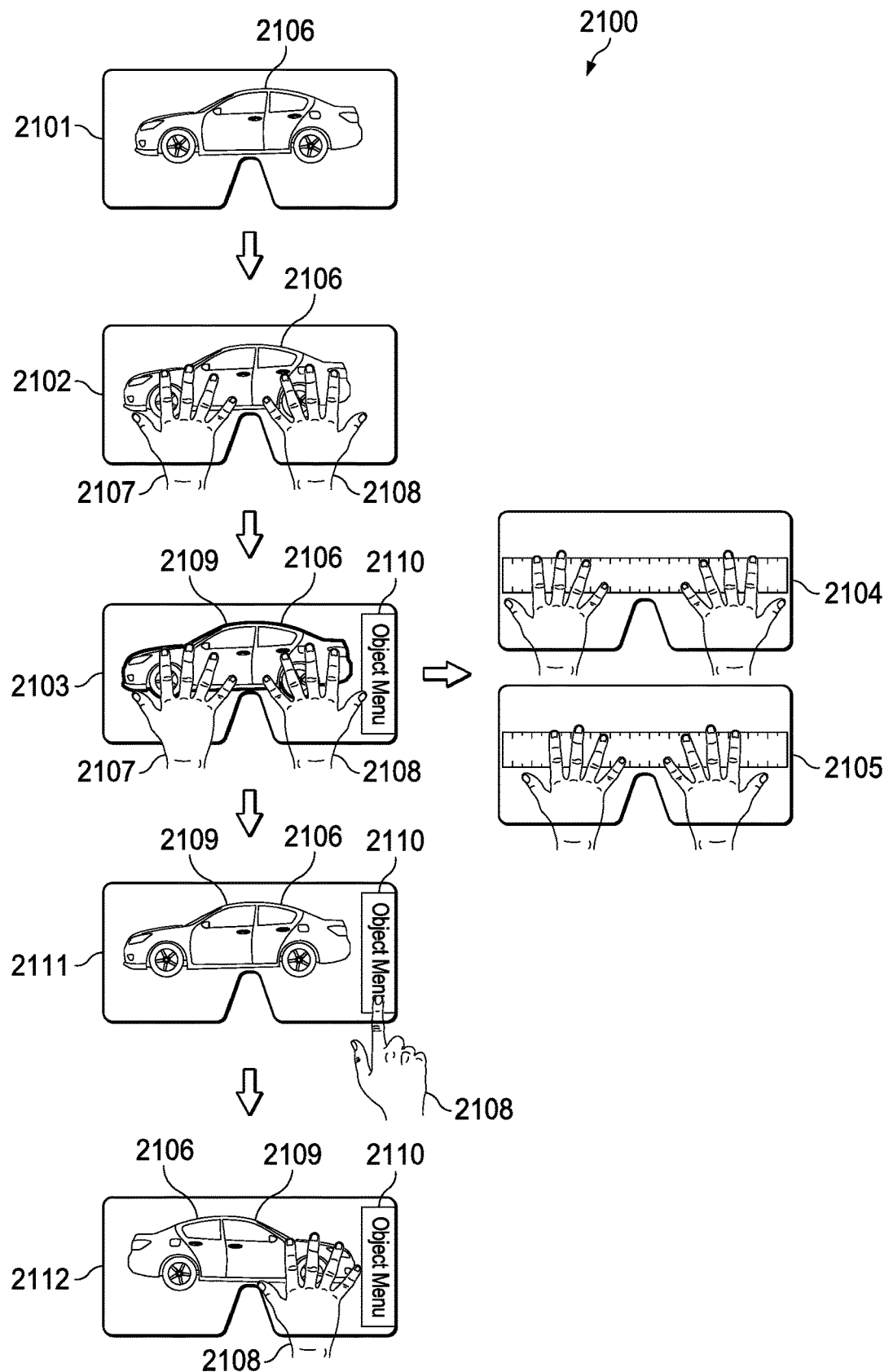
FIG. 21 illustrates an example of a two-handed gesture sequence for selecting or deselecting large regions-of-interest in one or more virtual objects in a workspace, according to some embodiments.

FIG. 21 illustrates an example of a two-handed gesture sequence for selecting or deselecting large regions-of-interest in one or more virtual objects in a workspace. Gesture sequence 2100 begins with a large xR object or workspace displayed 2016 or visible through the HMD at frame 2101, and occupying most of the user's field-of-view. In start frame 2102, for larger regions of a workspace, the use may place both hands 2107 and 2108 over the object 2106 to capture the area, with palms facing out and all ten fingers extended. After a waiting in position for a predetermined amount of time, the xR object 2106 is highlighted with surround effect 2109 and object menu 2110 appears, as shown in frame 2103. Frames 2104 and 2105 show that the edge of the user's hands that alights with the edge of the xR object defines the selected area 2109. In frame 2111, the user may perform a pointing gesture to select object menu 2110 and perform manipulations, such as rotating xR object 2016, as shown in frame 2112.

Figure 22B:
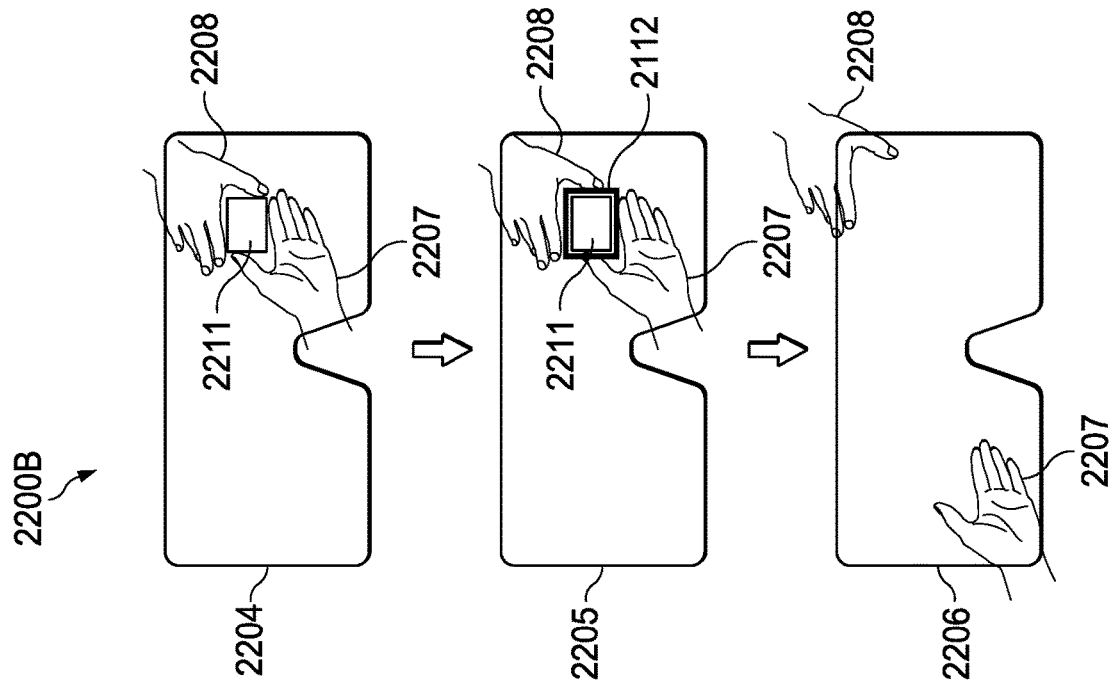
FIGS. 22A and 22B illustrate examples of two-handed gesture sequences for handling display overlays, according to some embodiments.
Figure 22A:
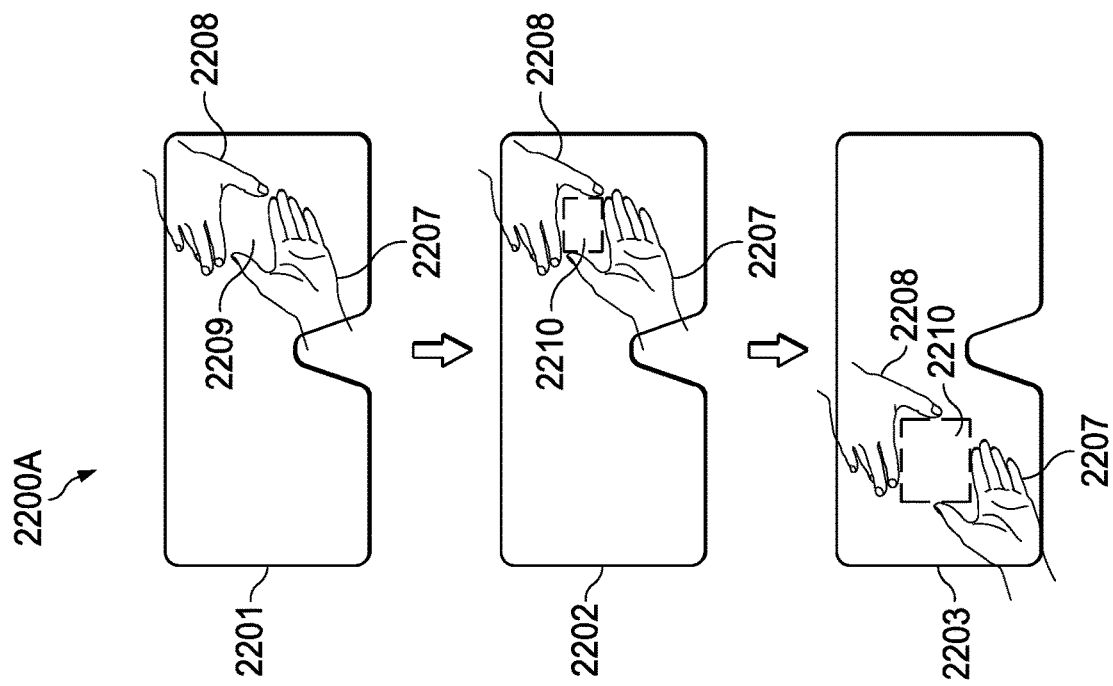

FIGS. 22A and 22B illustrate examples of two-handed gesture sequences for handling display overlays. In gesture sequence 2200A, start phase of frame 2201 shows two hands 2207 and 2208 making rectangular frame shape 2209 with their respective thumbs and index fingers, one palm facing in, and another palm facing out. After a predetermined amount of time, such as during a motion phase shown in frame 2202, a display prompt 2210 appears inside the frame shape. Still during a motion phase, now in frame 2203, the user may move display prompt 2210 to another location on the HMD display by repositioning their hands 2207 and 2208. After another selected amount of time, hands 2207 and 2208 lock display prompt 2210 at the selected location in the user's field-of-view, such that a video stream may be reproduced within it.

In gesture sequence 2200B, start frame 2204 shows hands 2207 and 2208 making the same frame shape, but around an existing display overlay region 2211 that is no longer wanted. After a predetermined amount of time, such as during a motion phase in frame 2205, the display overlay region 2211 actively reproducing a video is dimmed and the region is highlighted with visual effect 2212. At end phase 2206, the user separates hand 2207 from hand 2208, and display overlay region 2211 is dismissed.

FIGS. 23A and 23B illustrate examples of two-handed gesture sequences for minimizing all workspaces. In gesture sequence 2300A, initial frame 2301 shows xR object or workspace 2311 on the HMD's display. The start phase of frame 2301 shows hands 2312 and 1213 horizontally leveled with palms facing down at the top of the HMD display. During a motion phase, as shown in frame 2303, hands 2312 and 1213 move down and across the display, still horizontally leveled with palms facing down. The end phase, in frame 2304, shows that the xR object or workspace 2311 is minimized, and frame 2305 shows placeholder 2314 associated with the minimized workspace. Gesture sequence 2300B of FIG. 23B is similar to gesture sequence 2300A, but hands 2312 and 1213 move up from the bottom of the display between frames 2306-2310.

FIGS. 24A, 24B, 25A, and 25B illustrate examples of two-handed gesture sequences for opening and closing files, applications, or workspaces (or for any other opening and closing action, depending on application or context). Particularly, close gesture sequence 2400A begins with a start phase shown in frame 2401, where the user's hands 2405 and 2406 are both on display with a separation between them, with palms facing in and fingers close together, and with thumbs farthest apart from each other. Sequence 2500A of FIG. 25A shows the motion phase 2501-2505 of close gesture sequence 2400A, with each hand 2405 and 2406 spinning around its arm and/or wrist. The final phase of close gesture sequence 2400A is shown in frame 2402, with hands 2405 and 2406 with palms facing out, with a smaller separation between them, and with thumbs closest together. In response, a file, application, workspace, or xR object currently being displayed by the HMD may be closed or dismissed.

Figure 24B:
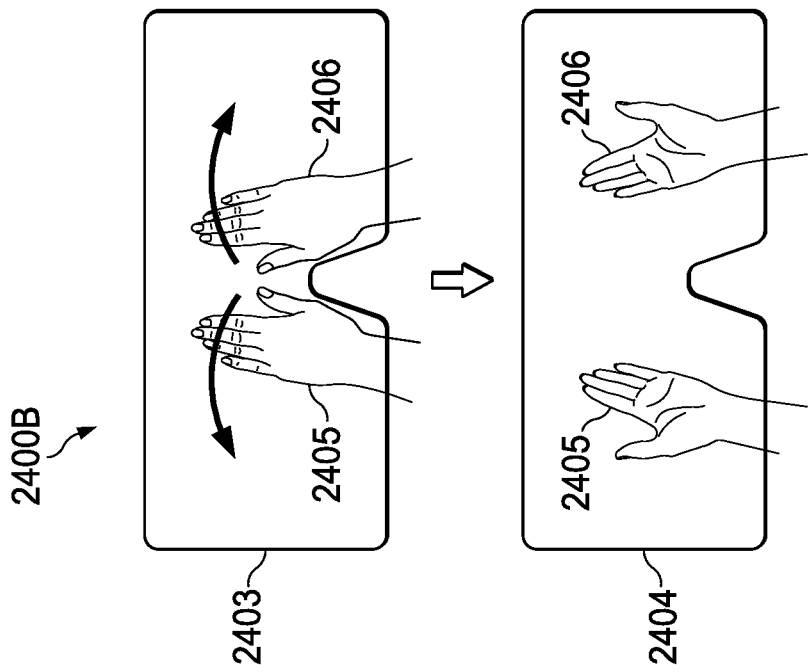
Figure 24A:
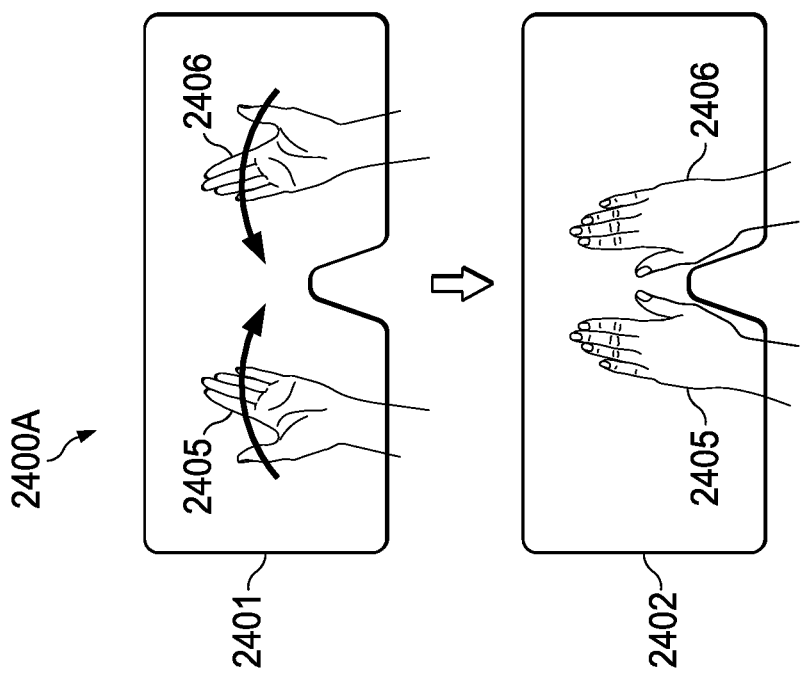

Conversely, open gesture sequence 2400B of FIG. 24B begins with start frame 2403 where the user's hands 2405 and 2406 are both on display with a small separation between them, with palms facing out and fingers close together, and with thumbs closest to each other. Sequence 2500B of FIG. 25B shows the motion phase 2506-2510 of open gesture sequence 2400B. The final phase of open gesture sequence 2400B shows frame 2404 with both hands 2405 and 2406 with palms facing in, with a larger separation between them, and with thumbs farthest from each other. In response, a file, application, workspace, or xR object currently may be opened and/or displayed by the HMD.

Figure 26B:
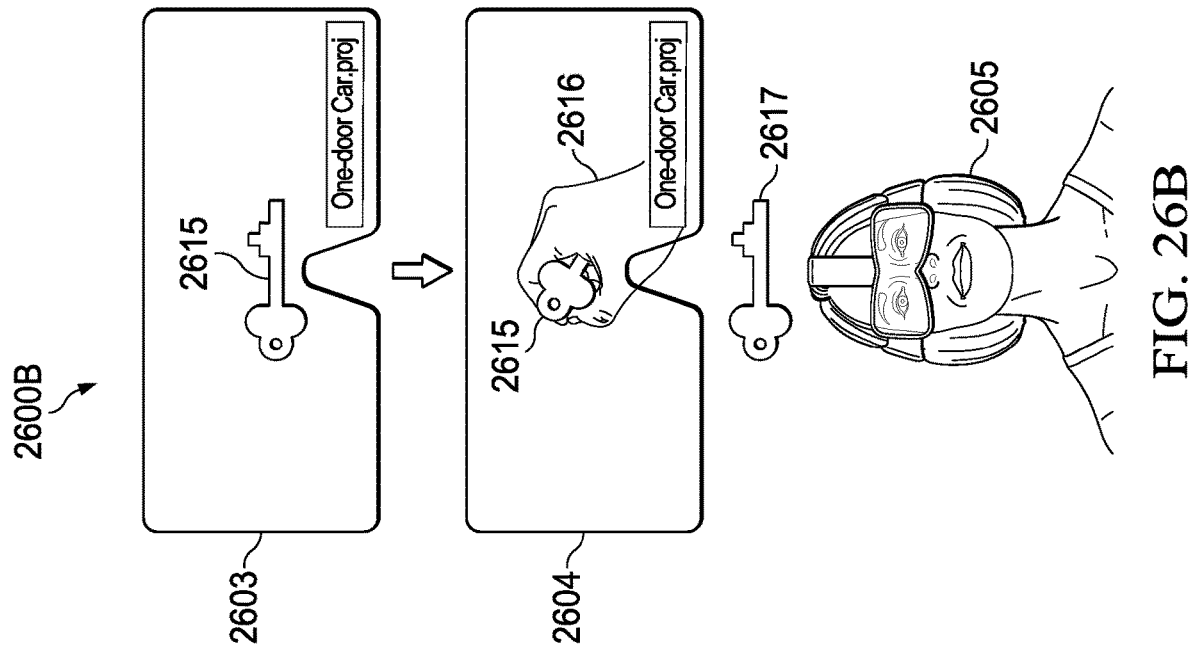
FIGS. 26A-C illustrate examples of two-handed gesture sequences for handling multi-user, active user handoff, according to some embodiments.
Figure 26A:
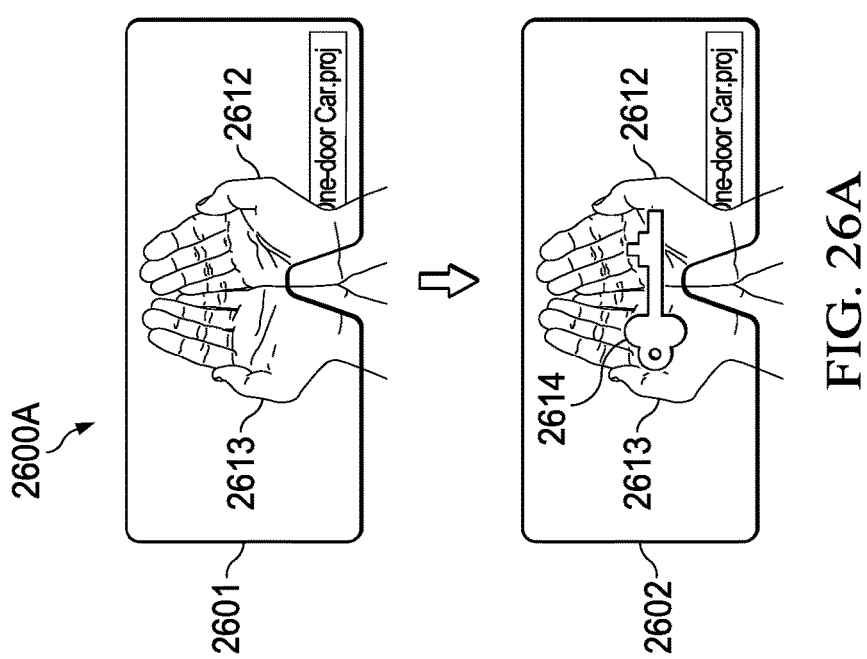
Figure 26C:
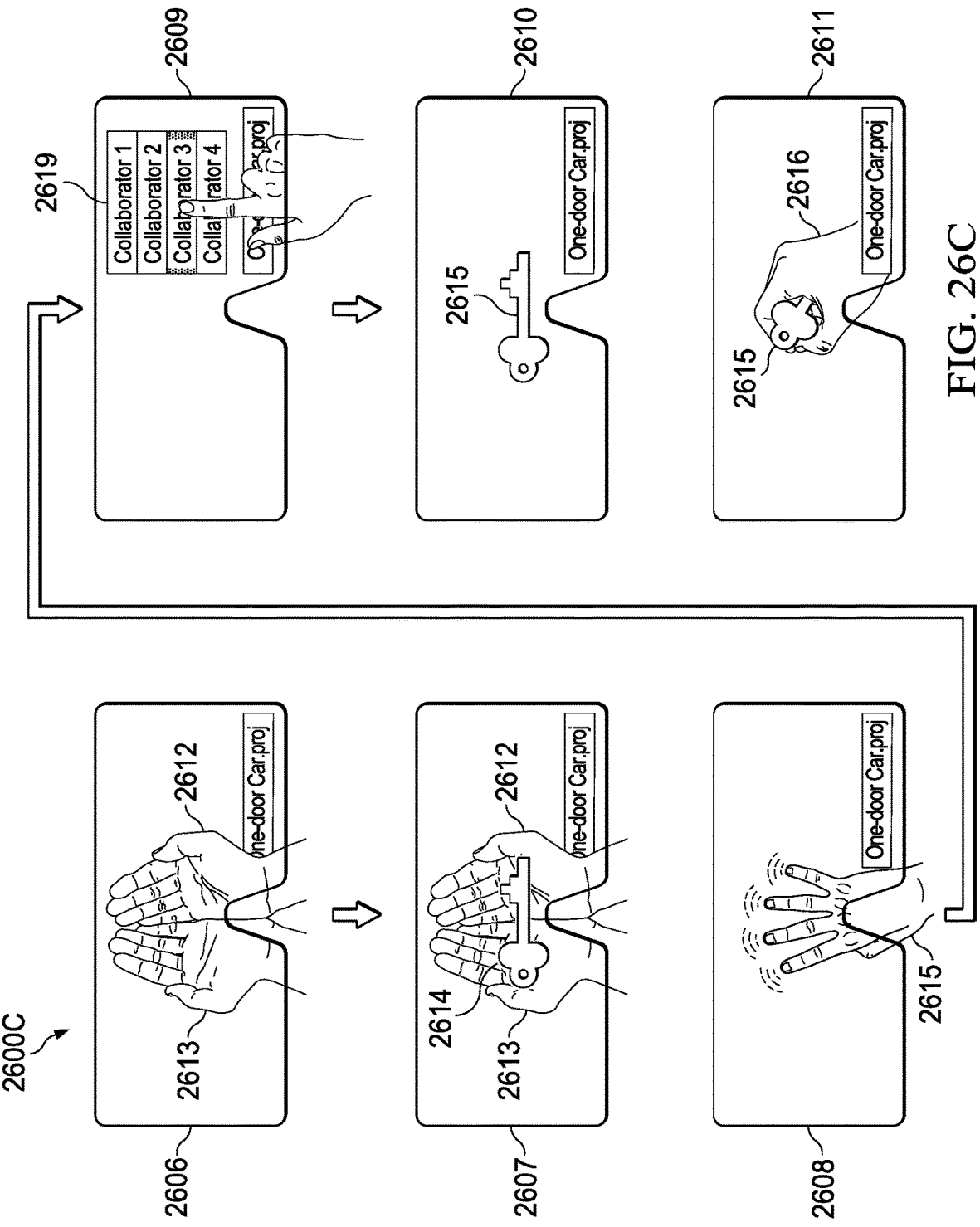

FIGS. 26A-C illustrate examples of two-handed gesture sequences for handling multi-user, active user handoff. In various embodiments, these gesture sequences may allow a user to share his or her active user status with other users in a collaborative xR application. For example, in gesture sequence 2600A, a workspace owner (a person who opened the workspace) may be provided the ability to manipulate the workspace, and the ability to relinquish that ability to a collaborator, via an offer gesture, to create an "active" user. In some cases, the owner of the workspace (e.g., the participant who opens and shares a presentation) is the default "active" person, and any other person given active status may have a "key" as indicator of their status.

Particularly, in gesture sequence 2600A, start phase frame 2601 illustrates first cusped hand 2612 with palm facing up, and second cusped hand 2613 with palm facing up and joining the first cusped hand at an obtuse angle. After holding still for a predetermined amount of time, such as during a motion phase, frame 2602 shows virtual key 2614 (or other xR object) rendered over the user's hands 2612 and 2613.

To a collaborator wearing a different HMD, another virtual key 2615 appears on their display in frame 2603. During a motion phase performed by the collaborator, as shown in frame 2604, the collaborator makes a grabbing gesture 2616 to take virtual key 2615 and become the new "active" user with the ability to manipulate or edit the workspace.

After another predetermined amount of time, virtual key 2617 may serve as an indicator to other collaborators, and it may be shown in other participants' HMDs over the active user's head, for example, as shown in frame 2605 of sequence 2600B in FIG. 26B. The new active user can then pass off the virtual key to the workspace, to other collaborators, or back to the original owner. In a collaborative xR application session with one user, the virtual key may appear to only that user.

In a session with multiple participants, each participant wearing their own HMD, gesture sequence 2600C starts with frames 2606 and 2607, akin to frames 2601 and 2602 in FIG. 26A. Once key 2614 is rendered on the display, however, the user brings up list of collaborators using a one-handed gesture sequence 2618 shown in frame 2608 (akin to sequence 1900 of FIG. 19), and then selects a collaborator from list 2619 displayed in frame 2609. The virtual key 2615 is presented to the selected collaborator's HMD in frame 1610, and the collaborator grabs key 2615 in frame 2611.

Figure 27B:
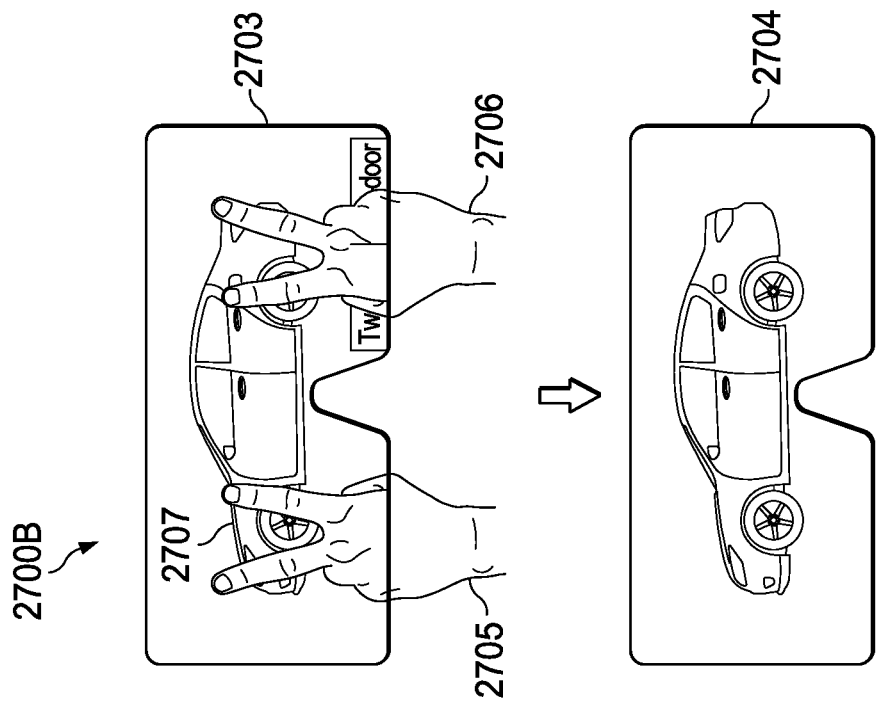
FIGS. 27A and 27B illustrate examples of two-handed gesture sequences for starting and stopping multi-user workspace sharing, according to some embodiments.
Figure 27A:
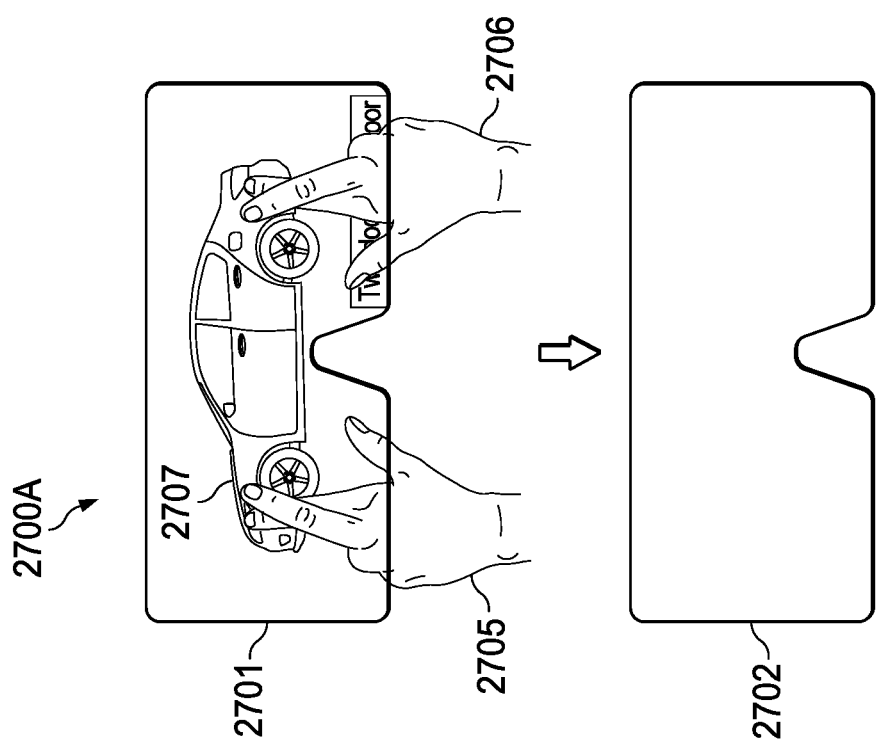

FIGS. 27A and 27B illustrate examples of two-handed gesture sequences for starting and stopping multi-user workspace sharing. Frame 2701 of sequence 2700A shows a workspace owner's HMD view using hand 2705 with crossed middle and index fingers hovering over a first portion of an xR object 2707, and a hand 2706 also with crossed middle and index fingers hovering over a second portion of the xR object. In response, the xR object or workspace may be removed or omitted from a collaborator's HMD view of frame 2702 in a shared xR application. Conversely, in sequence 2700B of FIG. 27B, frame 2703 shows the workspace owner's HMD view with the first and second hands 2705 and 2706 with uncrossed middle and index fingers. In response, xR object or workspace 2707 may be displayed by the collaborator's HMD in frame 2704 of a shared xR application.

In some implementations, gesture sequence detection system 300 may employ methods 600-800 to perform ultrasonic-based detection of two-handed gesture sequences.

FIGS. 28A and 28B illustrate examples of two-handed gesture sequences for muting and unmuting audio using ultrasonic sensors 111. Unmuting gesture sequence 2800A shows starting position 2801 where the user has both hands 2805 and 2806 covering their respective ears. During a motion phase, as shown in frame 2802, the user's hands 2805 and 2806 move out and away from ears 2807 and 2808. In response, audio in both channels (e.g., a left and right speaker within the user's HMD) may be unmuted, or the volume increased. Muting gesture sequence 2800B shows starting position 2803 where the user has both hands 2805 and 2806 apart from their respective ears 2807 and 2808. During a motion phase, as shown in frame 2804, the user's hands 2805 and 2806 are closed over the ears. In response, audio in both channels (e.g., a left and right speaker within the user's HMD) may be muted, or the volume decreased.

Power Management

The use of gesture sequences as a UI modality in xR can increase the complexity and power consumption of Gesture Sequence Recognition and Tracking (GRT) systems. Referring back to FIG. 3, GRT system 300 includes any number of IR emitters 112A-D which are used to light up the space of coverage with IR/NIR. Illumination using IR emitters 112A-D enables forward-facing or gesture camera 108 on HMD 102 to capture frames in IR, with some amount of preprocessing performed by HMD 102 itself. Additional processing may be then implemented by host IHS 103.

To illustrate the importance of managing the power consumption of GRT system 300, consider that in a typical implementation the electrical current draw of GRT system 300 is approximately 12% of the total current consumed by HMD 102 (e.g., 320 mA). Moreover, about 65% of the total current drawn by GRT system 300 is consumed by IR emitters 112A-D.

The power consumption of IR emitters will only become larger as more IR emitters are added to more complex GRT subsystems over time, to provide finer gesture sequence tracking: in implementations where HMD 102 is tethered to IHS 103 with a wire(s), drawing power from IHS 103, the current draw should be kept under the USB (C or A as applicable) maximum default power draw (e.g., 15 W). Conversely, in implementations where HMD 102 is untethered (e.g., AIO), the current draw should be kept small in order to preserve battery life, both in sleep (e.g., idle) and active state(s).

In various embodiments, gesture sequences (as well as the binary detection of a user's hand in front of HMD 102 during a hand detect phase or "H-state") may be calibrated, and a calibration LUT may store N-emitter intensity, brightness, illumination, power, or current values for each state, or phase, of each available gesture. In normal or steady-state operation, as system 300 detects that a gesture being performed has entered a given state or phase, IR emitters 112A-D may be set to corresponding calibration values.

In some implementations, the magnitude and/or a duty cycle of the electrical current driving each IR emitter 112A-D may be directly proportional to the brightness value stored in the calibration LUT for that light source. For example, if a single-handed gesture sequence is being performed with the user's right hand and never crosses over to the left side, IR emitters 112A-D disposed on the left side may have a lower driving current than IR emitters 112A-D located on the right side.

In an embodiment, calibration module 302 of system 300 may set IR emitter 112A-D's intensities N-tuple as part of a GRT calibration operation, and thereafter in steady-state the power provided to each of IR emitters 112A-D may be adjusted, modified, or set according to the intensity values for the state of the gesture(s) being tracked. During the calibration operation, the N-tuple array of IR emitters intensity values per GRT state may be set to satisfy a minimum and/or desired level of positive gesture recognition, and stored in an LUT across all gesture sequences to be detected.

In another embodiment, in steady state, when gesture sequence recognition component 301 detects the state of a gesture being performed, it communicates that information to power management module 304, which in turn it looks up and sets the IR emitters N-tuple to the calibrated values stored in the LUT, for that state, for that gesture sequence(s) being performed.

Accordingly, systems and methods described herein may adaptively reduce overall power consumption of GRT subsystems on HMDs without requiring hardware additions and without degrading user experience. As will be apparent to a person of ordinary skill in the art in light of this disclosure, systems and methods described herein may be scaled to any number of N emitters, wherever disposed (e.g., mounted around HMD 102).

Figure 29:
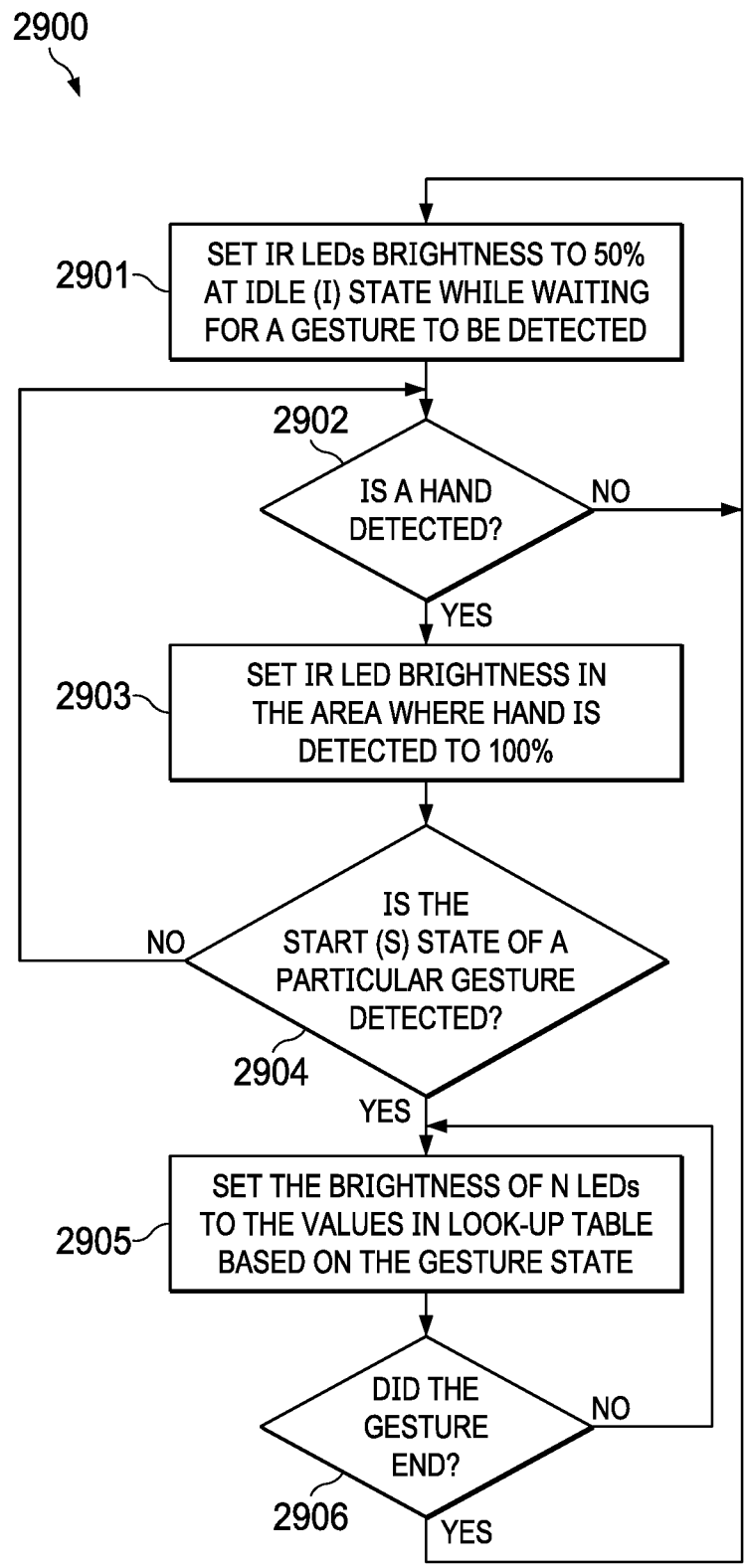
FIG. 29 is a flowchart of an example of a method for managing the power consumption of a gesture recognition system, according to some embodiments.

FIG. 29 is a flowchart of an example of method 2900 for managing the power consumption of GRT system 300. In some embodiments, method 2900 may be performed, at least in part, by power management module 304. Particularly, at block 2901, power management module 304 may set the brightness of each of IR emitters 112A-D to a standby value (e.g., 50%) while gesture sequence recognition component 301 indicates that the system is in an idle state waiting for a gesture to be detected. If gesture sequence recognition component 301 determines at block 2902 that a hand has not yet been detected, control remains with block 2901.

At block 2902, if gesture sequence recognition component 301 detects a hand (e.g., in an IR frame captured using camera 108), control passes to block 2903. In some cases, only the user's left hand is detected. In other cases, only the user's right hand is detected. In yet other cases, both hands may be detected.

At block 2903, power management module 304 may set the brightness of a subset of IR emitters 112A-D whose illumination pattern cover the area in space (e.g., "quadrant") where the hand(s) is/are present to a maximum value (e.g., 100%). Other IR emitters 112A-D that do not cover areas where hand(s) is/are detected may be maintained at their original, standby illumination levels, or may have their brightness reduced.

At block 2904, if the start phase of a particular gesture has not yet been detected, control returns to block 2902. If gesture sequence recognition component 301 detects the start phase of a gesture sequence at block 2904, however, block 2905 sets the brightness of each of IR emitters 112A-D to corresponding values based on the start phase for that sequence, as previously stored in the calibration LUT. Thereafter, as the gesture being recognized changes from one state to the next, subsequent illumination values may be retrieved and IR emitters 112A-D updated. For example, when the gesture begins its motion state, and then again in the ends state, IR emitters 112A-D may again be updated with all new values.

In various embodiments, gesture sequence recognition component 301 may determine that the user is performing one of two or more candidate gesture sequences. As the GRT algorithm progresses, the number of candidate gesture sequences may be reduced or narrowed down (e.g., gradually upon each iteration) until a matching gesture sequence is found. In these cases, when two candidate gesture sequences have been calibrated with different values for IR emitters 112A-D, the highest brightness value among the different candidate gesture sequences for any given IR emitter may be selected.

For example, if candidate gesture sequence A requires that IR emitter 112A have its brightness at 70% during its motion phase, candidate gesture sequence B requires that the same IR emitter 112A have its brightness at 100% during its motion phase, and both candidates A and B are potential matches up while a motion phase is detected, then HMD 102 may apply an electrical current corresponding to the 100% brightness to IR emitter 112A. If/when candidate B is no longer a potential match, HMD 102 may set IR emitter 112A to 70% brightness.

In various embodiments, the calibration LUT may include values for each light source (e.g., IR emitters 112A-D) in each phase or state of each calibrated candidate gesture sequence. Each such value may represent, for example, brightness, intensity, or illumination levels (e.g., nits), power factors (e.g., 50%), or driving current levels (e.g., mA). In some case, to achieve a power reduction, HMD 102 may modify the magnitude and/or duty cycle of the electrical currents applied to each of IR emitters 112A-D in a manner proportional to their corresponding LUT values.

An example of a calibration LUT is shown below:

TABLE I

Calibration LUT of intensity/brightness values for each light source

| Gesture Sequence | State | IR Emitter Intensity |
|---|---|---|
| Maximize workspace with right hand (user sweeps up or down on right quadrant of FOV) | Start | (0.1, 0.1, . . . 0.7, 0.7, . . . 0.7) Left side set low for left hand Right side continues to be optimal |
|  | Motion | (0.1, 0.1, . . . 0.7, 0.7, . . . 0.7) Left side set low for left hand Right side continues to be optimal |
|  | End | (0.1, 0.1, . . . 0.7, 0.7, . . . 0.7) Left side set low for left hand Right side continues to be optimal |
| Maximize workspace with left hand (user sweeps up or down on left quadrant of FOV) | Start | (0.7, 0.7, . . . 0.1, 0.1, . . . 0.1) Right side set low for left hand Left side continues to be optimal |
|  | Motion | (0.7, 0.7, . . . 0.1, 0.1, . . . 0.1) Right side set low for left hand Left side continues to be optimal |
|  | End | (0.7, 0.7, . . . 0.1, 0.1, . . . 0.1) Right side set low for left hand Left side continues to be optimal |

FIGS. 30A-E illustrate a first example use-case of method 2900, according to some embodiments. In this application, when in idle state (I) 3000A of FIG. 30A, each of IR emitters 112A-D projects a corresponding lobe or radiation pattern 3001A-D with standby power, brightness, or illumination level set to 50%. Although in this example there is no overlap between lobes or "quadrants" 3001A-D, in other implementations any number of lobes and/or pattern shapes may be used.

Figure 30B:
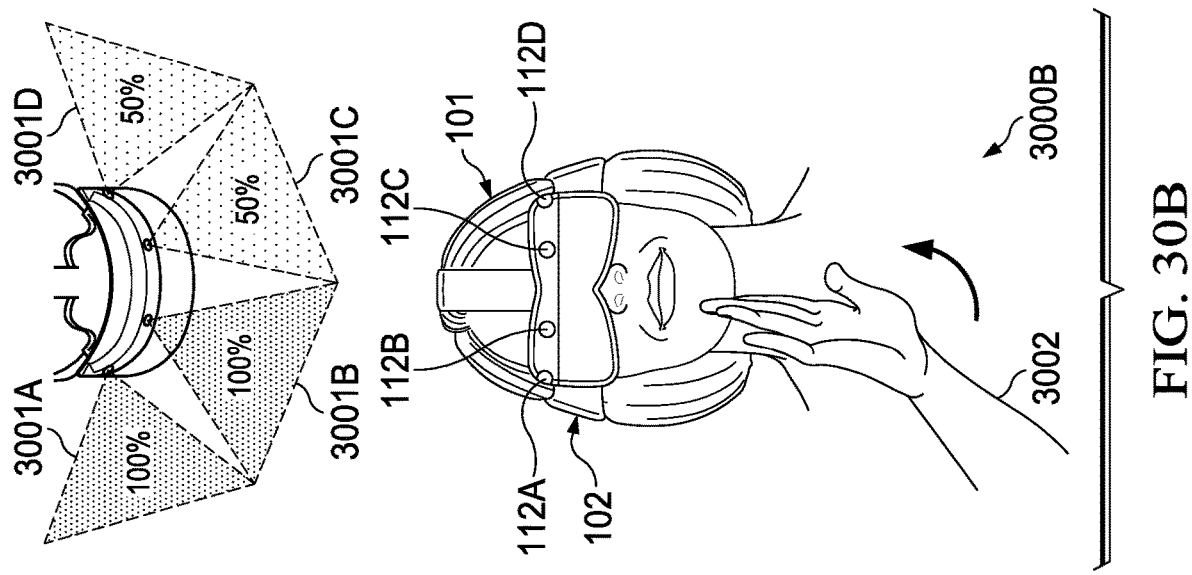
Figure 30A:
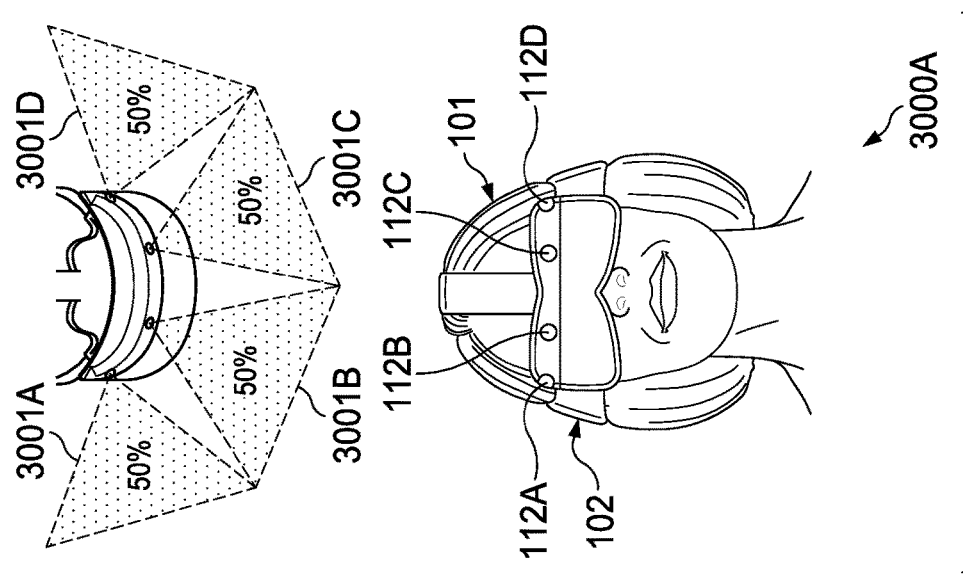

During hand-detect (H) phase 3000B of FIG. 30B, user 101's right hand 3002 is detected moving upward, and in response, IR emitters 112A and 112B are driven up to 100% brightness; whereas IR emitters 112C and 112D are maintained at 50%. During start (S) phase 3000C, gesture sequence recognition component 301 detects the start of a gesture sequence to maximize a workspace with the right hand (user sweeps up or down on right quadrant of FOV). In response, power management module 304 drives IR emitters 112A and 112B down to 70%, and IR emitters 112C and 112D are driven down to 10%, as set by a corresponding LUT entry.

Figure 30D:
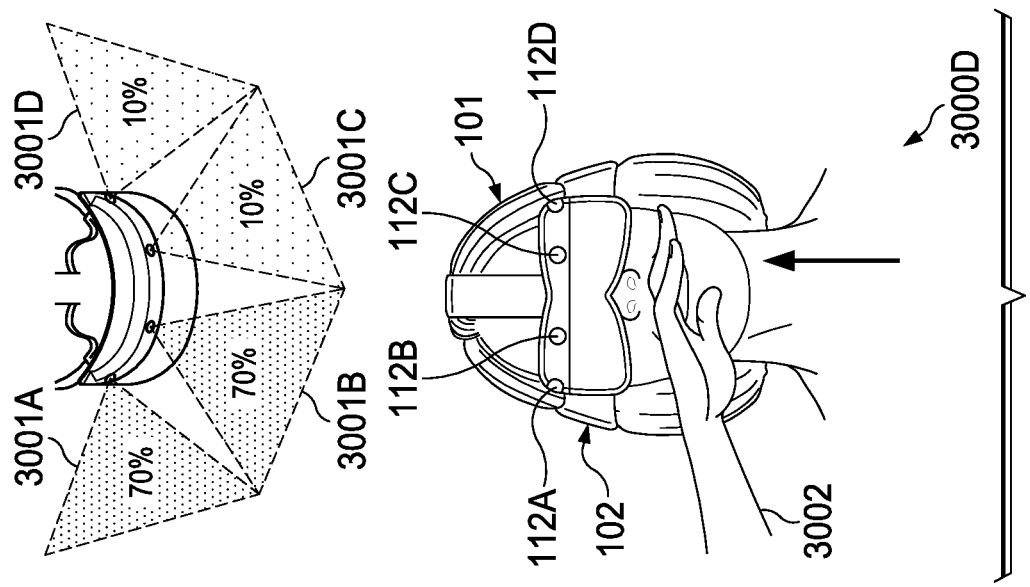
Figure 30C:
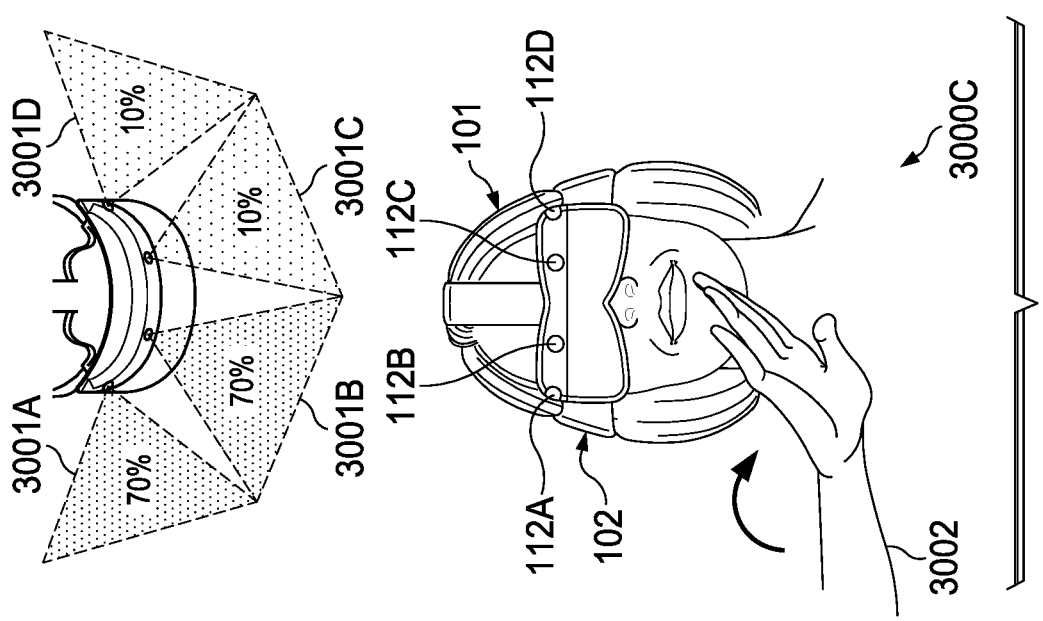

During motion (M) phase 3000D of FIG. 30D, gesture sequence recognition component 301 detects the motion phase of the same gesture sequence and, in this case, power management module 304 maintains the brightness of IR emitters 112A-D at their current levels, as set by a corresponding LUT entry. In other cases, however, brightness values of individual light sources may change between the start and motion phases of the same gesture sequence.

During end (E) phase 3000E of FIG. 30E, gesture sequence recognition component 301 detects the end phase of the same gesture sequence and, in this case, power management module 304 still maintains the brightness of IR emitters 112A-D at their current levels. But again, in other cases, brightness values of individual light sources may change between the motion and end phases of the same gesture sequence, as set by its respective LUT entry.

FIGS. 31A-E illustrate a second example use-case of method 2900, according to some embodiments. In this application, when in idle state (I) 3100A of FIG. 31A, each of IR emitters 112A-D projects a corresponding lobe or radiation pattern 3001A-D with standby power or illumination set to 50%.

Figure 31B:
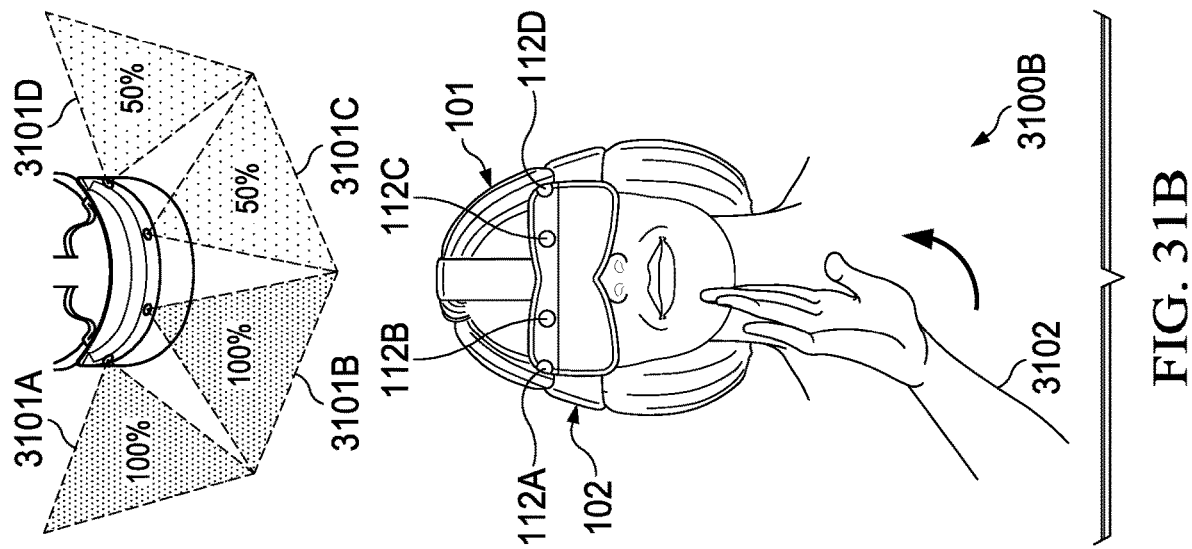
Figure 31A:
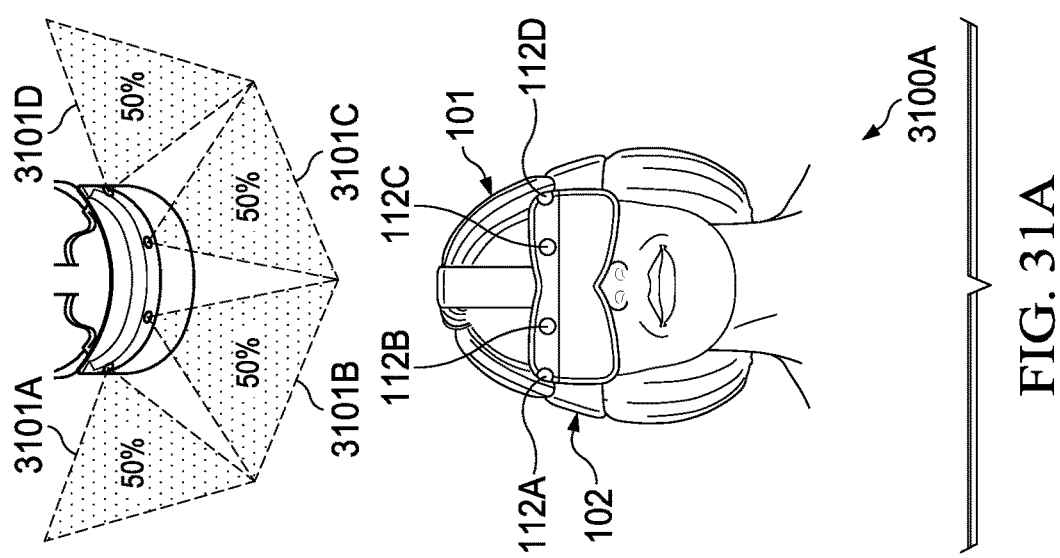

During hand-detect (H) phase 3100B of FIG. 31B, user 101's right hand 3102 is detected moving upward, and in response, IR emitters 112A and 112B are driven up to 100% brightness; whereas IR emitters 112C and 112D are maintained at 50%. During start (S) phase 3100C, gesture sequence recognition component 301 detects the start of a "swipe" gesture sequence (user's hand moves across multiple quadrants of FOV). In response, power management module 304 drives IR emitters 112A and 112B down to 70%, and IR emitters 112C and 112D are driven down to 10%, as set by a corresponding LUT entry.

Figure 31D:
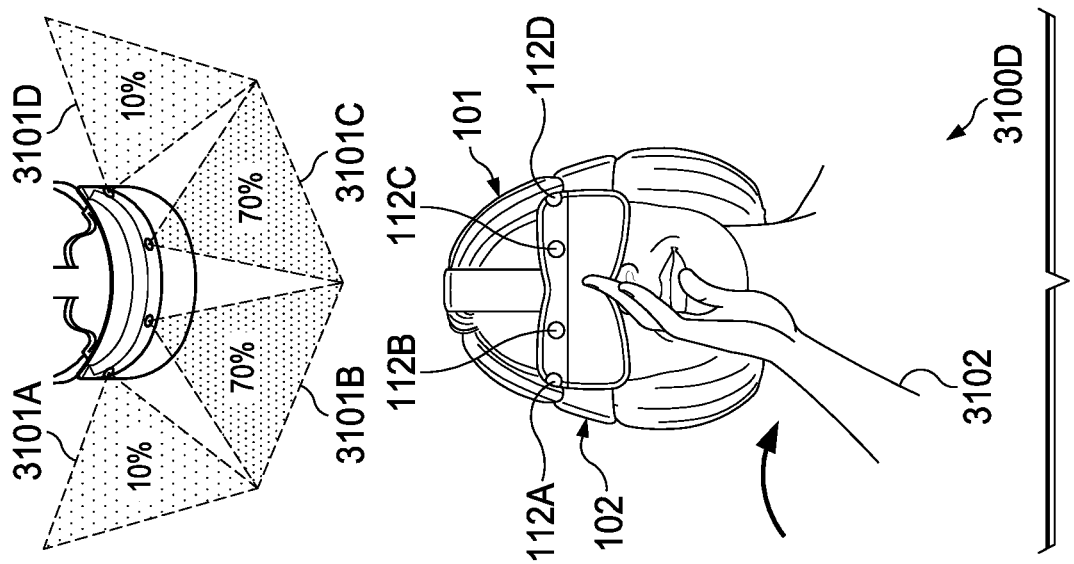
Figure 31C:
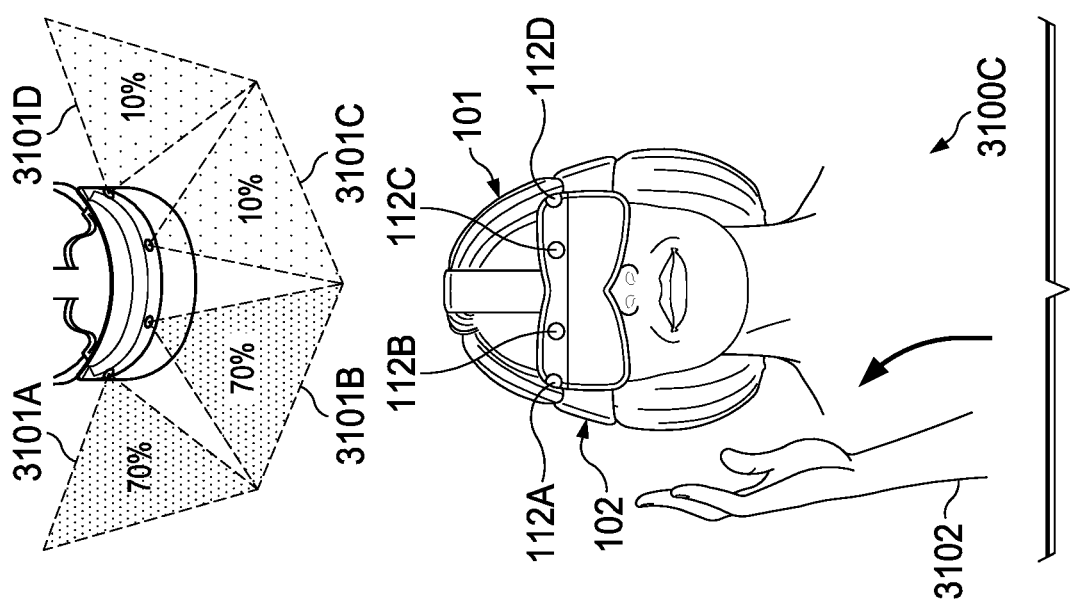

During motion (M) phase 3100D of FIG. 31D, gesture sequence recognition component 301 detects the motion phase of the same gesture sequence and, in this case, power management module 304 lowers the brightness of IR emitter 112A to 10%, maintains IR emitter 112B at 70%, increases IR emitter 112C to 70%, and maintains IR emitter 112-D at 10%, as set by a corresponding LUT entry, and as hand 3102 moves across the user's FOV during the motion phase of the gesture sequence.

During end (E) phase 3100E of FIG. 31E, gesture sequence recognition component 301 detects the end phase of the same gesture sequence and, in this case, power management module 304 maintains the brightness of IR emitter 112A at 10%, lowers IR emitter 112B to 10%, maintains IR emitter 112C at 70%, and increases 112D to 70%, as set by a corresponding LUT entry.

In some embodiments, power management module 304 may also account for the user's gaze direction, point, or vector when controlling the illumination of each of IR emitters 112A-D. For example, the quadrant covered by the use's gaze direction may be illuminated at high power level, as the gaze point moves around the user's FOV. Additionally, or alternatively, the user's gaze direction may be used to modify brightness values stored in a calibration LUT (e.g., if an IR emitter is set to 50% and the user's gaze turns to the quadrants covered by that emitter, the emitter may be set to 75%, or 1.5 times the stored calibration value).

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS), comprising:
   a processor; and
   a memory coupled to the processor, the memory having program instructions stored thereon that, upon execution by the processor, cause the IHS to:
   set an illumination of each of a plurality of IR emitters to a standby level, wherein the IR emitters are coupled to a Head-Mounted Device (HMD) worn by a user;
   receive frames captured by a camera coupled to the HMD;
   identify a state of a gesture sequence being performed by the user based upon the frames, wherein the state is a hand detect state;
   select a level of illumination provided by the plurality of IR emitters in response to the state;
   in response to detection of a hand in a first set of frames, set the illumination of at least one of the plurality of IR emitters closest to the hand to a level higher than the standby level; and
   maintain the illumination of at least another one of the plurality of IR emitters farthest from the hand at the standby value.

2. The IHS of claim 1, wherein the program instructions, upon execution by the processor, further cause the IHS to reduce the illumination of the at least another one of the plurality of IR emitters farthest from the hand to a value below the standby value.

3. The IHS of claim 1, wherein the state is a start state, and wherein the program instructions, upon execution by the processor, further cause the IHS to:
   identify one or more gesture sequence candidates; and
   select the level of illumination of the plurality of IR emitters based upon calibration data associated with the identified one or more gesture sequence candidates.

4. The IHS of claim 3, wherein the program instructions, upon execution by the processor, further cause the IHS to:
   determine that a first gesture sequence candidate requires that a given IR emitter produce a first illumination level;
   determine that a second gesture sequence candidate requires that the given IR emitter produce a second illumination level; and
   select a level of illumination for the given IR emitter that meets the highest of the first or second illumination levels.

5. The IHS of claim 3, wherein the state is a motion state, and wherein the program instructions, upon execution by the processor, further cause the IHS to:
   exclude a given gesture sequence candidate from the one or more identified gesture sequence candidates; and
   select the level of illumination of the plurality of IR emitters based upon calibration data associated with the one or more gesture sequence candidates to the exclusion of the given gesture sequence candidate.

6. The IHS of claim 1, wherein the program instructions, upon execution by the processor, further cause the IHS to:
   retrieve a first value associated with a first one of the plurality of IR emitters during a calibration procedure;
   instruct the HMD to apply a first electrical current corresponding to the first value to the first IR emitter;
   retrieve a second value associated with a second one of the plurality of IR emitters during the calibration procedure; and
   instruct the HMD to apply a second electrical current corresponding to the second value to the second IR emitter.

7. The IHS of claim 6, wherein the first electrical current has a first magnitude proportional to the first value and the second electrical current has a second magnitude proportional to the second value.

8. The IHS of claim 6, wherein the first electrical current has a first duty cycle proportional to the first value and the second electrical current has a second duty cycle proportional to the second value.

9. A method, comprising:
   receiving frames from a camera configured to capture gestures illuminated by infrared (IR) light sources;
   identifying a state of a gesture being performed based upon the frames, wherein the state of the gesture is selected from the group consisting of: a hand detect phase, a start phase, a motion phase, and an end phase;
   identifying gesture candidates that potentially match the gesture being performed;
   retrieving a brightness value of each IR light source for each of the identified gesture candidates; and
   individually controlling a brightness of each of the IR light sources in response to the state, at least in part, by:
   (i) selecting a driving current to be applied to each given IR light source during each given state that is proportional a highest brightness value among the identified gesture candidates in the given state; and by
   (ii) applying: a first driving current to a given IR light source during the hand detect phase, a second driving current different from the first driving current to the given IR light source during the start phase, and a third driving current different from the second driving current to the given IR light source during the motion phase.

10. A hardware memory device of a Head-Mounted Device (HMD), the hardware memory device having program instructions stored thereon that, upon execution by a hardware processor, cause the HMD to:
    set an illumination of each of a plurality of IR emitters to a standby level, wherein the IR emitters are coupled to the HMD;

receive frames captured by a camera coupled to the HMD;
identify a state of a gesture sequence being performed by the user based upon the frames, wherein the state is a hand detect state;
select a level of illumination provided by the plurality of IR emitters in response to the state;
in response to detection of a hand in a first set of frames, set the illumination of at least one of the plurality of IR emitters closest to the hand to a level higher than the standby level; and
reduce the illumination of at least another one of the plurality of IR emitters farthest from the hand to a value below the standby value.

11. The hardware memory device of claim 10, wherein the program instructions, upon execution, further cause the HMD to:
maintain the illumination of the at least another one of the plurality of IR emitters farthest from the hand at the standby value.

12. The hardware memory device of claim 10, wherein to control the illumination, the program instructions, upon execution, further cause the HMD to:
identify one or more gesture sequence candidates; and
select the level of illumination of the plurality of IR emitters based upon calibration data associated with the identified one or more gesture sequence candidates.

* * * * *